US012643819B2

(12) United States Patent
Spitznagel et al.

(10) Patent No.: US 12,643,819 B2
(45) Date of Patent: Jun. 2, 2026

(54) BIOCEMENTATION MIXTURE FOR DUST CONTROL AND RELATED APPLICATIONS

(71) Applicant: BIND-X GMBH, Planegg (DE)

(72) Inventors: Martin Spitznagel, Munich (DE); Luitpold Fried, Munich (DE); Saskia Pazur, Eichenau (DE); Jan-Philip Merkl, Hohenschäftlarn (DE); Florian Hornung, Munich (DE)

(73) Assignee: BIND-X INTERNATIONAL GMBH, Munich (DE)

( * ) Notice: Subject to any disclaimer, the term of this patent is extended or adjusted under 35 U.S.C. 154(b) by 511 days.

(21) Appl. No.: 17/999,901

(22) PCT Filed: May 20, 2021

(86) PCT No.: PCT/EP2021/063459
§ 371 (c)(1),
(2) Date: Nov. 25, 2022

(87) PCT Pub. No.: WO2021/239573
PCT Pub. Date: Dec. 2, 2021

(65) Prior Publication Data
US 2023/0227355 A1      Jul. 20, 2023

(30) Foreign Application Priority Data

May 27, 2020    (EP) .................................... 20176894

(51) Int. Cl.
*C04B 12/00*        (2006.01)
*C04B 24/14*        (2006.01)
*C09K 3/22*         (2006.01)
*C04B 103/00*       (2006.01)
*C04B 111/00*       (2006.01)

(52) U.S. Cl.
CPC .............. *C04B 12/00* (2013.01); *C04B 24/14* (2013.01); *C09K 3/22* (2013.01); *C04B 2103/0001* (2013.01); *C04B 2111/00741* (2013.01); *Y02W 30/91* (2015.05)

(58) Field of Classification Search
CPC . C04B 12/00; C04B 24/14; C04B 2103/0001; C04B 2111/00741; C09K 3/22; Y02W 30/91; C09D 5/00; C12N 11/02; C12N 11/14
See application file for complete search history.

(56) References Cited

U.S. PATENT DOCUMENTS

| | | | |
|---|---|---|---|
| 2016/0130489 A1 | 5/2016 | Gilmour | |
| 2016/0264463 A1* | 9/2016 | Dosier | .................... C04B 28/10 |
| 2020/0172438 A1* | 6/2020 | Fried | ...................... A01N 65/20 |
| 2023/0084712 A1 | 3/2023 | Fried et al. | |

FOREIGN PATENT DOCUMENTS

| | | | | |
|---|---|---|---|---|
| CL | 2015003598 A1 | 9/2016 | | |
| CL | 2021001921 A1 | 1/2022 | | |
| EP | 0305621 A2 | 3/1989 | | |
| EP | 2664596 A2 | 11/2013 | | |
| EP | 2838969 A1 | 2/2015 | | |
| WO | 2006066326 A1 | 6/2006 | | |
| WO | 2009151316 A2 | 12/2009 | | |
| WO | WO-2013086611 A1 * | 6/2013 | ............... | C09K 3/22 |
| WO | 2016145190 | 9/2016 | | |
| WO | 2016145190 A1 | 9/2016 | | |
| WO | WO-2019141880 A1 * | 7/2019 | ............. | A01N 25/34 |

OTHER PUBLICATIONS

Chilean Office Action issued on Nov. 17, 2023 for corresponding CL Application No. 202203266.
International Search Report and Written Opinion issued on Jun. 11, 2021 for corresponding PCT Application No. PCT/EP2021/063459.
Australian Examination Report issued Jul. 4, 2022 for corresponding Australian Application No. 2021202477.
European Examination Report issued on Mar. 1, 2021 for corresponding European Application No. 20176894.2.
European Examination Report issued on Sep. 9, 2021 for corresponding European Application No. 20176894.2.
European Search Report issued on Aug. 31, 2020 for corresponding European Application No. 20176894.2.
Indian Office Action issued on Jan. 19, 2023 for corresponding Indian Application No. 202247074462.

* cited by examiner

*Primary Examiner* — Marites A Guino-O Uzzle
(74) *Attorney, Agent, or Firm* — Leo&us; R. Amirsehhi

(57) ABSTRACT

The present invention relates primarily to the use of a mixture for reducing dust formation and/or erosion. The invention relates additionally to a method for reducing dust formation and/or erosion and also to a mixture suitable for this purpose.

14 Claims, 7 Drawing Sheets

BIOCEMENTATION MIXTURE FOR DUST CONTROL AND RELATED APPLICATIONS

CROSS-REFERENCE TO RELATED APPLICATIONS

Figure 1:
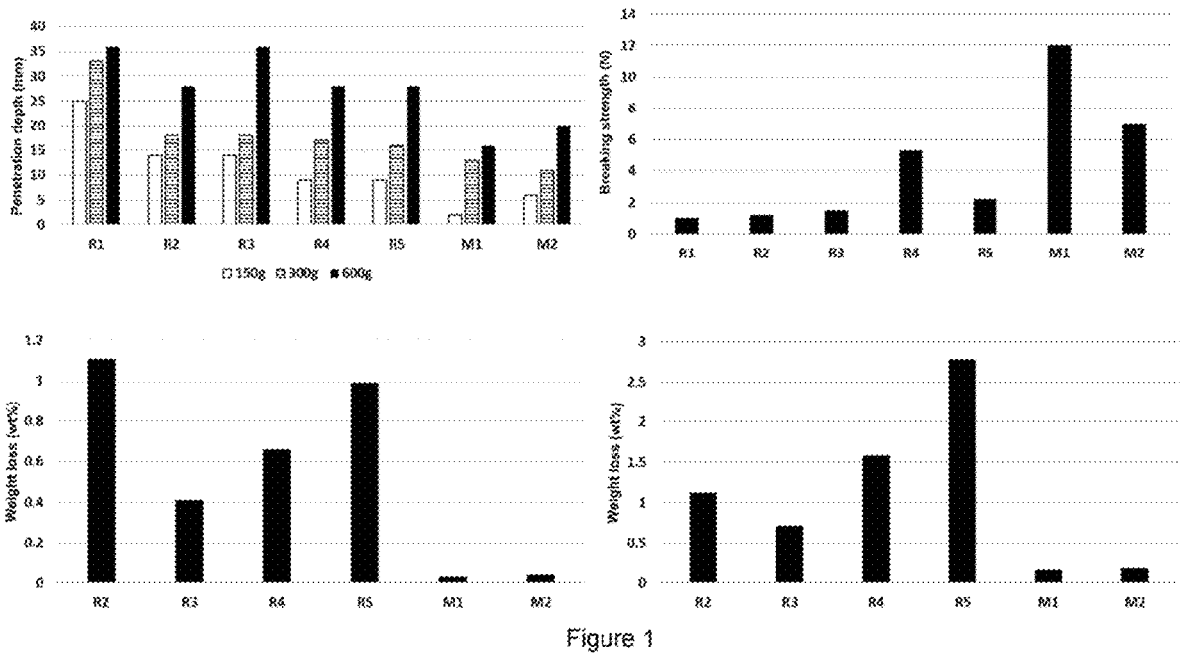

This application is a national stage application (under 35 U.S.C. § 371) of PCT/EP2021/063459, filed May 20, 2021, which claims benefit of European Application No. 20176894.2, filed May 27, 2020, which are incorporated herein by reference in their entireties.

The present invention relates primarily to the use of a mixture for reducing dust formation and/or erosion and also to a mixture suitable for this purpose. Further aspects, especially further uses, are apparent from the description hereinafter.

Dust is found almost everywhere. To a high degree it comes about as a result of untarmacked trafficways (roads, rails, airports), agricultural land, mining, including open cast mining, building sites, industrial land, landfills, etc. There are a series of disadvantages associated with ongoing dust exposure. For instance, dust is harmful to health and may be a cause of hayfever, allergies or pneumoconiosis. Dust is harmful to the environment; it transports and distributes noxiants such as chemicals, heavy metals, viruses and microorganisms. Dust harbours hazards for traffic when the dust hinders the view for traffic participants. Dust formation is usually the consequence of superficial removal of material. Unwanted removal of material is also associated with unwanted loss of material. Dust may settle in and on machinery (e.g. vehicles, construction machinery) and can bring about damage and reduced maintenance intervals particularly on moving parts.

For this reason, various measures have been proposed in the prior art for dust suppression.

They include covering with tarpaulins and the growing of vegetation. Both of these, however, are usually costly and not always possible. For instance, planting on trafficways such as roads is not an option.

A further proposal has been to increase the moisture content in the ground/substrate, for example by addition of water, brine, etc. (Naeimi M, Chu J, Environmental Science and Pollution Research 24.29. 2017. 23341-23350; Mayer, F D et al., Geo-frontiers 2011: Advances in geotechnical engineering. 2011. 4002-4011; Introduction in each case). A disadvantage of this technology is that the effect lasts only until the water fraction has evaporated. In hot and dry climate zones, this measure may therefore have a very short duration. In order to achieve long-lasting or even permanent effects, application may need to be repeated continually, which is laborious and expensive. A further disadvantage is that the salt solutions proposed are extremely corrosive towards metals (and therefore corrosive towards vehicles and machinery) and concrete. Because the salt solutions enter the soil and groundwater, moreover, the technology is decidedly harmful to the environment.

An alternative approach to dust control proposes the use of distillation residues (WO 2009/151316) or coal tar pitch (EP 0 305 621). Both substances, however, are toxic. On grounds of environmental protection, therefore, to spread them is unacceptable.

EP 2 838 969 proposes dust suppression using polymer dispersions. A disadvantage of the use of polymer dispersions, however, is that as a general rule they are not, or not readily, biodegradable.

According to a further measure, organic compounds such as lignin, lignosulfonates, surfactants, polyacrylamides, starch ethers, polyacrylonitriles, polyvinyl alcohols, polyacrylamides, carboxymethylcellulose and polyvinyl acetates are used to bind dust (Stabnikov V et al. Water Air Soil Pollut. 2013. 224:1631, Introduction). The greatest disadvantage stated in the prior art is the high cost, arising particularly in the case of extensive applications (Stabnikov V et al., supra, Table 2).

The aforesaid disadvantages were at least partly overcome with the microbial biocementation described in WO 2006/066326. The published specification discloses a method for forming high-strength biocement in a permeable starting material, with the starting material being admixed with an effective amount (i) of a urease-producing microorganism, (ii) urea and (iii) calcium ions. As a result of the urease-catalysed conversion of the urea into carbonate and the reaction thereof with the calcium ions provided, calcium carbonate is formed, and consolidates the starting material. Part of the description is to the effect that the method disclosed therein is suitable for applications in mining, in construction engineering or for the provision of specialist materials. In contrast to the conventional techniques described above, it is possible with biocementation to do partly or completely without the use of substances which are not biodegradable. There is no risk of damage to machinery, vehicles, etc., and the application costs are low (Stabnikov V et al., supra, Table 2).

One aspect associated with dust formation is soil erosion. Soil erosion is the excessive erosion of soils by wind and water, caused in particular by improper human land use, for example removal of the protective vegetation through overgrazing or deforestation, and also insufficient fallow periods. A particular problem in this context is the loss of the topsoil, which is the most fertile and agriculturally significant. Ongoing soil erosion results initially in a deterioration in the quality of the soil (soil degradation). The degradation may ultimately result in the complete loss of the agricultural utility of the soil (soil devastation). Soil erosion is a problem with far-reaching environmental, economic and societal consequences. Throughout the world, therefore, various soil protection measures have been initiated, but have so far been unable to eliminate the problem entirely.

A primary object of the present invention, therefore, was to provide measures for dust reduction and/or erosion reduction that at least partly overcome the disadvantages set out above and that achieve, by comparison with the known biocementation, an improved, especially longer-lasting dust reduction and/or erosion reduction. A further object of the present invention was to provide measures for dust reduction and/or erosion reduction that are better at maintaining the dust reduction and/or erosion reduction properties after mechanical exposure, so that the ground treated in this way is also accessible. Further objects of the present invention which are (additionally or alternatively) to be achieved are apparent from a study of the description, the claims and also, in particular, the examples section.

This object or these objects is or are achieved in accordance with the invention through the use of a mixture as specified in more detail here for reducing dust formation and/or erosion, and also by a mixture suitable for the purpose.

Further aspects and preferred configurations of the present invention are apparent from the observations below, from the examples appended, and especially from the appended claims.

In accordance with the invention the mixture as here described is suitable for biocementation. The term "biocementation" in the context of the present text represents consolidation and/or hardening of (permeable) substrates (as defined later on below in the context of the method of the invention). As a result, on/in these substrates, dust formation is prevented or reduced. Biocement in the context of this text is the product of the biocementation defined herein.

It is assumed that the said consolidation and/or hardening constitutes a process in which parts of the substrate on/in which dust formation is to be reduced or prevented are joined to one another by one or more binders, present in the mixture for use in accordance with the invention and/or formed from the constituents of said mixture, and in this way the substrate or parts of the substrate is or are consolidated and/or hardened (biocementation). The assumption more particularly is that the said consolidation and/or hardening represents an operation in which (living) organisms, parts thereof or enzymes which preferably are obtained from the said organisms or parts and/or are produced by them are used in order to form carbonate or to induce and/or catalyse carbonate formation. The carbonates formed join the parts of the substrate, or the substrate on/in which dust formation is to be reduced, with consequent consolidation and/or hardening of the substrate or parts thereof. In the context of this text, therefore, the carbonates formed represent a minimum constituent of the biocement.

Furthermore, in the context of the invention, the consolidation and/or hardening are modified as described below, by means of a water-soluble and/or water-dispersible and/or water-emulsifiable, cohesion-modifying compound.

The term "reducing dust formation" (presently also referred to for short as "dust control" and "dust suppression") refers in particular to a long-lasting reduction, or possibly complete reduction (i.e. prevention), of the raising of dust particles, preferably of dust formation which comes about in mining, in construction work, through utilization of unsurfaced trafficways and/or in agriculture, more preferably of dust formation which comes about as a result of the storage of spoil and/or dumps. The term "long-lasting" in this context is to be understood to mean that the emission-related weight loss of a model substrate after one minute of wind exposure in a wind tunnel at 12 m/s (ascertained under conditions and on a model substrate as described in Example 1) over a period of at least 24 hours, preferably at least 48 hours, more preferably at least 3 days and most preferably at least 4 days (after single application of the mixture of the invention), is in the same order of magnitude, i.e. the emission-related weight losses ascertained over the period differ relatively from one another by a factor of less than 10. To give an example, if the emission-related weight loss at the first time is 0.1% and 24 hours after the first time is 0.9%, the emission-related weight loss is within the same order of magnitude. If, in contrast, the emission-related weight loss at the first time is 0.1% and 24 hours after the first time is 1.0% or more, the emission-related weight loss is not within the same order of magnitude.

Since dust suppression results in a reduction in the erosion, the present invention also relates to the use for reducing erosion.

In accordance with the invention this is achieved primarily through aggregation of the dust particles to form larger aggregates, presently also referred to as consolidation. As a result of the aggregation, a crust is formed on the substrate surface, and prevents the swirling of the underlying particles. As described hereinafter, however, an (initially) firm crust does not allow any conclusions, or allows only inadequate conclusions, regarding the duration of the achievable dust suppression. It is therefore assumed that the dust-suppressing activity derives from a further effect.

In accordance with the invention the mixture comprises or consists of the following constituents:
  (i) one or more carbonate-forming organisms and/or enzymes
    (i.e. organisms and/or enzymes which are capable of forming carbonate or of inducing and/or catalysing carbonate formation);
  (ii) at least one substance for forming carbonate;
  (iii) at least one water-soluble and/or water-dispersible and/or water-emulsifiable, cohesion-modifying compound, selected from the group consisting of:
    compounds having calcium affinity, especially compounds having calcium-binding functional groups selected from carboxylic acids, carboxylates, carbonyls, alcohols, alkoxides, thiols, thiolates, sulfates, sulfonates, amines, amides, catechols, quinones, phosphates, phosphonates; and
    compounds having carbonate affinity, especially compounds having carbonate-binding functional groups consisting of cationic, anionic and/or neutral functional groups, more preferably comprising cations, more particularly mono- and polyvalent cations, for example quaternary ammonium compounds, mono-, di- or trivalent metal cations, carboxylic acids, sulfonic acids, peroxycarboxylic acids, thiocarboxylic acids, sulfinic acids, sulfenic acids, amides, amines, hydrazines and thiols;
  (iv) optionally: one or more cation sources; and
  (v) optionally: one or more adjuvants.

Merely for clarification it should be mentioned that mixtures according to the invention always contain different compounds and/or substances for constituents (ii) and (iii). This means that one and the same substance or one and the same compound in the same mixture cannot count both as constituent (ii) and as constituent (iii).

Since biocementation derives substantially from the activity of enzyme(s) and/or (living) organisms, which are frequently sensitive in their response to ambient conditions, it could not readily have been foreseen that the biocementation would proceed in the presence of further compounds at all, or at least to a technically relevant extent.

Unexpectedly, however, it in fact emerged that a mixture as described here leads to biocement with longer integrity and hence to improved dust control. A particularly noteworthy fact is that after just a few applications or even after only single application, these effects are achieved in a lasting way. The invention is based critically on the realization that an apparent initial correlation between breaking strength and dust suppression no longer exists after two days (although a correlation was observable in individual cases). By treatment of the ground with calcium lignosulfonate, for example, a thin, fragile layer is formed which, although firm, in fact no longer brings about dust suppression after breaking.

For this reason, a ground firmness determinable, for example, by way of the breaking strength is not suitable for making predictions as to the possible dust behaviour of treated ground over a prolonged period of time. This means that mixtures which lead to a less firm ground may nevertheless exhibit outstanding dust suppression properties. It can be assumed that for a long-lasting dust suppression, the ground/substrate cohesion in deeper layers plays a greater part or even the major part in comparison to an (initial) firmness of the surface. This is especially so after the sample has undergone mechanical stress. For long-lasting dust suppression it is important that the emission-reducing effect after mechanical exposure of the sample does not diminish.

In the mixture according to the invention, the substrate cohesion is achieved critically through the water-soluble and/or water-dispersible and/or water-emulsifiable, cohesion-modifying compound (also called cohesion-modifying compound for short below), with particularly effective dust control being achieved overall through the interaction of the constituents (i), (ii) and (iii).

A further advantage found for the mixtures for use in accordance with the invention is that they lead to particularly quick-hardening and/or particularly break-resistant biocement. This results in a further-improved dust control.

The term "water-soluble" in the context of constituent (iii) identifies a compound which has a solubility in water of at least 1 g/L, preferably at least 5 g/L, more preferably at least 10 g/L, more preferably at least 20 g/L, more preferably at least 50 g/L, most preferably at least 100 g/L, determined in each case at 20° C.

The term "water-dispersible" or "water-emulsifiable" in the context of constituent (iii) refers to a compound which is dispersible or emulsifiable, respectively, in water to an extent of at least 1 g/L, preferably at least 5 g/L, more preferably at least 10 g/L, more preferably at least 20 g/L, more preferably at least 50 g/L, most preferably at least 100 g/L, determined in each case at 20° C.

To determine the water solubility, water dispersibility or water emulsifiability of a compound, a procedure as follows can be used: for determining the water solubility of solid, pasty and gelatinous compounds (for example polyvinyl acetate 20, polycarbonate, long-chain fatty acids and starch), a defined amount of the compound (e.g. 5 g) is placed in a defined amount of water (e.g. 100 mL of distilled water) and stirred at 20° C. for 24 hours. This system is then filtered (e.g. using Homyl 80-120 μm quantitative filter paper). The filter paper is then expertly dried and weighed. The mass ascertained, minus the mass of the filter, is the mass of the residue in grams. The difference between the defined amount of the compound (e.g. 5 g) and the mass of the residue in grams divided by the defined amount of water (e.g. 0.1 L) gives the water solubility of the respective compound in g per litre.

For determining the water dispersibility of solid, pasty and gelatinous substances, a defined amount of the compound (e.g. 50 g) is placed in a defined amount of water (e.g. 1000 mL of distilled water) and homogenized at 20° C. (e.g. using DISPERMAT® LC75 dissolver at 15 000 revolutions per minute for 5 minutes). The mixture is then centrifuged (e.g. at 100 g for 2 min). The supernatant is decanted off and the precipitate is expertly dried and weighed. The mass ascertained is the mass of the precipitate after centrifuging. The difference between the defined amount of the compound (e.g. 50 g) and the mass of the precipitate after centrifuging divided by the defined amount of water (e.g. 1 L) is the water dispersibility of the substance.

For determining the water solubility or water emulsifiability of a liquid substance (for example rapeseed oil), the following procedure can be used: a defined amount of the compound (e.g. 5 g) is combined with a defined amount of water (e.g. 100 g of distilled water) and the system is stirred for 24 hours. The mixture is subsequently transferred to a separating funnel. The mixture is left to stand in the separating funnel for 5 minutes. If no phase separation occurs after this time, the mixture is left at rest for a further 2 hours, preferably a further 10 hours. If no phase separation occurs, the compound is deemed to be water soluble. The water solubility of the compound in this example is at least 50 grams per litre. If phase separation does occur, the phases are separated in the separating funnel and the organic phase is dried over sodium sulfate. The weight of the dried organic phase is determined (mass of the organic phase in grams). The difference between the defined amount of the compound (e.g. 5 g) and the mass of the organic phase in grams divided by the defined amount of water (e.g. 0.1 L) gives the water emulsifiability of the liquid compound.

A further-preferred separation technique for dispersed and undispersed fractions is centrifugation. After appropriate drying, it is possible to determine the mass of the residue in grams and also, from this, the water solubility or water dispersibility.

In order to achieve the desired dispersibility or to increase the dispersibility, it is possible and/or advantageous in the context of the invention to add a surface-active substance to the mixture, such as an emulsifier and/or dispersant and/or stabilizer. This procedure also opens up the possibility of achieving the effects described here, preferably synergistic effects, in relation to consolidation, even for cohesion-modifying compounds which have fairly poor dispersibility.

The term "cohesion-modifying" in the context of constituent (iii) presently identifies a compound which is present in the mixture in a minimum amount sufficient to modify the cohesive properties of a model substrate as described here (washed and dried silica sand with a grading of 0-2 mm; cf. Example 1). This means that a compound which fundamentally (in sufficiently high amount) has cohesion-modifying properties but is present at below the minimum amount in the mixture is not considered to be a constituent (iii). The term "modify" refers presently, in particular, to an increase in the forces of cohesion between the substrate particles. An indicator of cohesion-modifying properties is the presence of at least one chemical group which is capable of binding calcium and/or carbonate. Accordingly, one preferred cohesion-modifying compound has calcium affinity and/or carbonate affinity.

The water-soluble and/or water-dispersible and/or water-emulsifiable cohesion-modifying compounds specifically identified here are by definition compounds of constituent (iii) in the sense of the invention. The compounds specifically identified represent preferred embodiments in each case.

Whether another compound (test compound) is a constituent (iii) in the sense of the invention can be determined by determining the emission-related weight loss of the model substrate after one minute of wind exposure in a wind tunnel at 12 m/s (ascertained under conditions and on a model substrate as described in Example 1) at a pre-defined time after single application of a mixture which includes the test compound as well as the constituents (i) and (ii) (test value) and comparing it with the emission-related weight loss which occurs at the pre-defined time after single application of a corresponding mixture which does not include the compound under investigation (comparative value). The skilled person is aware that the effect may be dependent on the amount used. This comparison may therefore be made for different amounts of the test compound. If a test value is lower than the comparative value, the test compound in the amount tested is a compound which is cohesion-modifying in the sense of the invention. Through simple solubility trials (as known to the skilled person and also described in the present text) it is possible to determine whether the compound meets the required solubility profile.

The pre-defined time may be 24, 36, 48, 60 and/or 72 hours after application. The skilled person is aware that the water content has an effect on dust suppression. The inventors observed that the synergistic effect is particularly strong if the substrate is fully dried (after about 4 days). It is therefore preferable for testing to take place when the substrate is totally dried, i.e., for example, 3 days, 3.5 days, 4 days, 4.5 days or 5 days after application.

Whether the compound (test compound) is a constituent having calcium affinity can be tested by means of calcium affinity chromatography. This method goes back to Porath J et al. (Porath J et al. Nature. 1975. 258(5536):598-599). It is possible specifically to use a protocol based on that of Campbell J A Biochem Soc Trans. 1991. 19(4):3875: Sepharose 6 Fast Flow (GE Healthcare, Life Science) is layered into a column (9×100 mm) and washed four times with a calcium chloride solution (5 mg/mL). A wash consists of a volume which corresponds to the single column volume (defined herein). The gel is washed once with a Tris acetate buffer (pH 8.2, 0.1 M) with sodium chloride (0.1 M) in order to remove unbound calcium ions. The test compound is dissolved, emulsified or dispersed in the Tris acetate/sodium chloride buffer at a concentration of 1 g of test substance per litre. If the physicochemical properties of the test substance make it insoluble in the corresponding buffer, the skilled person will select a suitable buffer. The detection method used is absorption spectroscopy at a wavelength of 280 nm. The extinction coefficient for the test compound ought to be determined expertly in advance and ought to exceed $1000\,\mathrm{L}$ $\mathrm{mol}^{-1}\,\mathrm{cm}^{-1}$ or $40\,\mathrm{L}\,\mathrm{g}^{-1}\,\mathrm{cm}^{-1}$. Should this not be the case, the skilled person will choose a suitable wavelength at which the extinction coefficient does exceed the value described above. Should this not be the case at any wavelength, the amount eluted should be ascertained by gravimetric and/or atomic spectroscopy methods. The test substance is to be applied to the column. In this case, by way of the volume applied and the concentration of the test substance, the amount of the test substance used is determined, and is the usage amount of the test substance (defined herein). After the test substance has been loaded, the column is washed with the Tris acetate/sodium chloride buffer and sampling is commenced. The column is to be washed three times with the Tris acetate/sodium chloride buffer, and the fractions collected. The mass of test compound in the eluate is to be ascertained and added up using absorption spectroscopy. This sum total of the masses of test compound in the individual fractions is the eluted test compound (defined herein). The eluted test compound is to be divided by the usage amount of the test substance. If the ratio of these compounds is less than 0.98, the test compound exhibits calcium affinity. More preferably the column can be washed with an ethylenediaminetetraacetate (EDTA) solution (10 mM) four times, in order to elute the test compound having calcium affinity from the column. The amount of test compound in the eluate is to be ascertained and added up using absorption spectroscopy. This sum total is the EDTA-eluted test compound (defined herein). If the ratio of EDTA-eluted test compound to usage amount of the test substance is greater than 0.02, the compound is a compound having calcium affinity.

Whether the compound (test compound) is a constituent having carbonate affinity can be tested using the following assay: the test compound is dissolved, emulsified or dispersed in distilled water at a concentration of 1 g per litre; this solution is component A. Prepared as component B is a 200 g-per-litre sodium carbonate solution. One millilitre of the fully homogenized component A is added with stirring to ten millilitres of component B and the mixture is incubated for 48 h. If there is precipitation and/or copious evolution of gas, the compound is a compound having carbonate affinity (qualitative detection). This assay may also be conducted (semi-)quantitatively by means of Scheibler carbonate determination or a development of said technique (e.g. as described in Horvath, B. et al., A Simple Method for Measuring the Carbonate Content of Soils, Soil Science Society of America Journal 2005, 69, 1066-1068). For this purpose it is necessary to determine the volume of gas formed when the test substances are combined. The resulting precipitate is to be separated from the solution by centrifuging and dried. Subsequently the dried precipitate is admixed with acid and the resultant volume of gas is measured. If the sum total of the two measured gas volumes is greater than 0.1 mL of gas per 1 g of usage amount of the test substance, the compound in question has carbonate affinity. Further preferred are mixtures which are characterized in that the dust-suppressing effect brought about by the constituents (i), (ii) and (iii) (also referred to here as dust-reducing effect) is greater than the sum total of the dust-suppressing effect brought about by the constituents (i) and (ii) and the dust-suppressing effect brought about by the constituent (iii). In other words, the said preferred mixtures are synergistically acting mixtures which ensure particularly effective dust suppression over a long-lasting time period.

The dust-suppressing effect may be determined by determining the emission-related weight loss of the model substrate after one minute of wind exposure in a wind tunnel at 12 m/s (ascertained under conditions and on a model substrate as described in Example 1) at a defined time (e.g. 24 hours, 48 hours, 3 days, 4 days, etc.) after single application of the respective constituents.

Preferred mixtures comprise the following substances as constituent (ii):

urea and its salts; organic acids such as lactic acid and salts thereof, preferably carboxylates, and esters thereof; gluconic acid and salts thereof, preferably carboxylates, and esters thereof; acetic acid and salts thereof, preferably carboxylates, and esters thereof; formic acid and salts thereof, preferably carboxylates, and esters thereof, propanoic acid and salts thereof, preferably carboxylates, and esters thereof, butanoic acid and salts thereof, preferably carboxylates, and esters thereof, pentanoic acid and salts thereof, preferably carboxylates, and esters thereof, formic acid and salts thereof, preferably carboxylates, and esters thereof, maleic acid and salts thereof, preferably carboxylates, and esters thereof, succinic acid and salts thereof, preferably carboxylates, and esters thereof, pyruvic acid and salts thereof, preferably carboxylates, and esters thereof, acetoacetic acid and salts thereof, preferably carboxylates, and esters thereof, levulinic acid and salts thereof, preferably carboxylates, and esters thereof, oxalacetic acid and salts thereof, preferably carboxylates, and esters thereof, citric acid and salts thereof, preferably carboxylates, and esters thereof, fruit acids, preferably malic acid and salts thereof, preferably carboxylates, and esters thereof, citric acid and salts thereof, preferably carboxylates, and esters thereof, fumaric acid and salts thereof, preferably carboxylates, and esters thereof, gluconic acid and salts thereof, preferably carboxylates, and esters thereof, glycolic acid and salts thereof, preferably carboxylates, and esters thereof, mandelic acid and salts thereof, preferably carboxylates, and esters thereof, oxalic acid and salts thereof, preferably carboxylates, and esters thereof, salicylic acid and salts thereof, preferably carboxylates, and esters thereof, α-hydroxycaprylic acid and salts thereof, preferably carboxylates, and esters thereof, and tartaric acid and salts thereof, preferably carboxylates, and esters thereof; peptides, preferably containing non-proteinogenic amino acids, asparagine, alanine, glycine, lysine, glutamine and/or glutamic acid; amino acids, preferably non-proteinogenic amino acids, asparagine, alanine, glycine, lysine, glutamine and glutamic acid, and salts thereof, preferably carboxylates, and esters thereof; vegetable and animal complex substrates, especially peptone, yeast extract, meat extract, nutrient broth and casamino acid; industrial residual substance streams, especially corn steep liquor, lactose mother liquor, protein lysates, preferably from peas, meat, potatoes or tomatoes; anaerobic substrates, preferably carbon dioxide and methane.

Particularly preferred mixtures comprise as constituent (ii) urea, acetate, formate, lactate, propionate, pyruvate, glucose, sucrose, fructose, glycerol, gluconate, lactose, and/or amino acid(s).

Preferred mixtures comprise the following compounds as constituents (iii):

Lignosulfonate, especially calcium lignosulfonate, calcium formate, calcium propionate, calcium lactate, calcium acetate, calcium pyruvate, calcium salicylate, caseinate, albumin, alanine, asparagine, glycine, glutamine, glutamate, lysine, non-proteinogenic amino acids, yeast extract, albumin, polyvinyl alcohol, starch ether, magnesium sulfate, humic acid, alkali metal silicate, styrene-acrylate dispersion, polyvinyl acetate dispersion, polyacrylonitrile dispersion, polyacrylic acid, polyacrylamide, ethylene-vinyl acetate dispersion and styrene-butadiene dispersion.

Any reference in the present text to a (polymer) dispersion also encompasses the polymer in question.

In further-preferred mixtures, the constituents (ii) and (iii) (and optionally the optional constituent(s)) are composed of one of the following combinations:

| Constituent (ii) | Constituent (iii) | Optional constituents |
| --- | --- | --- |
| Urea | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Urea | Polyvinyl alcohol | Yeast extract, lignosulfonates, especially calcium lignosulfonate, calcium salts, amino acids, peptides, cellulose and derivatives thereof, starch and derivatives thereof |
| Urea | Lignosulfonates, especially calcium lignosulfonate | Yeast extract, polyvinyl alcohol, calcium salts, amino acids, peptides, cellulose and derivatives thereof, starch and derivatives thereof |
| Urea | Calcium formate | Yeast extract, lignosulfonates, especially calcium lignosulfonate, polyvinyl alcohol, calcium salts, amino acids, peptides, cellulose and derivatives thereof, starch and derivatives thereof |
| Urea | Calcium lactate | Yeast extract, lignosulfonates, especially calcium lignosulfonate, polyvinyl alcohol, calcium salts, amino acids, peptides, cellulose and derivatives thereof, starch and derivatives thereof |
| Urea | Calcium acetate | Yeast extract, lignosulfonates, especially calcium lignosulfonate, polyvinyl alcohol, calcium salts, amino acids, peptides, cellulose and derivatives thereof, starch and derivatives thereof |
| Urea | Calcium propionate | Yeast extract, lignosulfonates, especially calcium lignosulfonate, polyvinyl alcohol, calcium salts, amino acids, peptides, cellulose and derivatives thereof, starch and derivatives thereof |
| Urea | Starch ether | Yeast extract, lignosulfonates, especially calcium lignosulfonate, polyvinyl alcohol, calcium salts, amino acids, peptides, cellulose and derivatives thereof, starch and derivatives thereof |
| Urea | Starch ester | Yeast extract, lignosulfonates, especially calcium lignosulfonate, polyvinyl alcohol, calcium salts, amino acids, peptides, cellulose and derivatives thereof, starch and derivatives thereof |
| Urea | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Urea | Cellulose ester | Yeast extract, lignosulfonates, especially calcium lignosulfonate, polyvinyl alcohol, calcium salts, amino acids, peptides, cellulose and derivatives thereof, starch and derivatives thereof |
| Urea | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Urea | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Urea | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Urea | Polyacrylonitrile dispersion | Yeast extract, lignosulfonates, especially calcium lignosulfonate, polyvinyl alcohol, calcium salts, amino acids, peptides, cellulose and derivatives thereof, starch and derivatives thereof |
| Urea | Albumin | Yeast extract, lignosulfonates, especially calcium lignosulfonate, polyvinyl alcohol, calcium salts, amino acids, peptides, cellulose and derivatives thereof, starch and derivatives thereof |
| Urea | Alanine | Yeast extract, lignosulfonates, especially calcium lignosulfonate, polyvinyl alcohol, calcium salts, amino acids, peptides, cellulose and derivatives thereof, starch and derivatives thereof |
| Urea | Glycine | Yeast extract, lignosulfonates, especially calcium lignosulfonate, polyvinyl alcohol, calcium salts, amino acids, peptides, cellulose and derivatives thereof, starch and derivatives thereof |
| Urea | Glutamine | Yeast extract, lignosulfonates, especially calcium lignosulfonate, polyvinyl alcohol, calcium salts, amino acids, peptides, cellulose and derivatives thereof, starch and derivatives thereof |
| Urea | Lysine | Yeast extract, lignosulfonates, especially calcium lignosulfonate, polyvinyl alcohol, calcium salts, amino acids, peptides, cellulose and derivatives thereof, starch and derivatives thereof |
| Urea | Caseinate | Yeast extract, lignosulfonates, especially calcium lignosulfonate, polyvinyl alcohol, calcium salts, amino acids, peptides, cellulose and derivatives thereof, starch and derivatives thereof |
| Urea | Magnesium sulfate | Yeast extract, lignosulfonates, especially calcium lignosulfonate, polyvinyl alcohol, calcium salts, amino acids, peptides, cellulose and derivatives thereof, starch and derivatives thereof |
| Urea | Yeast extract | Another yeast extract, lignosulfonates, especially calcium lignosulfonate, polyvinyl alcohol, calcium salts, amino acids, peptides, cellulose and derivatives thereof, starch and derivatives thereof |
| Urea | Humic acid | Yeast extract, lignosulfonates, especially calcium lignosulfonate, polyvinyl alcohol, calcium salts, amino acids, peptides, cellulose and derivatives thereof, starch and derivatives thereof |
| Urea | Alkali metal silicate | Yeast extract, lignosulfonates, especially calcium lignosulfonate, polyvinyl alcohol, calcium salts, amino acids, peptides, cellulose and derivatives thereof, starch and derivatives thereof |
| Urea | Non-proteinogenic amino acids | Yeast extract, lignosulfonates, especially calcium lignosulfonate, polyvinyl alcohol, calcium salts, amino acids, peptides, cellulose and derivatives thereof, starch and derivatives thereof |
| Acetic acid | Lignosulfonates, especially calcium lignosulfonate | Yeast extract, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Acetic acid | Starch ether | Yeast extract, lignosulfonates, especially calcium lignosulfonate, polyvinyl alcohol, calcium salts, amino acids, peptides, cellulose and derivatives thereof, starch and derivatives thereof |
| Acetic acid | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Acetic acid | Polyvinyl alcohol | Yeast extract, lignosulfonates, especially calcium lignosulfonate, calcium salts, amino acids, peptides, cellulose and derivatives thereof, starch and derivatives thereof |
| Acetic acid | Humic acid | Yeast extract, lignosulfonates, especially calcium lignosulfonate, polyvinyl alcohol, calcium salts, amino acids, peptides, cellulose and derivatives thereof, starch and derivatives thereof |
| Acetic acid | Caseinate | Yeast extract, lignosulfonates, especially calcium lignosulfonate, polyvinyl alcohol, calcium salts, amino acids, peptides, cellulose and derivatives thereof, starch and derivatives thereof |
| Acetic acid | Lactic acid | Yeast extract, lignosulfonates, especially calcium lignosulfonate, polyvinyl alcohol, calcium salts, amino acids, peptides, cellulose and derivatives thereof, starch and derivatives thereof |
| Acetic acid | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Acetic acid | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Acetic acid | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Acetic acid | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Lactic acid | Lignosulfonates, especially calcium lignosulfonate | Yeast extract, polyvinyl alcohol, calcium salts, amino acids, peptides, cellulose and derivatives thereof, starch and derivatives thereof |
| Lactic acid | Starch ether | Yeast extract, lignosulfonates, especially calcium lignosulfonate, polyvinyl alcohol, calcium salts, amino acids, peptides, cellulose and derivatives thereof, starch and derivatives thereof |
| Lactic acid | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Lactic acid | Polyvinyl alcohol | Yeast extract, lignosulfonates, especially calcium lignosulfonate, calcium salts, amino acids, peptides, cellulose and derivatives thereof, starch and derivatives thereof |
| Lactic acid | Humic acid | Yeast extract, lignosulfonates, especially calcium lignosulfonate, polyvinyl alcohol, calcium salts, amino acids, peptides, cellulose and derivatives thereof, starch and derivatives thereof |
| Lactic acid | Caseinate | Yeast extract, lignosulfonates, especially calcium lignosulfonate, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Lactic acid | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Lactic acid | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Lactic acid | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Lactic acid | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Non-proteinogenic amino acid | Lignosulfonates, especially calcium lignosulfonate | Yeast extract, polyvinyl alcohol, calcium salts, amino acids, peptides, cellulose and derivatives thereof, starch and derivatives thereof |
| Non-proteinogenic amino acid | Starch ether | Yeast extract, polyvinyl alcohol, calcium salts, amino acids, peptides, cellulose and derivatives thereof, starch and derivatives thereof |
| Non-proteinogenic amino acid | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Non-proteinogenic amino acid | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Non-proteinogenic amino acid | Humic acid | Yeast extract, lignosulfonates, especially calcium lignosulfonate, calcium salts, amino acids, peptides, cellulose and derivatives thereof, starch and derivatives thereof |
| Non-proteinogenic amino acid | Caseinate | Yeast extract, lignosulfonates, especially calcium lignosulfonate, polyvinyl alcohol, calcium salts, amino acids, peptides, cellulose and derivatives thereof, starch and derivatives thereof |
| Non-proteinogenic amino acid | Lactic acid | Yeast extract, lignosulfonates, especially calcium lignosulfonate, polyvinyl alcohol, calcium salts, amino acids, peptides, cellulose and derivatives thereof, starch and derivatives thereof |
| Non-proteinogenic amino acid | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Non-proteinogenic amino acid | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Non-proteinogenic amino acid | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Non-proteinogenic amino acid | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Alanine | Lignosulfonates, especially calcium lignosulfonate | Yeast extract, polyvinyl alcohol, calcium salts, amino acids, peptides, cellulose and derivatives thereof, starch and derivatives thereof |
| Alanine | Starch ether | Yeast extract, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Alanine | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Alanine | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Alanine | Humic acid | Yeast extract, lignosulfonates, especially calcium lignosulfonate, calcium salts, amino acids, peptides, cellulose and derivatives thereof, starch and derivatives thereof |
| Alanine | Caseinate | Yeast extract, lignosulfonates, especially calcium lignosulfonate, polyvinyl alcohol, calcium salts, amino acids, peptides, cellulose and derivatives thereof, starch and derivatives thereof |
| Alanine | Lactic acid | Yeast extract, lignosulfonates, especially calcium lignosulfonate, polyvinyl alcohol, calcium salts, amino acids, peptides, cellulose and derivatives thereof, starch and derivatives thereof |
| Alanine | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Alanine | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Alanine | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Alanine | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Glycine | Lignosulfonates, especially calcium lignosulfonate | Yeast extract, polyvinyl alcohol, calcium salts, amino acids, peptides, cellulose and derivatives thereof, starch and derivatives thereof |
| Glycine | Starch ether | Yeast extract, polyvinyl alcohol, calcium salts, amino acids, peptides, cellulose and derivatives thereof, starch and derivatives thereof |
| Glycine | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Glycine | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Glycine | Humic acid | Yeast extract, lignosulfonates, especially calcium lignosulfonate, calcium salts, amino acids, peptides, cellulose and derivatives thereof, starch and derivatives thereof |
| Glycine | Caseinate | Yeast extract, lignosulfonates, especially calcium lignosulfonate, polyvinyl alcohol, calcium salts, amino acids, peptides, cellulose and derivatives thereof, starch and derivatives thereof |
| Glycine | Lactic acid | Yeast extract, lignosulfonates, especially calcium lignosulfonate, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Glycine | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Glycine | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Glycine | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Glycine | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Lysine | Lignosulfonates, especially calcium lignosulfonate | Yeast extract, polyvinyl alcohol, calcium salts, amino acids, peptides, cellulose and derivatives thereof, starch and derivatives thereof |
| Lysine | Starch ether | Yeast extract, polyvinyl alcohol, calcium salts, amino acids, peptides, cellulose and derivatives thereof, starch and derivatives thereof |
| Lysine | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Lysine | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Lysine | Humic acid | Yeast extract, lignosulfonates, especially calcium lignosulfonate, calcium salts, amino acids, peptides, cellulose and derivatives thereof, starch and derivatives thereof |
| Lysine | Caseinate | Yeast extract, lignosulfonates, especially calcium lignosulfonate, polyvinyl alcohol, calcium salts, amino acids, peptides, cellulose and derivatives thereof, starch and derivatives thereof |
| Lysine | Lactic acid | Yeast extract, lignosulfonates, especially calcium lignosulfonate, polyvinyl alcohol, calcium salts, amino acids, peptides, cellulose and derivatives thereof, starch and derivatives thereof |
| Lysine | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Lysine | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Lysine | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Lysine | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Asparagine | Lignosulfonates, especially calcium lignosulfonate | Yeast extract, polyvinyl alcohol, calcium salts, amino acids, peptides, cellulose and derivatives thereof, starch and derivatives thereof |
| Asparagine | Starch ether | Yeast extract, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Asparagine | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Asparagine | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Asparagine | Humic acid | Yeast extract, lignosulfonates, especially calcium lignosulfonate, calcium salts, amino acids, peptides, cellulose and derivatives thereof, starch and derivatives thereof |
| Asparagine | Caseinate | Yeast extract, lignosulfonates, especially calcium lignosulfonate, polyvinyl alcohol, calcium salts, amino acids, peptides, cellulose and derivatives thereof, starch and derivatives thereof |
| Asparagine | Lactic acid | Yeast extract, lignosulfonates, especially calcium lignosulfonate, polyvinyl alcohol, calcium salts, amino acids, peptides, cellulose and derivatives thereof, starch and derivatives thereof |
| Asparagine | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Asparagine | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Asparagine | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Asparagine | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Glutamine | Lignosulfonates, especially calcium lignosulfonate | Yeast extract, polyvinyl alcohol, calcium salts, amino acids, peptides, cellulose and derivatives thereof, starch and derivatives thereof |
| Glutamine | Starch ether | Yeast extract, polyvinyl alcohol, calcium salts, amino acids, peptides, cellulose and derivatives thereof, starch and derivatives thereof |
| Glutamine | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Glutamine | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Glutamine | Humic acid | Yeast extract, lignosulfonates, especially calcium lignosulfonate, calcium salts, amino acids, peptides, cellulose and derivatives thereof, starch and derivatives thereof |
| Glutamine | Caseinate | Yeast extract, lignosulfonates, especially calcium lignosulfonate, polyvinyl alcohol, calcium salts, amino acids, peptides, cellulose and derivatives thereof, starch and derivatives thereof |
| Glutamine | Lactic acid | Yeast extract, lignosulfonates, especially calcium lignosulfonate, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Glutamine | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Glutamine | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Glutamine | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Glutamine | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Glutamate | Lignosulfonates, especially calcium lignosulfonate | Yeast extract, polyvinyl alcohol, calcium salts, amino acids, peptides, cellulose and derivatives thereof, starch and derivatives thereof |
| Glutamate | Starch ether | Yeast extract, polyvinyl alcohol, calcium salts, amino acids, peptides, cellulose and derivatives thereof, starch and derivatives thereof |
| Glutamate | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Glutamate | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Glutamate | Humic acid | Yeast extract, lignosulfonates, especially calcium lignosulfonate, calcium salts, amino acids, peptides, cellulose and derivatives thereof, starch and derivatives thereof |
| Glutamate | Caseinate | Yeast extract, lignosulfonates, especially calcium lignosulfonate, polyvinyl alcohol, calcium salts, amino acids, peptides, cellulose and derivatives thereof, starch and derivatives thereof |
| Glutamate | Lactic acid | Yeast extract, lignosulfonates, especially calcium lignosulfonate, polyvinyl alcohol, calcium salts, amino acids, peptides, cellulose and derivatives thereof, starch and derivatives thereof |
| Glutamate | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Glutamate | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Glutamate | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Glutamate | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Propionic acid | Lignosulfonates, especially calcium lignosulfonate | Yeast extract, polyvinyl alcohol, calcium salts, amino acids, peptides, cellulose and derivatives thereof, starch and derivatives thereof |
| Propionic acid | Starch ether | Yeast extract, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Propionic acid | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Propionic acid | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Propionic acid | Humic acid | Yeast extract, lignosulfonates, especially calcium lignosulfonate, calcium salts, amino acids, peptides, cellulose and derivatives thereof, starch and derivatives thereof |
| Propionic acid | Caseinate | Yeast extract, lignosulfonates, especially calcium lignosulfonate, polyvinyl alcohol, calcium salts, amino acids, peptides, cellulose and derivatives thereof, starch and derivatives thereof |
| Propionic acid | Lactic acid | Yeast extract, lignosulfonates, especially calcium lignosulfonate, polyvinyl alcohol, calcium salts, amino acids, peptides, cellulose and derivatives thereof, starch and derivatives thereof |
| Propionic acid | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Propionic acid | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Propionic acid | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Propionic acid | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Formic acid | Lignosulfonates, especially calcium lignosulfonate | Yeast extract, polyvinyl alcohol, calcium salts, amino acids, peptides, cellulose and derivatives thereof, starch and derivatives thereof |
| Formic acid | Starch ether | Yeast extract, polyvinyl alcohol, calcium salts, amino acids, peptides, cellulose and derivatives thereof, starch and derivatives thereof |
| Formic acid | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Formic acid | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Formic acid | Humic acid | Yeast extract, lignosulfonates, especially calcium lignosulfonate, calcium salts, amino acids, peptides, cellulose and derivatives thereof, starch and derivatives thereof |
| Formic acid | Caseinate | Yeast extract, lignosulfonates, especially calcium lignosulfonate, polyvinyl alcohol, calcium salts, amino acids, peptides, cellulose and derivatives thereof, starch and derivatives thereof |
| Formic acid | Lactic acid | Yeast extract, lignosulfonates, especially calcium lignosulfonate, polyvinyl alcohol, calcium salts, amino acids, peptides, cellulose and derivatives thereof, starch and derivatives thereof |

-continued

| Constituent (ii) | Constituent (iii) | Optional constituents |
|---|---|---|
| Formic acid | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Formic acid | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Formic acid | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Formic acid | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |
| Yeast extract | Lignosulfonates, especially calcium lignosulfonate | Yeast extract, polyvinyl alcohol, calcium salts, amino acids, peptides, cellulose and derivatives thereof, starch and derivatives thereof |
| Yeast extract | Starch ether | Yeast extract, polyvinyl alcohol, calcium salts, amino acids, peptides, cellulose and derivatives thereof, starch and derivatives thereof |
| Yeast extract | Cellulose ether | Yeast extract, lignosulfonates, especially calcium lignosulfonate, polyvinyl alcohol, calcium salts, amino acids, peptides, cellulose and derivatives thereof, starch and derivatives thereof |
| Yeast extract | Polyvinyl alcohol | Yeast extract, lignosulfonates, especially calcium lignosulfonate, polyvinyl alcohol, calcium salts, amino acids, peptides, cellulose and derivatives thereof, starch and derivatives thereof |
| Yeast extract | Humic acid | Yeast extract, lignosulfonates, especially calcium lignosulfonate, calcium salts, amino acids, peptides, cellulose and derivatives thereof, starch and derivatives thereof |
| Yeast extract | Caseinate | Yeast extract, lignosulfonates, especially calcium lignosulfonate, polyvinyl alcohol, calcium salts, amino acids, peptides, cellulose and derivatives thereof, starch and derivatives thereof |
| Yeast extract | Lactic acid | Yeast extract, lignosulfonates, especially calcium lignosulfonate, polyvinyl alcohol, calcium salts, amino acids, peptides, cellulose and derivatives thereof, starch and derivatives thereof |
| Yeast extract | Styrene-butadiene dispersion | Yeast extract, lignosulfonates, especially calcium lignosulfonate, polyvinyl alcohol, calcium salts, amino acids, peptides, cellulose and derivatives thereof, starch and derivatives thereof |
| Yeast extract | Ethylene-vinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Yeast extract | Polyvinyl acetate dispersion | Yeast extract, lignosulfonates, especially calcium lignosulfonate, polyvinyl alcohol, calcium salts, amino acids, peptides, cellulose and derivatives thereof, starch and derivatives thereof |
| Yeast extract | Styrene-acrylate dispersion | Yeast extract, lignosulfonates, especially calcium lignosulfonate, polyvinyl alcohol, calcium salts, amino acids, peptides, cellulose and derivatives thereof, starch and derivatives thereof |

Unless otherwise indicated, the substances (acids) stated here in the text may also be present in the form of a salt, preferably carboxylate, or ester.

The skilled person is aware that the usage amount of constituent (iii) is heavily dependent on its own (e.g. phys-icochemical) properties and on the properties of the other constituents of the mixture for use in accordance with the invention, and also on the properties of the substrate, and will accordingly choose suitable combinations and usage amounts of constituent (iii). Where a compound of constituent (iii) is present in a culture medium in which constituent (i) is present as bacterial culture, the amount thereof is usually too low to achieve the desired effects. The amount introduced by the bacterial culture is customarily so low that the compound is present only in traces in the resulting mixture.

In preferred mixtures, constituent (iii) is present in an amount of at least 0.5 wt %, preferably at least 1.0 wt %, more preferably at least 1.5 wt %, more preferably at least 2.0 wt %, more preferably at least 2.5 wt % and most preferably at least 3.0 wt %, based in each case on the total mass of the constituents (i), (ii) and (iii). In preferred mixtures, constituent (iii) is present in an amount of at most 85 wt %, preferably at most 75 wt %, more preferably at most 65 wt %, more preferably at most 55 wt %, more preferably at most 45 wt % and most preferably at most 35 wt %, based in each case on the total mass of the constituents (i), (ii) and (iii). In particularly preferred mixtures, constituent (iii) is present in an amount of 0.5 to 85 wt %, preferably 1.0 to 75 wt %, more preferably 1.5 to 65 wt %, more preferably 2.0 to 55 wt %, more preferably 2.5 to 45 wt % and most preferably 3.0 to 30 wt %, based in each case on the total mass of the constituents (i), (ii) and (iii).

Preference is further given to mixtures in which the constituent (iii) is selected from the group consisting of:
(iii-1) (bio)polymers selected from the group consisting of:
cellulose and derivatives thereof, starch and derivatives thereof, lignins and derivatives thereof, especially lignosulfonates and kraft lignins, pectins and derivatives thereof, humic acids and derivatives thereof;
chitin and its derivatives, chitosan and its derivatives, cyclodextrins and derivatives thereof, dextrins and derivatives thereof,
natural adhesives, hydrogel-formers, cold-soluble and/ or hot-soluble (vegetable) glues, latex, rubber, and derivatives thereof;
protein sources and/or peptides which contain at least one of the following amino acids: alanine, glycine, lysine, asparagine, glutamine, glutamate, a non-proteinogenic amino acid; starch ethers and starch esters, yeasts and their derivatives and extracts;
liquid and dried polymer dispersions or polymers comprising or consisting of acids, especially acid anhydrides, sulfonic acids, sulfinic acids, sulfenic acids, carboxylic acids, peroxycarboxylic acids and thiocarboxylic acids and also their salts, sulfoxides, cyanates, thiocyanates, esters, ethers, thioethers, oxiranes, thiranes, amines, imines, hydrazines, hydrazones, amides, sulfates, nitriles, aldehydes, thioaldehydes, ketones, thioketones, oximes, alcohols, thiols, radicals, halogens, silanes, siloxanes, phosphates, phosphonates, alkyls, allyls and aryls, and also derivatives thereof,
(iii-2) (poly)saccharides and extracellular polymeric substances (EPS) and in each case their derivatives, selected from the group consisting of microbial exopolysaccharides, preferably comprising or consisting of lactose, sucrose, glucose, glucosamine, mannose, glycerol, acetate, gluconate, fructose, inulin and combinations thereof;
(iii-3) carboxylic acids selected from the group consisting of formic acid, maleic acid, succinic acid, butanoic acid, propanoic acid, acetic acid, pyruvic acid, acetoacetic acid, levulinic acid, oxalacetic acid, citric acid, fruit acids, preferably malic acid, citric acid, fumaric acid, gluconic acid, glycolic acid, mandelic acid, oxalic acid, salicylic acid, $\alpha$-hydroxycaprylic acid and tartaric acid, fatty acids, preferably short-chain and medium-chain fatty acids, and lactic acid and in each case their salts, preferably carboxylates, and their esters,
(iii-4) inorganic binders, minerals and salts, selected from the group consisting of cement, including its derivatives, preferably CEM I, CEM II, CEM III, CEM IV, CEM V, CEM VI, alumina cement, magnesia cement, phosphate cement, gypsum, sodium, potassium and lithium silicates and also further waterglass derivatives, calcium carbonate and its derivatives, aluminium oxide, aluminium hydroxide, calcium sulfate, calcium hydroxide, calcium oxide, magnesium sulfate, microsilica, kaolins, bentonites and (hydrated) lime;
(iii-5) amino acids selected from the group consisting of alanine, glycine, lysine, asparagine, glutamine, glutamate, non-proteinogenic amino acid and in each case their salts, preferably carboxylates, and their esters and amides.

The term "polymer" as defined herein covers all water-soluble and/or water-dispersible and/or water-emulsifiable (as defined here) polymers. Polymer dispersions constitute a subgroup of the polymers.

In certain embodiments, the liquid or dried polymer dispersion or the liquid or dried polymer is a polymer or copolymer which contains a monomer from the following monomers or is composed of two or more different monomers of the following monomers: ethylene, propene, butadiene, butene, styrene, isoprene (and also further allylic and acrylic monomers), acrylic acid and salts thereof, preferably carboxylates, and esters thereof, vinyl monomers, such as vinyl acetate, vinyl chloride, vinyl neodecanoate, vinylpyrrolidone and vinylimidazole and each of their derivatives, isocyanic acid and salts thereof, more preferably cyanates, especially mono-, di- and polyisocyanates, alcohols, preferably polyhydric alcohols, more preferably diols, triols and tetraols, amines, preferably polyfunctional amines, more preferably diamines, triamines, tetraamines, especially diaminobenzene, ethylenediamine and diethylenetriamine, epichlorohydrin, bisphenols, preferably bisphenol A and bisphenol F, 2-ethyl-2-oxazoline, ethylene oxide, propylene oxide, urea, melamine, phenol, formaldehyde, siloxane, tetramethylsilane, trimethylchlorosilane, dimethyldichlorosilane, methyltrichlorosilane, tetrachlorosilane, acrylonitrile, maleic acid, hydroxy acids, preferably hydroxy fatty acids, dicarboxylic acids, preferably oxalic acid, malonic acid, succinic acid, glutaric acid, adipic acid, pimelic acid, suberic acid, azelaic acid, sebacic aid and terephthalic acid, acrylamide, amino acids, non-proteinogenic amino acids, monosaccharides, disaccharides, oligosaccharides, and also derivatives thereof.

In further-preferred mixtures the constituent (iii) is selected from the group consisting of:
calcium lignosulfonate, sodium lignosulfonate, potassium lignosulfonate, magnesium lignosulfonate, ammonium lignosulfonate, kraft lignins, humic acid and salts thereof, preferably carboxylates and derivatives thereof,
fibres and fibre substances, selected from the group consisting of cellulose fibres, wood fibres and wood cellulose fibres,
gum arabic, xanthan, alginates and agar,
protein sources and/or amino acids selected from the group consisting of casein, albumin, yeast extracts, peptones, caseinate, calcium caseinate, milk powder, alanine, glycine, lysine, asparagine, glutamine, glutamate, non-proteinogenic amino acid, residual substances and industrial substances selected from the group consisting of corn steep liquor, lactose mother liquors, protein lysates, molasses, protein wastes, preferably from yeast production, meat production, fruit production, vegetable production, dairy industry and papermaking, liquid and dried polymer dispersions or polymers selected from the group consisting of polyhydroxybutyrate, polylactide, polybutylenesuccinate, polyacrylic acid, polymethacrylate, poly(2-hydroxyethyl methacrylate), polyvinyl alcohol, polyvinyl acetate, polyvinylpyrrolidone, poly(2-ethyl-2-oxazoline), polystyrene, polyamide, styrene-butadienes, styrene-acrylates, styrenes, acrylates, acrylic acids, vinyl acetates, isocyanates, epoxides and polyamino acids. In particularly preferred mixtures, the constituent (iii) is selected from the group consisting of lignosulfonate, especially calcium lignosulfonate, yeast extract, albumin, starch ether, alanine, lysine, styrene-acrylate dispersion, polyvinyl alcohol, polyvinyl acetate dispersion, styrene-butadiene dispersion, humic acid, alkali metal silicate and combinations thereof.

Further preferred are mixtures in which the constituent (ii) is selected from the group consisting of:

urea and its salts; organic acids such as lactic acid and salts thereof, preferably carboxylates, and esters thereof; gluconic acid and salts thereof, preferably carboxylates, and esters thereof; acetic acid and salts thereof, preferably carboxylates, and esters thereof; formic acid and salts thereof, preferably carboxylates, and esters thereof; propanoic acid and salts thereof, preferably carboxylates, and esters thereof; butanoic acid and salts thereof, preferably carboxylates, and esters thereof; pentanoic acid and salts thereof, preferably carboxylates, and esters thereof; peptides, preferably containing non-proteinogenic amino acids, asparagine, alanine, glycine, lysine, glutamine and/or glutamic acid; amino acids, preferably non-proteinogenic amino acids, asparagine, alanine, glycine, lysine, glutamine and glutamic acid, and salts thereof, preferably carboxylates, and esters thereof; vegetable and animal complex substrates, especially peptone, yeast extract, meat extract, nutrient broth and casamino acid; industrial residual substrate streams, especially corn steep liquor, lactose mother liquor, protein lysates, preferably from peas, meat, potatoes or tomatoes; anaerobic substrates, preferably carbon dioxide and methane, with the proviso that the constituents (ii) and (iii) are different from one another.

Preference is given to a use as described above wherein the mixture is present in liquid form, as gel, paste or as powder.

The mixture for use in accordance with the invention may be present and/or employed in the form of a liquid, gelatinous, pasty or pulverulent mixture or in the form of two, three, four or more separate liquid and/or gelatinous and/or pasty and/or pulverulent premixes, which are mixed with one another before or during the use.

Especially in the form of a powder, the mixture or premixes advantageously has or have a particularly long storage stability, preferably of at least 12 to 24 months.

A powder form of the mixture or premix may be obtained by standard methods familiar to the skilled person, as for example by spray drying, freeze drying, (low-temperature) vacuum drying, fluidized bed drying and/or with the aid of filtration using filter aids.

"Pulverulent" in the context of this text means that the amount of liquid components, preferably of water, in the mixture is 10 wt % or less, preferably 5 wt % or less, preferably 2.5 wt % or less, more preferably 1.0 wt % or less, most preferably 0.1 wt % or less, based on the total weight of the premix or mixture for use in accordance with the invention.

The amount of liquid components, preferably of water, in the mixture or premix may be determined by standard methods known to the skilled person. For example, a gravimetric assay of the liquid components may be carried out, in which the sample taken is weighed, then heated to drying at a temperature above the boiling point of liquid components for a sufficient time, and subsequently weighed again. From the difference in weight before and after drying it is possible to determine the amount in wt % of liquid components, preferably of water.

According to another embodiment, the mixture for use in accordance with the invention may also be present and/or employed in the form of a gelatinous or pasty mixture or in the form of two, three, four or more separate solid and/or liquid and/or gelatinous and/or pasty premixes, which are mixed with one another before or during the use.

A use of the mixture in accordance with the invention leads advantageously to a biocement layer thickness which is particularly suitable for the purposes described herein. Preferably in this case a biocement layer having a thickness of at least 1 mm is obtained, preferably of at least 3 mm, more preferably of at least 10 mm. It is further preferred if the layer thickness is not more than 100 mm, preferably not more than 50 mm, more preferably not more than 35, more preferably not more than 30 mm. As a result it is particularly preferred if the layer thickness of the biocement layer formed overall is in the range from 1 mm to 100 mm, preferably from 10 mm to 50 mm, more preferably from 10 mm to 35 mm, more preferably 10 to 30 mm. The layer thickness of the biocement layer covers the region of the substrate which is consolidated by the addition of the mixture. The thickness of the biocement layer can be determined by manual measurement after mechanical breaking of the layer, by means of a calliper. Alternatively, depending on the thickness of the consolidation, it is possible to use various (non-destructive) measurement methods from construction, agriculture, geology or other fields of use (e.g. manual instrument MIT-SCAN-T2).

According to a further preferred embodiment, a use of the mixture in accordance with the invention as described herein leads to a biocement layer which is water-pervious, i.e. water-permeable or water-semipermeable. This is particularly advantageous since, for example, rainwater outside is able without hindrance, in the biocemented region as well, to penetrate into the biocement layer formed and to run off. The water permeability of a sample is conventionally reported as the flow of water through the sample in a defined time period. It may be expressed as a permeability rate (in cm/h, mm/h or cm/day) or alternatively in the form of the coefficient of permeability (in m/s). The statement of the coefficient of permeability allows a sample, preferably a soil sample, to be categorized for example as (water-)permeable, (water-)semipermeable and (water-)impermeable.

In the context of the present text, the term "water-permeable biocement layer" represents a biocement layer having a coefficient of (water) permeability of greater than $10^{-5}$ to $10^{0}$ m/s, and the term "water-semipermeable biocement layer" represents a biocement layer having a coefficient of (water) permeability of greater than $10^{-9}$ to $10^{-5}$ m/s, and the term "water-impermeable biocement layer" represents a biocement layer having a coefficient of (water) permeability of $10^{-11}$ (or less) to $10^{-9}$ m/s. Common methods for determining the coefficient of permeability encompass laboratory methods (e.g. rammed core probes and subsequent determination of the water-saturated permeability in the laboratory) and field methods (e.g. determination of the infiltration rate using a double ring infiltrometer).

One preferred embodiment pertains to the use of a mixture as defined herein, wherein the biocement layer formed has a coefficient of (water) permeability of greater than $10^{-9}$ to $10^{0}$ m/s, preferably of greater than $10^{-9}$ to $10^{-3}$ m/s, more preferably of greater than $10^{-8}$ to $10^{-3}$ m/s.

The use according to the invention shows a robust functionality under real (environmental) conditions, is easy to employ (often through a single application), and allows a reduction in or avoidance of toxic substances. Furthermore, it can also be combined with other measures for dust suppression. In certain cases it may be desirable to reverse the consolidation. The use according to the invention is advantageously reversible, meaning that the biocementation of the substrate or of parts of the substrate can as and when required be reversed, for example, through the application of suitable acids or by mechanical breaking. The substrate or parts of a substrate can be made available in this way, for example, for the growing of crop plants. One embodiment, therefore, pertains to the use of a mixture as defined herein wherein the biocementation of the substrate or of parts of the substrate can be reversed or preferably is reversed.

Preference is given to a use as described above, wherein one or the, two or more or all of the organisms is/are selected from the group consisting of microorganisms, preferably selected from the group consisting of microorganisms of the phylum Firmicutes, preferably of the class Bacilli, preferably of the order Bacillales, preferably of the families Planococcaceae or Bacillaceae, preferably of the genera *Sporosarcina, Lysinibacillus* or *Bacillus*, preferably selected from the species *Sporosarcina pasteurii, Sporosarcina ureae, Lysinibacillus sphaericus, Lysinibacillus fusiformis, Bacillus megaterium, Lysinibacillus* sp., *Bacillus pseudofirmus, Bacillus halodurans* or *Bacillus cohnii*; and microorganisms of the phylum Proteobacteria, preferably of the classes Alphaproteobacteria, Gammaproteobacteria, Deltaproteobacteria or Epsilonproteobacteria, preferably of the orders Enterobacteriales, Myxococcales, Campylobacterales, Pseudomonadales or Caulobacterales, preferably of the families Enterobacteriaceae, Myxococcaceae, Helicobacteraceae, Pseudomonadaceae or Caulobacteraceae, preferably of the genera *Proteus, Myxococcus, Helicobacter, Pseudomonas* or *Brevundimonas*, preferably selected from the species *Proteus vulgaris, Proteus mirabilis, Myxococcus xanthus, Helicobacter pylori, Pseudomonas aeruginosa* or *Brevundimonas diminuta*; and microorganisms of the phylum Actinobacteria, preferably of the class Actinobacteria, preferably of the order Actinomycetales, preferably of the families Brevibacteriaceae or Micrococcineae, preferably of the genera *Brevibacterium* or Micrococcaceae, preferably selected from the species *Brevibacterium linens* or *Arthrobacter crystallopoietes*; and microorganisms of the phylum Cyanobacteria, preferably of the class Cyanobacteria, preferably of the order Synechococcales, preferably of the family Synechococcaceae, preferably of the genus Synechococcus, preferably of the species Synechococcus; and aerobic bacteria, anaerobic bacteria, facultatively anaerobic bacteria and intermediate stages thereof.

Also encompassed by this are all variants, serotypes, mutants and spores, and also any derived genetically modified microorganisms.

The aforesaid organism or organisms, preferably microorganisms, may (together or separately from one another) be present in liquid(s) such as, for example, buffer solutions, solvents, nutrient media and/or mixtures thereof, and these mixtures may also be freeze-dried mixtures, or may be present in powder form.

According to the present invention, the organism or organisms which is/are capable of forming carbonate or of inducing and/or catalysing carbonate formation is or are part of the mixture used.

Alternatively it is conceivable and is likewise provided in the context of the invention that (indigenous) organisms which are present in the substrate to be treated, preferably soil, and/or are isolated from said substrate, cultured in the laboratory and then re-introduced onto/into the substrate, is/are capable of forming carbonate or of inducing and/or catalysing carbonate formation. In this case, alternative or equivalent embodiments are conceivable (and accordingly are embraced herein as being in accordance with the invention) in which the organisms of the mixture for use in accordance with the invention and the (indigenous) organisms in/on the substrate together form the carbonate or induce and/or catalyse carbonate formation, and/or in which the mixture for use itself contains no organisms which are capable of forming carbonate or of inducing and/or catalysing carbonate formation. According to one preferred embodiment, constituent (i) of the mixture for use in accordance with the invention comprises or consists of a combination of an organism or two or more organisms which is/are capable of forming carbonate or of inducing and/or catalysing carbonate formation, and organisms which do not have such capability.

According to one preferred embodiment, constituent (i) of the mixture for use in accordance with the invention comprises or consists of a combination of aerobic bacteria, anaerobic bacteria and/or facultatively anaerobic bacteria and/or intermediate stages thereof.

According to a further preferred embodiment, constituent (i) of the mixture for use in accordance with the invention comprises or consists of a combination of an organism or two or more organisms which is/are capable of forming carbonate ureolytically or of ureolytically inducing and/or catalysing carbonate formation, and the organisms which are not capable of ureolysis and/or are not capable at all of forming carbonate or inducing and/or catalysing carbonate formation.

In this context, the skilled person is aware that a biocementation (as defined herein) with use according to the invention of a mixture (as defined therein) proceeds particularly efficiently within a defined cell count spectrum of the organisms used. According to in-house studies, the cell count of the organism or organisms in the mixture for use in accordance with the invention is preferably at least $10^7$ cells/mL, more preferably at least $10^8$ cells/mL, and/or preferably at most $10^{12}$ cells/mL, more preferably at most $10^{10}$ cells/mL, more preferably still at most $10^9$ cells/mL. According to one preferred embodiment, the cell count of the organism or organisms in the mixture for use in accordance with the invention is $10^8$ to $10^9$ cells/mL.

Preference is given to a use as described above wherein one or the, two or more or all the enzymes is/are selected from the group consisting of urease, asparaginase, carbonic anhydrase and metabolic enzymes.

In the case of metabolic enzymes, the enzymes in question in the context of the present text are enzymes of the metabolism of one or more (micro)organisms as described herein which, with conversion of acetate and/or lactate, for example, are capable of forming carbonate or of inducing and/or catalysing carbonate formation. In constituent (i) of the mixture for use in accordance with the invention, preferably, an organism or two or more organisms (as defined above) is/are used which is/are able to produce one or more of the aforementioned enzymes, and/or, preferably, the aforementioned enzymes are obtained or released from the above-stated organisms.

Where the organism or organisms used comprise pathogenic organisms, it is preferred in the context of the present text if only the non-pathogenic enzymes obtained or released from said organism/organisms are used in constituent (i) of the mixture for use in accordance with the invention.

According to a further preferred embodiment, in constituent (i) of the mixture for use in accordance with the invention, it is possible to use combinations of enzymes which are obtained or released from the abovementioned organisms with enzymes of non-microbial origin (plant enzymes, for example). The enzyme urease, for example, may be obtained from soybeans and used in accordance with the invention.

According to a further preferred embodiment, in constituent (i) of the mixture for use in accordance with the invention, it is possible to use combinations of one or more of the abovementioned organisms which is/are capable of forming carbonate or of inducing and/or catalysing carbonate formation with one or more of the abovementioned enzymes which is or are capable of forming carbonate or of inducing and/or catalysing carbonate formation.

Carbonates can be generated by means of the above-stated enzymes through various metabolic processes. For example, through aerobic metabolization of organic carbon sources, an ammonification may occur (e.g. asparaginase enzyme), or there may be a heterotrophic metabolization of organic carbon sources (e.g. calcium lactate or calcium acetate). Both processes provide carbonate. Aerobic and anaerobic photosynthesis may also be employed to form carbonates, as may be anaerobic denitrification, anaerobic sulfate reduction and (an)aerobic methane oxidation.

The biocementation by means of the mixture for use in accordance with the invention may therefore be based on one or more of the aforesaid metabolic processes.

Whether an organism or an enzyme other than the organisms or enzymes specifically stated here represents a constituent (i) in the sense of the invention can be determined with the aid of the assay A described below.

(Assay A)

(i) Providing and contacting an organism for testing or a mixture of organisms for testing (test organism) and the constituent (ii), (ii) providing a means for establishing ureolysis and/or carbonate formation, (iii) combining the mixture resulting in step (i) with the means from step (ii), and (iv) determining, on the basis of the means from step (ii), whether there is ureolysis and/or carbonate formation, where the test organism is a constituent (i) in the sense of the invention if ureolysis and/or carbonate formation is established in step (iv).

According to a slightly modified assay A', step (i) further comprises a model substrate (as described here), and step (iv) comprises determining whether a biocementation is established, with the test organism being a constituent (i) in the sense of the invention if a biocementation is established.

Where the constituent to be tested is an enzyme or an enzyme mixture, an analogous procedure can be undertaken.

The observations below may be useful in the selection of organisms suitable in the context of a use according to the invention.

The constituent (ii) to be provided in step (i) of assay A as defined herein is more closely defined in the present text, including on the basis of selected and preferred examples.

In step (i) of assay A as defined herein it is possible, for example, to provide pure cultures of the organism to be characterized (from type collections, for example), and/or the organism to be characterized or the mixture of organisms to be characterized may be isolated, for example, from a suitable sample (e.g. soil sample) by means of a nutrient medium (e.g. Christensen urea agar, B4 medium or M-3P medium) and cultured to form a cell culture suitable for further study. The nutrient medium used for isolation and culturing may be liquid or solid. The skilled person is aware that the nutrient medium may be varied according to the requirements of the organism/organisms. The organism/organisms is/are preferably cultured to a cell density of between $1 \times 10^7$ to $1 \times 10^{12}$ cells/mL. The skilled person is aware that, for example, the culturing temperature and the media composition are selected according to the requirements of the organism or mixture of organisms. The cell culture provided or produced is then contacted with the constituent (ii) and optionally the model substrate to form a mixture which is then combined in step (iii) with the means from step (ii).

The means for establishing ureolysis and/or carbonate formation in step (ii) of assay A as defined herein is, for example, a pH indicator, a device and/or one or more substances for measuring the urease activity, a device and/or one or more substances for measuring the amount of carbonate formed as a result of the biocementation, or a device for measuring the degree of consolidation of the substrate (as a result of the biocementation).

The determination of whether there is ureolysis and/or carbonate formation, in step (iv) of the assay A as defined herein, particularly the establishment of biocementation, may take place qualitatively or, preferably, quantitatively.

One preferred method for said determination is, for example, the addition of a suitable pH indicator (e.g. phenol red, preferably at a concentration of 15 mg/L) to the mixture resulting in step (i). Where ureolysis and/or carbonate formation is present, there is a rise in the pH of the mixture, leading to a colour change on the part of the indicator (e.g., to pink coloration in the case of phenol red).

If a cation source, preferably a calcium source, is added to the mixture from step (i), and if ureolysis and/or carbonate formation are/is present, with solid media there is generally formation of a lime crust around the colonies and/or on the colonies of the organism or organisms. In the case of liquid nutrient media, and where a cation source is sufficiently available, preferably a calcium source (e.g. CaCl2), and where a carbonate source is sufficiently available (e.g. urea), there are generally instances of lime precipitation. This lime crust formation or lime precipitation may also serve as visual evidence of ureolysis and/or carbonate formation, and/or said instances of lime crust formation or lime precipitation may be analysed by qualitative and/or quantitative carbonate determination, preferably with the aid of (semi-) quantitative carbonate determination by the method of Scheibler or by an onward development of that method (e.g. as described in Horvath, B. et al., A Simple Method for

US 12,643,819 B2

37

Measuring the Carbonate Content of Soils, Soil Science Society of America Journal 2005, 69, 1066-1068).

Another method for said determination is, for example, a measurement of the urease activity of the organism or mixture of organisms. In this case the organism or mixture of organisms to be analysed is mixed with reagents including buffered urea (e.g. 1.5 M urea in 0.1 M Tris HCl, pH 7.5), and the formation of the resultant ammonium ions is measured by conductometry as the rise in the measurement signal over time, and the urease activity is calculated (as described for example in V. S. Whiffin, Microbial $CaCO_3$ Precipitation for the production of Biocement, Dissertation, 2004, Murdoch University, Western Australia). The urease activity is preferably between $1\times10^{-7}$ to $1\times10^{-11}$ mM hydrolysed urea/min/cm/cells/mL, more preferably between $1\times10^{-8}$ to $1\times10^{-10}$ mM hydrolysed urea/min/cm/cells/mL, more preferably between $1\times10^{-8}$ to $1\times10^{-9}$ mM hydrolysed urea/min/cm/cells/mL. The former corresponds approximately to a urea hydrolysis rate of 0-300 mM hydrolysed urea/min, depending on the cell count used. Another preferred method for said determination is, for example, the measurement of the amount of carbonate formed by biocementation, preferably by means of (semi-)quantitative carbonate determination by the Scheibler method. The mixture under study is incubated preferably for 48 h, open, at room temperature (25° C.). This allows a precipitated pellet to be obtained for further use, by centrifuging and drying. The dried pellet can be used for (semi-) quantitative detection of the calcium carbonate formed, preferably by means of Scheibler carbonate determination. Optionally, the dried precipitate can be weighed beforehand and the efficiency of precipitation calculated. Optionally, in parallel with this, an additional qualitative determination can be carried out as to whether there is ureolysis and/or carbonate formation. For this purpose, phenol red (15 mg/L) can be added to the mixture from step (i). If ureolysis and/or carbonate formation are/is present, the supernatant to be discarded during recovery of the pellet is in that case generally coloured pink.

A further preferred method for said determination is, for example, the measurement of the degree of consolidation of the substrate (through the carbonate formed during biocementation). An example of a suitable substrate for this purpose is silica sand, preferably with a grain size of 0 to 2 mm (as model substrate). The rest of the constituents of the mixture from step (i) are preferably applied/introduced in an amount of the resulting mixture of 5 l/m² (in the case of a liquid mixture) to/into the substrate. The subsequent incubation ought to take place in an open system and at room temperature or above room temperature for at least 2 days (preferably for at least 10 days). The strength of the biocement layer formed is subsequently ascertained by fracture-mechanical analysis with the aid of a digital (breaking) strength measuring instrument in a method based on DIN EN 196-1:2005-05. In comparison to the control (application of a comparative mixture without organism or organisms to the substrate), it ought to be possible to detect differences in the breaking strength of 3 N (or 0.01 MPa), preferably of 30 N (or 0.1 MPa).

Within the assay A, it is also possible to determine the thickness of the biocement layer using a calliper; with successful consolidation, preferably within the range under study, this thickness ought to be on average 3 mm.

According to one preferred embodiment, constituent (i) of the mixture for use in accordance with the invention comprises one or more organisms which in step (iv) of the assay A as defined herein, in respect of two or more of the above-described determination methods, preferably three or more, more preferably four or more, very preferably all the determination methods, result in the establishment of ureolysis and/or carbonate formation, preferably biocementation.

Preference is given, additionally, to a use as described above where the constituent (iv) is selected from the group consisting of organic and inorganic calcium salts, preferably calcium nitrate, calcium acetate, calcium lactate, calcium pyruvate, calcium salicylate and calcium chloride, magnesium salts, manganese salts, zinc salts, cobalt salts, nickel salts, copper salts, lead salts, iron salts, cadmium salts, polymers, preferably cationic polymers, heavy metal cations, light metal cations, radioactive cations, and mixtures thereof.

According to the present invention, the constituent (iv) may be present or not in the mixture for use in accordance with the invention. If it is not present in the mixture, it may be present on/in the substrate under treatment or may be added thereto in order to enable biocementation.

Especially preferred is a use as described above in which the constituent (iv) is present in a total concentration of 0.05 to 1 M and/or does not exceed a total calcium concentration of 1.5 M.

Optionally, it is possible for mixtures as described here to comprise one or more adjuvants (constituent (v)). If constituent (v) is present, it is preferably selected from the group consisting of:

natural and chemical herbicides; fungicides; molluscicides; insecticides; hydrophobizers and wax emulsions; stabilizers; dispersants; emulsifying aids; surfactants, preferably cationic, anionic and uncharged surfactants; amines; ethanolamines; thixotropic agents; propellants; free-flow agents, crystallization seeds and crystallization modifiers; complexing agents, preferably phosphonates, phosphates and polyphosphates, fatty acids; minerals and trace elements; salts, preferably halides, silicates, phosphates and sulfates; rocks, preferably pumice, sand, gravel and slate flour, rubber crumbs, rubber granules and other thermoplastic elastomers, preferably from the tyre industry; aggregates, preferably amorphous and crystalline aggregates, more preferably hydraulic, non-hydraulic and pozzolanic materials; plant seeds, preferably monocotyledons and dicotyledons, spores, preferably moss spores, plants and parts thereof, preferably roots, bulbs, wood and wood chips; fertilizers; bacteria capable of forming polymers; and substances which modify the biocementation.

Reference is otherwise made to the observations concerning the method of the invention and the mixture of the invention, these observations being valid correspondingly for the use according to the invention. Furthermore, the embodiments described in connection with dust control represent corresponding embodiments of erosion control and of the other uses disclosed here.

A further aspect of the present invention relates to a method for reducing dust formation and/or erosion. The method comprises the following steps:

(a) identifying a substrate to be treated, on/in which dust formation and/or erosion is to be reduced, (b) providing a mixture, or constituents thereof, as defined here (especially in the context of the use according to the invention), (c) applying the mixture provided in step (b), or constituents thereof, to/into the substrate to be treated, in an amount sufficient to enable biocementation, and (d) allowing a biocement layer to form, thereby reducing dust formation and/or erosion on/in the substrate.

According to one preferred embodiment of the method of the invention, the applying constitutes an application of the mixture provided in step (b), or of constituents thereof, to/into the substrate to be treated. According to another preferred embodiment, the applying comprises an application and subsequent introduction, for example by mixing in, of the mixture provided in step (b), or of constituents thereof, to/into the substrate to be treated. According to another preferred embodiment of the method of the invention, the applying constitutes an introduction of the mixture provided in step (b), or of constituents thereof, onto/into the substrate to be treated.

According to one embodiment of the method of the invention, the substrate or parts thereof identified in step (a) is or are removed from the original location, and mixed with the mixture or constituents thereof provided in step (b), in an amount sufficient to enable biocementation (in a mixing apparatus, for example), and the mixture obtained is returned to the original location of a substrate (or alternatively to a different location at which a biocement layer is to be formed), followed by step (d) as described herein. In such an embodiment, step (c) of the method as described herein is omitted.

Depending on the form (solid/pulverulent or liquid or gelatinous or pasty) of the mixture provided in step (b) of the method of the invention, or of constituents thereof (in this regard, see the observations above), the applying in step (c) may take place in a variety of ways. Pulverulent mixtures, for example, can be scattered onto the substrate to be treated and/or incorporated into the substrate. Liquid mixtures, for example, are poured or sprayed onto the substrate to be treated and are optionally subsequently incorporated into the substrate. Advantageously, in general, a single application of the mixture provided in step (b), or of constituents thereof, onto/into the substrate to be treated is sufficient to form a biocement layer as defined in step (d) of the method of the invention. With preference a single application of the mixture provided in step (b) to/into the substrate to be treated is sufficient to form a biocement layer as defined in step (d) of the method of the invention.

The skilled person here is aware that a biocementation (as defined herein) in the method of the invention proceeds with particular efficiency at a defined application volume and/or a defined concentration of the mixture from step (b) (in this regard see also the preferred cell counts of the organism or organisms in the mixture for use in accordance with the invention, as described here). According to in-house studies, the application volume of the mixture for use in accordance with the invention (as defined above) is preferably at least 0.1 $l/m^2$, more preferably at least 0.5 $l/m^2$, more preferably at least 1.0 $l/m^2$, more preferably at least 2.0 $l/m^2$, at least 3.0 $l/m^2$, at least 4.0 $l/m^2$ or at least 5.0 $l/m^2$, and/or preferably at most 20.0 $l/m^2$, more preferably at most 10.0 $l/m^2$.

For an effective biocementation process in step (d) of the method of the invention, it is advantageous if the system composed of substrate (as defined here) and mixture for use in accordance with the invention has a water content of more than 10 wt %, based on the total weight of said system. If the mixture for use in accordance with the invention is used in pulverulent form (as defined above) in step (b) of the method of the invention, and if also the substrate in step (a) or (c) of the method of the invention is substantially water-free, resulting in said system having a water content of 10 wt % or less, based on the total weight of the system, then it is advantageous if the method of the invention comprises a further step in which sufficient water or aqueous solution is added either to the mixture or the constituents thereof from step (b) of the method, before or after application to/into the substrate to be treated, such that said system has a resulting water content of more than 10 wt %, based on the total weight of said system. Alternatively or simultaneously, a corresponding amount of water or aqueous solution may be added to the substrate to be treated, before or after application of the mixture or constituents thereof provided in step (b) of the method of the invention.

It is advantageous, furthermore, when employing the method of the invention, not to carry out the method, for example, in strong rain or wind. Under certain circumstances, strong rain or wind may cause a loss or considerable dilution of the mixture for use in accordance with the invention, even before the formation of the biocement layer (step (d)), and this might prevent the biocement layer forming and/or adversely affect its firmness and/or thickness. Following application of the mixture or constituents thereof provided in step (b) of the method of the invention to/into the substrate to be treated, i.e. in step (d) of the method of the invention, the biocement layer is formed preferably over an incubation period of at least 6 hours, preferably at least 24 hours, more preferably at least 48 hours, in which preferably there is no amount of rain or wind or artificial watering that leads to a significant loss of mixture for use in accordance with the invention. It has emerged as being particularly advantageous in this context that the mixtures according to the invention, in addition to the advantage of a long-lasting consolidation, are also capable of accelerating consolidation. In this way, weathering-related losses described above can be largely prevented or reduced.

The required incubation period for the forming of the biocement layer in step (d) of the method of the invention is additionally dependent on various environmental parameters, such as, for example, the room temperature or outdoor temperature and the atmospheric humidity, and on the application volume employed of the mixture. Should there be a significant loss of mixture for use in accordance with the invention, or constituents thereof, during said incubation period of at least 6 hours, preferably at least 24 hours, more preferably at least 48 hours, as a result of rain or wind, it is advantageous to repeat steps (b) to (d) of the method of the invention as often as necessary, preferably once, twice, three times or more, until the biocement layer reaches a sufficient thickness and firmness. Additionally or alternatively it may prove to be advantageous to repeat steps (b) to (d) of the method of the invention, preferably once, twice, three times or more, should the thickness and/or firmness of the biocement layer formed on/in the substrate decrease over time as a result of weathering and/or natural breakdown and hence no longer be sufficient for reducing dust formation and/or erosion.

The thickness of the biocement layer can be determined by manual measurement after mechanical breaking of the layer, by means of a calliper. Alternatively, depending on the thickness of the consolidation, it is possible to use various (nondestructive) measurement methods from construction, agriculture, geology or other areas of use (e.g. manual device MIT-SCAN-T2). The layer thickness of the biocement layer encompasses the region of the substrate which is consolidated as a result of the addition of the mixture.

The firmness of the biocement layer corresponds to the breaking strength (in newtons (N)), this being the force which must be applied in order to break the biocement layer. The breaking of the biocementation layer is the point at which there is no longer any (plastic) deformation of the layer when exposed to force, the (biocementation) layer instead being breached. Breaking is recognized by a drop in the measured force. The breaking strength (maximum value of the force measurement) can be determined by means of the following method: the method is based on the standardized test method for strength determination in cement, DIN EN 196-1:2005-05. The breaking strength is measured using a digital (breaking) strength measuring instrument in accordance with the manufacturers instructions. A test specimen is pressed into the sample (to the point of breakage) using a crank-operation test bed, and the force applied is measured continuously. From a number of measurements (>3) the mean breaking strength is computed. The mean breaking strength is preferably between 0.5 and 1000 N, more preferably between 3 and 300 N.

Preference is given to a method as described above wherein the substrate is selected from the group consisting of organic and inorganic material, especially of biogenic and/or anthropogenic origin, preferably metamorphic, sedimentary and igneous rocks and in each case their derivates and mixtures, and also combinations thereof.

More preferably the substrate used in the method of the invention is selected from the group consisting of a material which may be described by one or more of the following subgroups (from Strunz H and Nickel E H, V Strunz Mineralogical Tables, 2001, 9th Edition):

(i) elements (including all subgroups), e.g., but not exclusively: gold, copper, silver, zinc, tin, iron, antimony, graphite, palladium, carbon;
   (ii) sulfides and sulfo salts (including all subgroups), e.g., but not exclusively: chalcopyrite, galenite, pyrite;
   (iii) halides (including all subgroups), e.g., but not exclusively: fluorite;
   (iv) oxides and hydroxides (including all subgroups), e.g., but not exclusively: calcium oxide, magnesium oxide, cassiterite, magnetite, haematite, ilmenite;
   (v) carbonates and nitrates (including all subgroups), e.g., but not exclusively: calcite;
   (vi) borates (including all subgroups), e.g., but not exclusively: borax boracite, ulexite;
   (vii) sulfates, chromates, molybdates, tungstates (including all subgroups), e.g., by not exclusively: langbeinite, anhydrite, kieserite, gypsum;
   (viii) phosphates, arsenates, vanadates (including all subgroups), e.g., but not exclusively: monazite;
   (ix) silicates, germanates (including all subgroups), e.g., but not exclusively: olivine, topaz, muscovite, talc, cement, microsilica, waterglasses;
   (x) organic minerals (including all subgroups).

Mixtures which comprise one or more of the above-stated materials, and also substances and/or hybrid forms thereof having biogenic and/or anthropogenic origin, e.g., but not exclusively: earths, ashes, wood, mulch, cements, calcium carbonate (including polymorphs, derivatives and hybrid forms, and also natural-based (GCC, ground calcium carbonate) and synthetic (PCC, precipitated calcium carbonate), aluminium oxide, aluminium hydroxide, magnesium oxide, calcium oxide, calcium hydroxide and spoil, and also fine-grained residues from the processing of one of the above substances or of a mixture thereof (tailings); more preferably the substrate used in the method of the invention is selected from the group consisting of crystalline and amorphous substances, and also mixtures thereof.

Depending on the properties of the substrate to be treated, it may prove to be advantageous to admix the substrate (or constituent (i), (ii), (iii) and/or (iv) of the mixture provided in step (b)) with one or more of the above-stated additives, in order, for example, to improve the reactivity of the substrate with the biocement formed during the method of the invention. This leads advantageously to a particularly hard/stable biocement layer which is particularly effective in suppressing dust formation and/or erosion.

Further preferred is a method as described above wherein the mixture is present in liquid form, as gel, paste or as powder (cf. above).

The mixture provided in step (b) of the method of the invention, or constituents of said mixture, may accordingly be present in the form of a mixture, preferably in powder form, or in the form of two, three, four or more separate liquid and/or gelatinous and/or pasty and/or pulverulent premixes, which are mixed with one another before or during application to/into the substrate to be treated, in step (c).

Advantageously, a single implementation of steps (b) to (d) of the method of the invention is generally sufficient to ensure satisfactory suppression of dust formation/erosion. According to a further embodiment, however, it is possible as and when needed for steps (b) to (d) or (b) and (c) to be repeated once, twice, three times or more, in order to ensure particularly effective biocementation of the substrate to be treated, and hence particularly effective suppression of dust formation/erosion.

According to a further preferred embodiment of the method of the invention, step (c) is carried out once or repeatedly, and the amount of the constituent (iii) applied overall is at least 20 g, preferably at least 40 g, more preferably at least 60 g, more preferably at least 80 g, more preferably at least 100 g and most preferably at least 120 g, based in each case on 1 square metre of application area, and/or the amount of the constituent (iii) applied overall is at most 2000 g, preferably at most 1600 g, more preferably at most 1200 g, more preferably at most 800 g, more preferably at most 600 g and most preferably at most 400 g, based in each case on 1 square metre of application area.

As for the rest, reference is made to the observations concerning the use according to the invention and the mixture of the invention, these observations being valid correspondingly for the method of the invention.

A further aspect of the present invention relates to a mixture which is capable of biocementation, as defined here (especially in the context of the use according to the invention or of the method of the invention).

In preferred mixtures, the constituent (iii) is selected from the group consisting of:

Albumin; starch ether, alanine, lysine, styrene-acrylate, especially styrene-acrylate dispersion; ethylene-vinyl acetate, especially an ethylene-vinyl acetate dispersion; polyvinyl alcohol; magnesium sulfate; polyvinyl acetate, especially a polyvinyl acetate dispersion; styrene-butadiene, especially a styrene-butadiene dispersion; humic acid and combinations thereof, and also polymers containing monomers of the aforesaid polymers.

In preferred mixtures, furthermore, the constituent (ii) is selected from the group consisting of:

Urea and its salts; organic acids such as lactic acid and salts thereof, preferably carboxylates, and esters thereof; gluconic acid and salts thereof, preferably carboxylates, and esters thereof; acetic acid and salts thereof, preferably carboxylates, and esters thereof; formic acid and salts thereof, preferably carboxylates, and esters thereof; propanoic acid and salts thereof, preferably carboxylates, and esters thereof; butanoic acid and salts thereof, preferably carboxylates, and esters thereof; pentanoic acid and salts thereof, preferably carboxylates, and esters thereof; peptides, preferably containing non-proteinogenic amino acids, asparagine, alanine, glycine, lysine, glutamine and/or glutamic acid; amino acids, preferably non-proteinogenic amino acids, asparagine, alanine, glycine, lysine, glutamine and glutamic acid, and salts thereof, preferably carboxylates, and esters thereof; vegetable and animal complex substrates, especially peptone, yeast extract, meat extract, nutrient broth and casamino acid; industrial residual substrate streams, especially corn steep liquor, lactose mother liquor, protein lysates, preferably from peas, meat, potatoes or tomatoes; anaerobic substrates, preferably carbon dioxide and methane.

The salts stated as constituent (ii) in the present text are preferably the respective calcium salts. An advantage of this is that constituent (ii) can function both as a substance for forming carbonate and as a preferred cation source in accordance with the optional constituent (iv).

For the rest, reference is made to the observations concerning the uses according to the invention and the method of the invention, which are valid correspondingly for the mixture according to the invention.

In the testing of the biocementation mixtures of the invention on various substrates, further unexpected observations were made, which are set out in more detail below. Arising from these observations are further, potential fields of use, which represent further aspects of the present invention.

Hence one further aspect of the present invention relates to the use of a mixture which is suitable for biocementation, comprising or consisting of the constituents (i), (ii) and (iii) and also, optionally, constituent (iv) and/or, optionally, constituent (v), as specified in the present text, for pelletization.

On application of the mixtures of the invention to a moving sample of iron ore, it emerged that, after application, small agglomerates or pellets were formed. Pellets formed in a pelletizer exhibited (as well as reduced emissions during production) a greater strength than comparative mixtures.

Processing of the pellets produced using comparative mixtures proved to be difficult, since the pellets produced shattered very easily. This is presumably attributable to the absence of the cohesion-modifying compound. Cohesion-modifying substances therefore also enable the production of a biocement which can be used for pelletizing.

An unexpected finding was that, after formation of the biocement, certain substrates dried more slowly in the pelletizer; accordingly, a closer look was taken at the effect of the biocementation mixtures on evaporation.

Hence one further aspect of the present invention relates to the use of a mixture which is suitable for biocementation, comprising or consisting of the constituents (i), (ii) and (iii) and also, optionally, constituent (iv) and/or, optionally, constituent (v), as specified in the present text, for the control, especially reduction, of evaporation.

The inventors found out that effective layer formation reduced the drying rate of the sand. This was evident from the higher relative soil humidity of the samples in which the mixtures of the invention in comparison to the application of water or in comparison to comparative mixtures not in accordance with the invention. It is assumed that the resultant biocement layer comprises a cohesive barrier to downward-flowing water. It can be supposed that in view of the presence of the cohesion-modifying substances, the porosity of the layer is modified in such a way that water is able to evaporate less rapidly.

The altered porosity can also be utilized by other applications where porosity plays a part. This is so in particular for use in insulating materials, catalyst beds and/or battery materials. Correspondingly, a further aspect of the present invention relates to the use of a mixture which is suitable for biocementation, comprising or consisting of the constituents (i), (ii) and (iii) and also, optionally, constituent (iv) and/or, optionally, constituent (v), as specified in the present text, for producing insulating materials, catalyst beds and/or battery materials.

On the basis of the reduced porosity, the material based on mixtures of the invention is also especially suitable as a sealing material. Consequently a further aspect of the present invention relates to the use of a mixture which is suitable for biocementation, comprising or consisting of the constituents (i), (ii) and (iii) and also, optionally, constituent (iv) and/or, optionally, constituent (v), as specified in the present text, for producing sealing material.

A further aspect of the present invention relates to the use of a mixture which is suitable for biocementation, comprising or consisting of the constituents (i), (ii) and (iii) and also, optionally, constituent (iv) and/or, optionally, constituent (v), as specified in the present text, for (heavy metal ion) decontamination of substrates and/or (heavy metal ion) precipitation from substrates.

The skilled person is aware that carbonate ions which are produced by bacteria from urea, for example, can be utilized for precipitating metal ions (Phillips et al, *Engineered applications of ureolytic biomineralization: a review*, Biofouling, 2013, Vol. 29, No. 6, 715-733). Presumably it was observed for this reason that when soils polluted by heavy metal were used, the formation of a layer began more rapidly. Testing was therefore carried out to determine whether the cohesion-modifying substances are also suitable for improving heavy metal ion precipitation. In experiments, the inventors were able to show that the mixtures according to the invention are capable of binding and precipitating heavy metal ions.

A further aspect of the present invention relates to the use of a mixture which is suitable for biocementation, comprising or consisting of the constituents (i), (ii) and (iii) and also, optionally, constituent (iv) and/or, optionally, constituent (v), as specified in the present text, for (heavy metal ion) decontamination and/or (heavy metal ion) precipitation from solution.

A feature of the cohesion-modifying compound in the mixture according to the invention is that synergistically with the microbial biocementation it produces a particularly cohesive, low-emission biocement. Unexpectedly it emerged that this also occurs in solution and therefore produces particularly efficient heavy metal ion precipitation from solution. This was especially unexpected because polymers in particular have a tendency to bind polyvalent ions, including especially divalent metal cations such as $Ca(II)$, $Cu(II)$, $Mg(II)$ and also $Ni(II)$, to disperse them in solution and so to increase their solubility. On account of this affinity for divalent metal cations, the expectation was that, especially if the water-soluble and/or water-dispersible, cohesion-modifying compound was a polymer, it would stabilize polyvalent metal cations, and also aggregates and agglomerates thereof, in solution, leading to less efficient precipitation of metal ions (cf. Tadros T F 2016, Nanodispersions, ISBN-978-3-11-029033-2, especially Chap. p. 25 ff *steric stabilization*).

Additives which accelerate consolidation are also used with building materials, as for example with cementitious building materials, such as mortars and concretes, in order to regulate the solidification time (cf. e.g. EP 2664596 A3). On the basis of the accelerated curing of the mixtures according to the invention, described in Example 1 below, a further aspect of the present invention is the use of a mixture which is suitable for biocementation, comprising or consisting of the constituents (i), (ii) and (iii) and also, optionally, constituent (iv) and/or, optionally, constituent (v), as specified in the present text, for producing building materials, especially cementitious building materials such as mortars and concretes, and/or for regulating their solidification time.

The mixtures according to the invention have further emerged as being suitable for binding and aggregating woodchips. Correspondingly, a further aspect of the present invention relates to the use of a mixture which is suitable for biocementation, comprising or consisting of the constituents (i), (ii) and (iii) and also, optionally, constituent (iv) and/or, optionally, constituent (v), as specified in the present text, for producing building materials, especially as binders for insulating materials. The statements made herein for a use according to the invention are equally valid for a method of the invention described herein and for a mixture according to the invention as described herein, and vice versa. This applies especially for (preferred) embodiments of a use according to the invention, which form corresponding (preferred) embodiments of the method of the invention, and corresponding (preferred) embodiments of the mixture according to the invention, and vice versa.

Below, the invention is elucidated in more detail by means of selected examples. Unless otherwise stated, all data relates to the weight.

FIG. 1: Mechanical and dust-suppressing properties of the biocementation and reference mixtures for the use of *S. pasteurii*: penetration depth of the metal cones of different weights in mm after 24 h reaction time (top left). Breaking strength of the resultant layers in newtons after 48 h reaction time (top right). Emission-related weight loss after 24 h reaction time at wind exposure of 12 m/s for one minute (bottom left). Emission-related weight loss after 24 h reaction time and determination of the penetration depth of a metal cone (600 g) at wind exposure of 12 m/s for one minute (bottom right).

Figure 2:
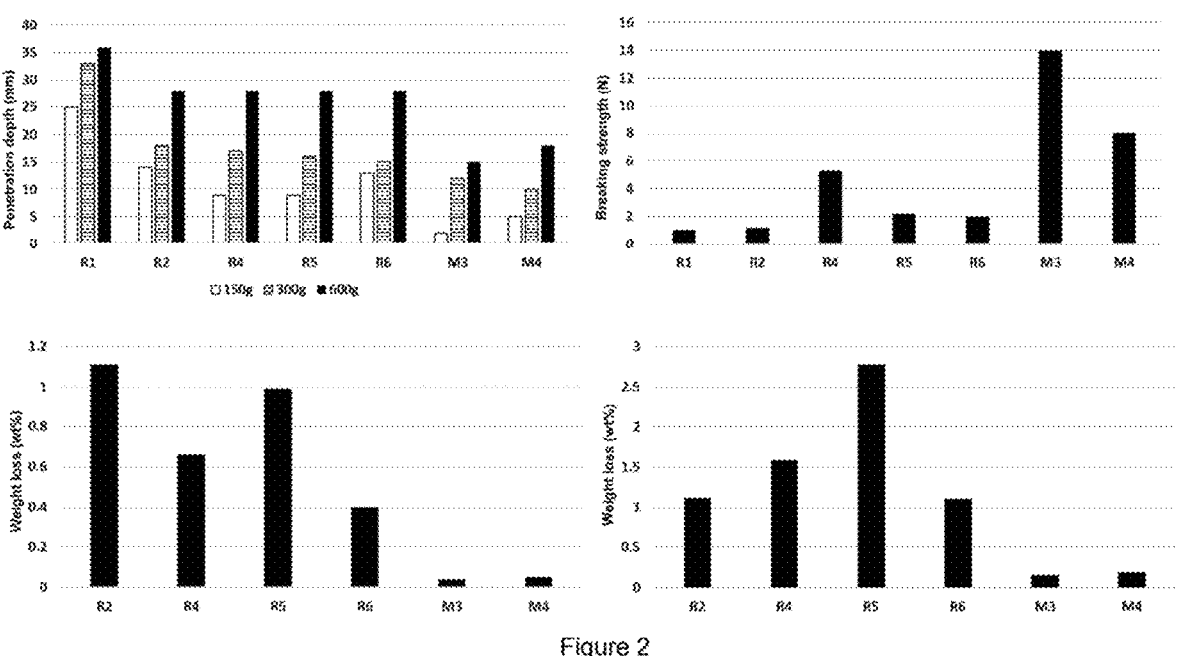

FIG. 2: Mechanical and dust-suppressing properties of the biocementation and reference mixtures for the use of *L. sphaericus*: penetration depth of the metal cones of different weights in mm (top left) after 24 h reaction time. Breaking strength of the resultant layers in newtons after 48 h reaction time (top right). Emission-related weight loss after 24 h reaction time at wind exposure of 12 m/s for one minute (bottom left). Emission-related weight loss after 2 h reaction time and determination of the penetration depth of a metal cone (600 g) at wind exposure of 12 m/s for one minute (bottom right).

Figure 3:
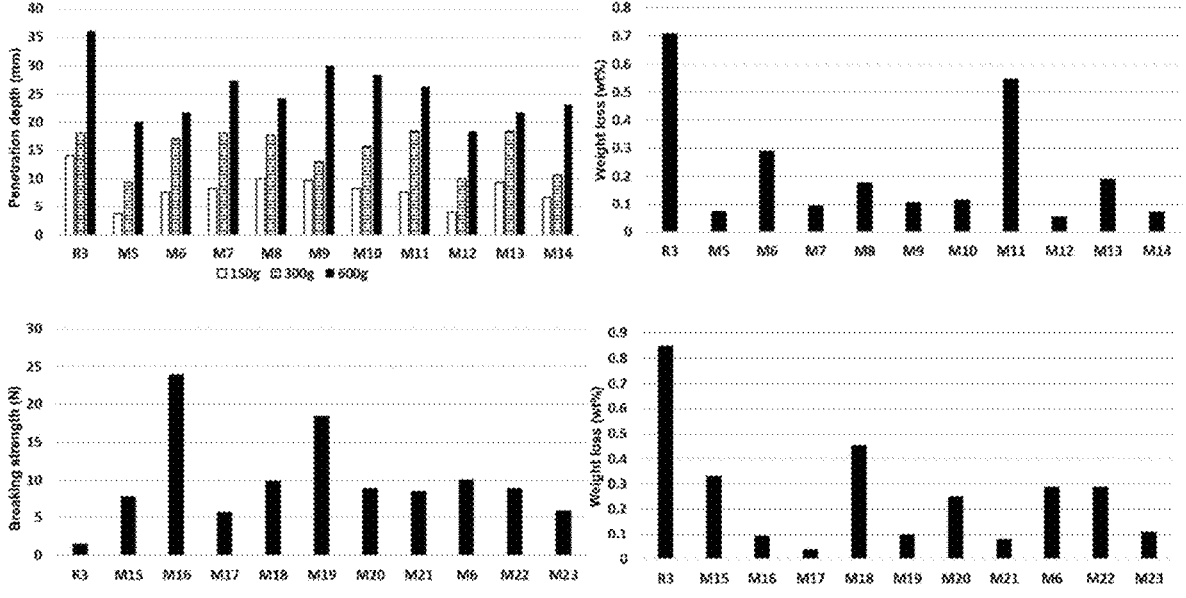

FIG. 3: Mechanical and dust-suppressing properties of the biocementation and reference mixtures for the use of various bacterial strains: penetration depth of the metal cones of different weights in mm (top left) after 24 h reaction time. Weight loss after 24 h reaction time and determination of the penetration depth of a metal cone (600 g) at wind exposure of 12 m/s for one minute (top right). Breaking strength of the resultant layers in newtons after 48 h reaction time (bottom left). Weight loss after 48 h reaction time and determination of the breaking strength at wind exposure of 12 m/s for one minute (bottom right).

Figure 4:
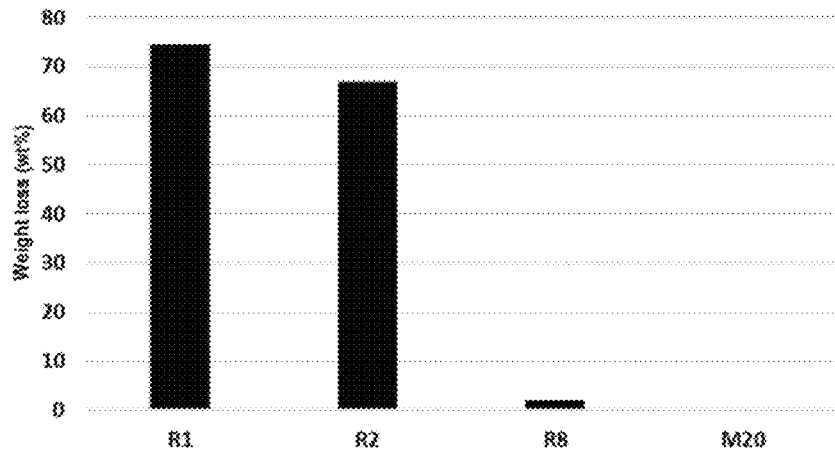

FIG. 4: Emission-related weight loss after 24 hours reaction time and 15 minutes wind exposure (6 m/s) of the reference mixtures R1, R2 and R8 and also of the biocementation mixture M20.

Figure 5:
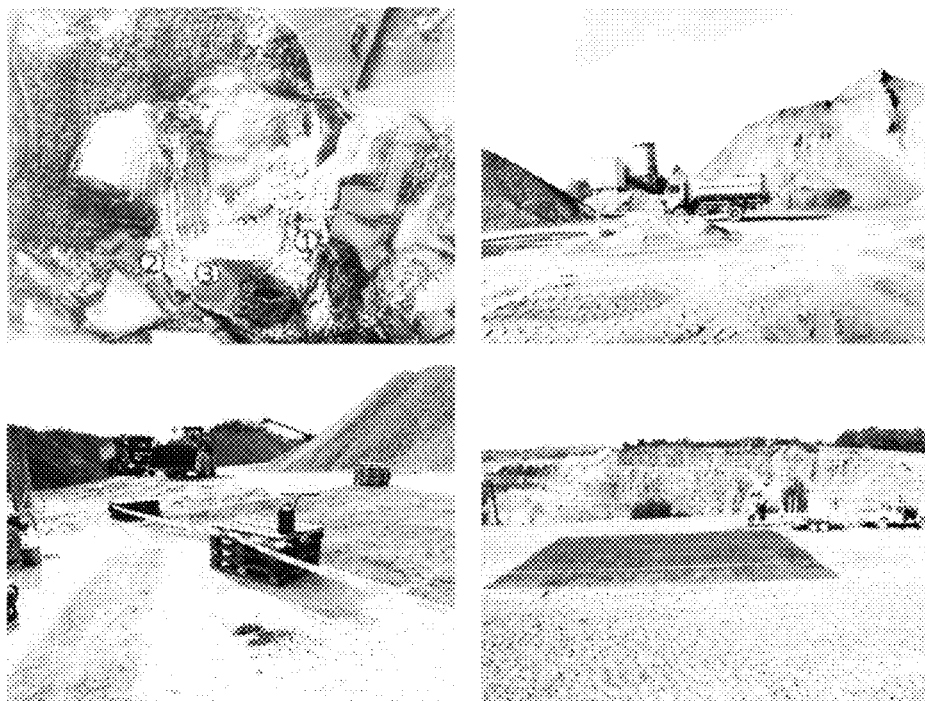

FIG. 5: Demonstration of the dust-suppressing effect in a limestone quarry, birds-eye view of the three application areas: road (1), fresh dump (2), pit (3) (top left). Implementation of water application by spray truck as current dust suppression measure (top right). Application of the mixtures to the road (bottom left) and to the dump (bottom right).

Figure 6:
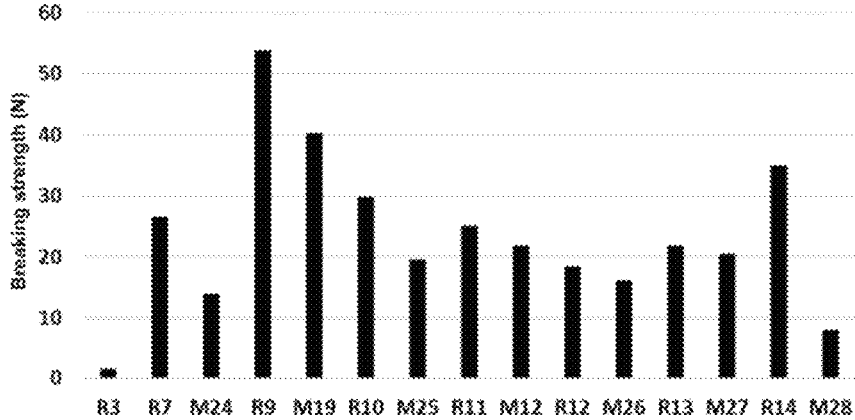
Figure 6:
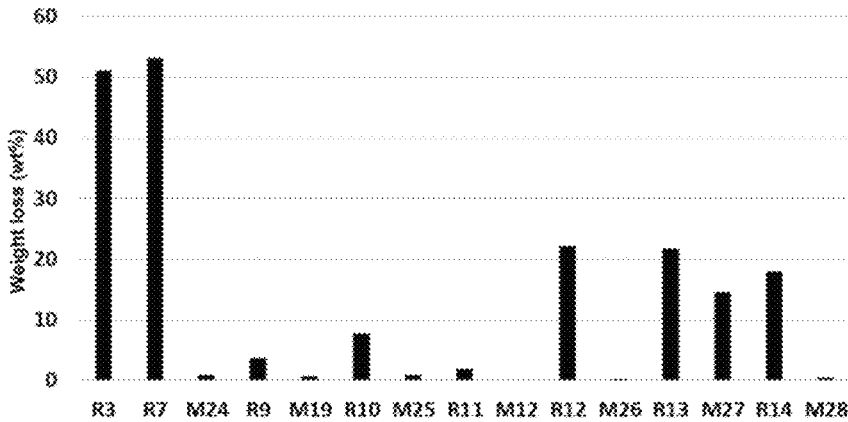

FIG. 6: Mechanical and dust-suppressing properties of the biocementation and reference mixtures when using *S. pasteurii*: breaking strength after four days reaction time (top). Emission-related weight loss after four days reaction time, determination of the breaking strength and wind exposure of 12 m/s for one minute (bottom). Reference R3 is pivotal for all the mixtures in the figure. The respective inventive biocementation mixture is, for clarity, always placed on the right next to the associated reference: R3 and R7 both produce no reduction in emissions after mechanical testing; the combination of both features a very efficient emissions reduction (M24).

Figure 7:
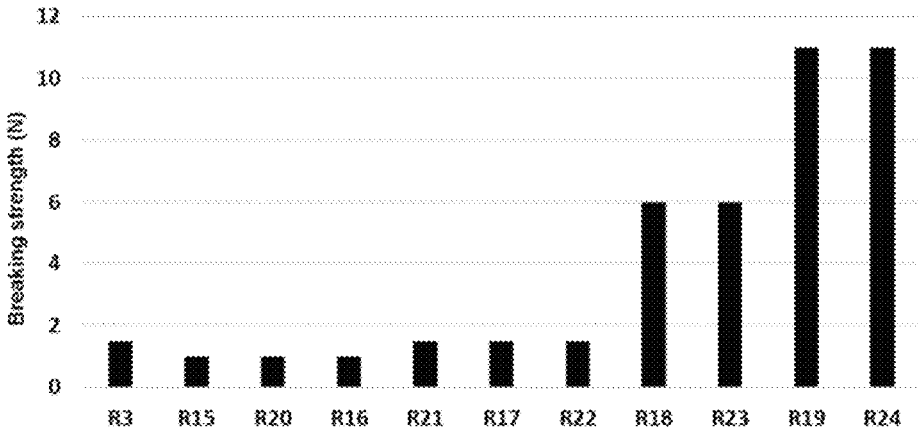
Figure 7:
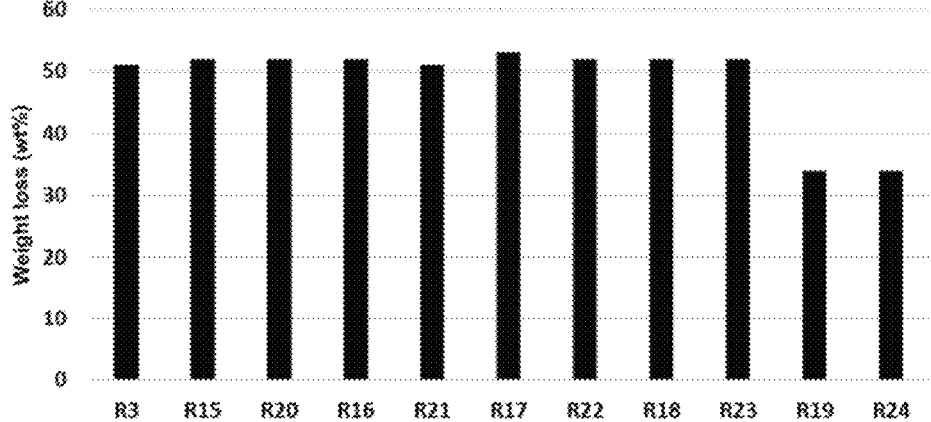

FIG. 7: Mechanical and dust-suppressing properties of the non-advantageous biocementation and reference mixtures with the use of *S. pasteurii*: breaking strength after four days reaction time (top). Emission-related weight loss after four days reaction time, determination of the breaking strength and wind exposure of 12 m/s for one minute (bottom).

Figure 8:
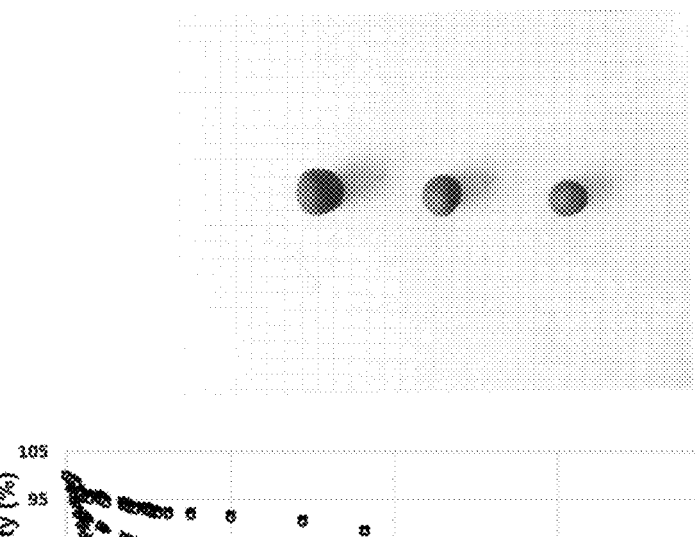
Figure 8:
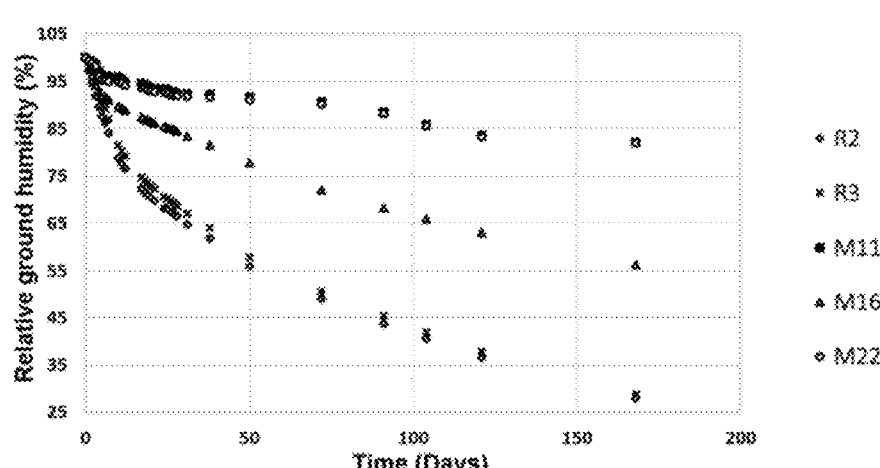
Figure 8:
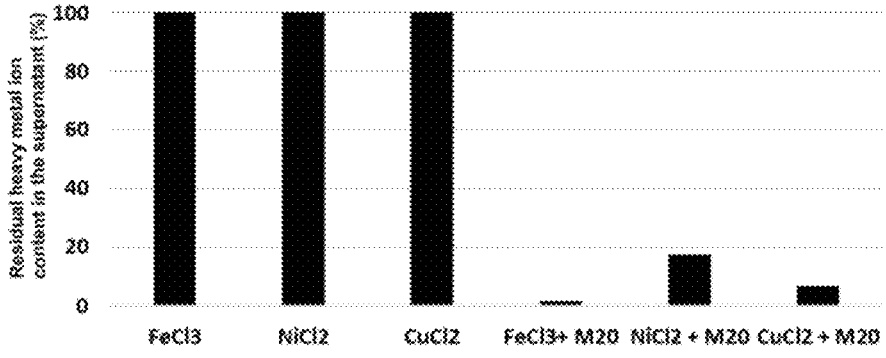

FIG. 8: Further use examples of inventive mixtures. Pellets produced with the mixtures M7, M8 and M9 (from left to right). The box size of the paper underlayer is 5 mm (top). Relative soil humidity for treated samples over an observation period of 168 days for R2 (hollow diamonds), R3 (crosses), M11 (solid squares), M16 (hollow triangle) and M22 (hollow circle). The evaporation control by inventive biocement is evident from the higher relative soil humidity. M11 and M22 are close to one another (middle). Residual heavy metal ion content in the supernatant after 24 hours reaction time and subsequent centrifugation (bottom).

EXAMPLE 1: ACCELERATED BIOCEMENTATION WITH IMPROVED DUST SUPPRESSION

Material and Methods

The experiment was carried out in the laboratory in plastic vessels with a volume of 450 cm³. The application area was in each case 78.5 cm².

The soil substrate in the experiment consisted of a silica sand having a grading of 0-2 mm. The sand had been both washed and dried by the manufacturer, and was used directly. 800 g of silica sand per plastic vessel were used as soil substrate. The plastic vessel was full to the brim.

For a control, reference mixtures were utilized, consisting of the following constituents in the following concentrations:

Reference 1 (R1): Dry sand substrate without addition of aqueous component.

Reference 2 (R2): Application of water.

Reference 3 (R3):

| | |
|---|---|
| 48 g/L | urea |
| 44 g/L | calcium chloride |
| 4 × 10⁻8 cells/mL | *S. pasteurii* |

Reference 4 (R4):

| | |
|---|---|
| 6.25 g/L | calcium lignosulfonate |

Reference 5 (R5)

| 3.15 g/L | calcium lignosulfonate |
|---|---|

The biocementing reference system R3 is used for dust suppression in a form modified according to Stabnikov, V., et al. Water, Air, & Soil Pollution (2013) 224:1631. The dust-suppression tendency was studied in this publication with wind speeds of 0.39 m/s and lower. The wind speeds studied in the present example are substantially higher. The total amount of biocementing mixture delivered in the present example is greater by a factor of four. Exact replication of the literature reference produced no significant changes relative to R3.

The mixture R3 further includes trace elements and traces of, for example, salts and sugars (<1 wt %). Urea in this medium served primarily as a carbonate source.

The reference mixtures were applied each in three replications to the experimental areas. The amount applied per square metre was consistently 4 litres per replication. Application took place using a pipette. Following application, the surface was spread smooth with a spatula. The measurement values reported are mean values of the three replications, which were typically in the region of 10% of the value ascertained.

Liquid biocementation mixtures were utilized, consisting of the following constituents in the following concentrations:

Mixture 1 (M1):

| 48 g/L | urea |
|---|---|
| 44 g/L | calcium chloride |
| 6.25 g/L | calcium lignosulfonate |
| 4 × 10^8 cells/mL | S. pasteurii |

Mixture 2 (M2):

| 48 g/L | urea |
|---|---|
| 44 g/L | calcium chloride |
| 3.15 g/L | calcium lignosulfonate |
| 4 × 10^8 cells/mL | S. pasteurii |

The mixture further included trace elements and traces of, for example, salts and sugars (<1 wt %). Urea in this medium served primarily as a carbonate source. Calcium lignosulfonate is the cohesion-modifying compound in the mixtures M1 and M2.

The mixtures were applied each in three replications to the experimental areas. The amount applied per square metre was consistently 4 litres per replication. Application took place using a pipette. Following application, the surface was spread smooth with a spatula. The measurement values reported are mean values of the three replications, which were typically in the region of 10% of the value ascertained.

All components of the present mixtures which are capable of biocementation, except for the bacteria of the strain S. pasteurii, were in solid form. The bacteria were present as a liquid culture in a culturing medium known from the prior art, as described for example in Cuthbert, M. O. et al., Ecological Engineering 2012, 41, 32-40 (see section 2.2, page 33), with 5 g/L yeast extract being used in the context of the present invention. The solid constituents and the bacteria in liquid culture were mixed directly prior to use, with the solid constituents dissolving.

Application of the reference mixtures and of the biocementation mixtures was followed by incubation over the entire observation period (in general 28 days) at an atmospheric humidity of 20% to 60% and with multiple air change per day. In this period the minimum temperature prevailing was 14.2° C. and the maximum temperature prevailing was 25.2° C.

Determined after 24 hours was the penetration depth of immersion cones of different weights (150 g, 300 g and 600 g) and also, subsequently, the dust-suppressing effect in a wind tunnel. In accordance with the test standard method DIN EN 13279-2:2014-03 (section 4.4.2.2), the penetration depth of cones with different weights (total weight of immersion cone and guide rod 150 g, 300 g, 600 g) was ascertained after 24 hours, using a described Vicat instrument with immersion cone and release device (described in DIN EN 13279-2:2014-03, pictures 2 and 3). For this purpose the sample was placed beneath the immersion rod. The immersion rod was carefully lowered until it contacted the surface of the sample. It was held for two seconds and the release device was actuated. Under the action of its own weight, the immersion cone penetrated the sample vertically. The penetration depth was read off on the scale five seconds after standstill of the cone. Sampling took place at three test sites, which were at least 3 cm distant from one another. From the three values ascertained, a mean value was formed. The measurements fluctuated by not more than 10% around the absolute value. This measurement provides information on the stiffening profile (cf. DIN EN 196-3, section 6.3.1). After the measurement, the mass of the test specimen was determined (sample mass before wind exposure) and the test specimen was placed in a wind tunnel. The mechanically stressed sample was exposed for one minute to a wind speed of 12 m/s. The flow direction of the air struck the surface at an angle of 12.5°. After the wind exposure, the reduced mass was determined (sample mass after wind exposure), and the emission-related weight loss was determined according to the formula indicated below. The weight of the sample vessel itself was subtracted in each case.

The dust suppression effect in a wind tunnel without prior mechanical stressing was carried out with a separate sample: the mass of the hardened sample (sample mass before wind exposure) was determined, and the sample was placed in a wind tunnel. In the wind tunnel, a flow of air was passed over the sample for one minute with a wind speed of 12 m/s. The flow direction of the air struck the surface at an angle of 12.5°. A measurement of the reduced sample weight was made after wind exposure (sample mass after wind exposure), and the emission-related weight loss was determined using the formula indicated below. The weight of the sample vessel itself was subtracted in each case.

The emission-related weight loss in weight percent was determined as follows:

$$\text{Emission-related weight loss} = [(\text{sample mass before wind exposure}_{day\ xy} - (\text{sample mass after wind exposure}_{day\ xy})/\text{sample mass before wind exposure}_{day\ xy}] * 100$$

After 48 hours, the breaking strength of the layers was determined. The breaking strength (maximum value of the force measurement) can be determined by means of the following method: the method is based on the standardized test method for strength determination in cement, DIN EN 196-1:2005-05. The breaking strength is measured using a digital (breaking) strength measuring instrument in accordance with the manufacturer's instructions. A test specimen is pressed into the sample (to the point of breakage) using a crank-operation test bed, and the force applied is measured continuously. From a number of measurements (>3) the mean breaking strength is computed. The mean breaking strength is preferably between 0.5 and 1000 N, more preferably between 1 and 300 N.

Following the determination of the breaking strength, the mechanically stressed sample was placed in the wind tunnel and exposed for one minute to a wind speed of 12 m/s. The flow direction of the air struck the surface at an angle of 12.5°. The emission-related weight loss is determined using the formula stated above. This test serves as a reference for the long-term stability of the samples and also their dust suppression.

Results

Where the silica sand in the dry state (R1) was subjected in the wind tunnel to a wind speed of 12 m/s for one minute, more than 50% of the weight was carried off in the form of dust. In the wet state, with the same wind speed and exposure time, the sand lost a further 1.12 weight percent of its own weight in the form of dust (R2). Under the conditions given, the sand dries out completely after 4.5 days. In this case the dust-suppressing effect dropped successively (data not shown). In the samples completely dried, the percentage emission-related weight loss after one minute of wind exposure was more than 50%.

The inventive formulations M1 and M2 showed a quicker stiffening profile than the reference systems R1, R2, R3, R4 and R5. After 24 h, a cone 150 g in weight penetrated 9 to 25 mm into the reference systems, whereas the cone with a weight of 150 g penetrated 2 and 6 mm into inventive formulations, respectively (FIG. 1, top left). The same tendency was also evident from the cones with a higher weight (FIG. 1, top left).

After 24 hours, the emission-related weight loss after one minute of wind exposure in the wind tunnel (12 m/s) without prior mechanical stressing was more than 50% for R1, 1.11% for R2, 0.41% for R3, 0.66% for R4 and 0.99% for R5. The mixture M1 gave an emission-related weight loss of only 0.03%, and the mixture M2 0.04% (FIG. 1, bottom left). This is presumably attributable to the better cohesive effect, which is also reflected in the mechanical properties.

After 24 hours, the emission-related weight loss after one minute of wind exposure in the wind tunnel (12 m/s) with prior mechanical stressing (verification of the penetration depth of the 600 g cone) was more than 50% for R1, 1.12% for R2, 0.71% for R3, 1.58% for R4 and 2.78% for R5. The mixture M1 gave an emission-related weight loss of 0.16%, and the mixture M2 gave an emission-related weight loss of 0.18% (FIG. 1, bottom right).

After 48 hours reaction time, the inventive mixtures M1 and M2 showed a higher breaking strength than the associated reference systems. In this case breaking strength of the inventive mixtures was above the sum total of the individual constituents: breaking strength of R3=1.5 N, breaking strength of R5=2.2 N, breaking strength of M2=7 N. Breaking strength of R3=1.5 N, breaking strength of R4=5.1 N, breaking strength of M1=12 N (FIG. 1, top right).

With the increasing age of the samples, the difference in the dust-suppressing effect after prior mechanical verification became even more apparent: after 48 hours, the emission-related weight loss after one minute of wind exposure in a wind tunnel (12 m/s) with prior mechanical stressing (determination of the breaking strength) was 1.30% for R2, 0.85% for R3, 40.1% for R4 and 42.9% for R5. The mixtures M1 and M2 showed a significantly lower emission-related weight loss of 0.40% for M1 and 0.43% for M2. After even longer reaction time (10 and 28 days, respectively), the same tendencies were apparent (data not shown; in this regard see also Ex. 2).

The biocementation mixture advantageously has a similar effectiveness as many standard commercial dust suppression compositions (data not shown), with the above-described increased dust suppression after mechanical loading being comparable with that of bitumen-based systems, without the various environmental disadvantages.

Additionally, in the above-described biocementation mixtures R3, M1 and M2, the bacterial strain *S. pasteurii* was replaced by the same cell-count concentration of *L. sphaericus* in each case, with the experiments being carried out in each case as described above. The resultant liquid reference and biocementation mixtures consisted of the following constituents:

Reference 6 (R6):

| | |
|---|---|
| 48 g/L | urea |
| 44 g/L | calcium chloride |
| 4 × 10^8 cells/mL | *L. sphaericus* |

Mixture 3 (M3):

| | |
|---|---|
| 48 g/L | urea |
| 44 g/L | calcium chloride |
| 6.25 g/L | calcium lignosulfonate |
| 4 × 10^8 cells/mL | *L. sphaericus* |

Mixture 4 (M4):

| | |
|---|---|
| 48 g/L | urea |
| 44 g/L | calcium chloride |
| 3.15 g/L | calcium lignosulfonate |
| 4 × 10^8 cells/mL | *L. sphaericus* |

The mixture additionally contained trace elements and traces of, for example, salts and sugars (<1 wt %). Urea in this medium served primarily as a carbonate source. The bacteria were present as a liquid culture in a culturing medium known from the prior art, as described for example in Dick, J. et al., Biodegradation 2006, 17, 357-367 (see "Materials and Methods" section, page 359), with 5 g/L yeast extract being used in the context of the present invention. Calcium lignosulfonate is the cohesion-modifying compound in the mixtures M3 and M4.

Using the organism *L. sphaericus* in the inventive mixtures achieved comparable results to those using *S. pasteurii* (cf. FIG. 2).

Comparable effects on emission reduction were also achieved with slightly modified formulations of the biocementation mixtures M1, M2, M3 and M4, containing calcium acetate, calcium propionate, calcium formate, calcium lactate and/or calcium chloride at a concentration each of 0.05 to 0.3 M, not exceeding a total calcium concentration of 0.4 M (data not shown). A greater variation in the concentration of calcium lignosulfonate (e.g. 1 to 500 g/L), or of urea (e.g. 0.1 to 1.0 M) or in the amount of yeast extract (e.g. 0.1 to 30 g/L) likewise produced good emissions reduction. The dust suppression was dependent in each case on the used concentrations of the constituents of the respective biocementation mixture (data not shown). Corresponding observations were also made for correspondingly modified inventive formulations of Examples 2, 3 and 4.

Accelerating additives are used to regulate the solidification time in building materials, as for example in the case of cementitious building materials such as mortars and concretes (EP 2664596 A3). On the basis of the accelerated curing of the mixtures described in this example, a preferred use of the inventive mixtures is their use for producing building materials.

Similarly, comparable effects on emissions reduction were achieved for all of the above-stated mixtures in which the bacteria were present as powders. For this purpose, the respective bacterial cells were concentrated in the culturing medium, then expertly dried and dissolved before application in the corresponding medium.

Similarly, comparative effects on emissions reduction were achieved for all of the abovementioned mixtures in mixtures where calcium lignosulfonate was replaced by lignosulfonate acid, sodium lignosulfonate, potassium lignosulfonate or ammonium lignosulfonate, respectively, and/or where the cation source was removed (here: a calcium source such as calcium chloride).

EXAMPLE 2: ACCELERATED BIOCEMENTATION FORMULATIONS WITH IMPROVED DUST SUPPRESSION FOR NON-UREOLYTIC AND UREOLYTIC BIOCEMENTATION SYSTEMS IN COMPARISON

Material and Methods

The experiment was carried out in the laboratory in plastic vessels with a volume of 450 cm³. The application area was in each case 78.5 cm².

The soil substrate in the experiment consisted of a silica sand having a grading of 0-2 mm. The sand had been both washed and dried by the manufacturer, and was used directly. 800 g of silica sand per plastic vessel were used as soil substrate.

For a control, the reference mixture R3 was used, consisting of the following constituents in the following concentrations:

Reference 3 (R3):

| 48 g/L | urea |
|---|---|
| 44 g/L | calcium chloride |
| 4 × 10⁸ cells/mL | S. pasteurii |

Reference 6 (R6):

| 48 g/L | urea |
|---|---|
| 44 g/L | calcium chloride |
| 4 × 10⁸ cells/mL | L. sphaericus |

The mixtures R3 and R6 further included trace elements and traces of, for example, salts and sugars (<1 wt %). Urea in this medium served primarily as a carbonate source.

The reference mixtures were applied each in three replications to the experimental areas. The amount applied per square metre was consistently 4 litres per replication. Application took place using a pipette. Following application, the surface was spread smooth with a spatula.

Liquid biocementation mixtures were utilized, consisting of the following constituents in the following concentrations:

Mixture 5 (M5):

| 5 g/L | yeast extract |
|---|---|
| 21 g/L | calcium acetate |
| 34.9 g/L | calcium chloride |
| 46.2 g/L | calcium lactate |
| 0.40 g/L | sodium hydroxide |
| 1.07 g/L | ammonium chloride |
| 15 g/L | L-alanine |
| 25 g/L | calcium lignosulfonate |
| 4 × 10⁸ cells/mL | B. pseudofirmus |

Mixture 6 (M6):

| 27 g/L | urea |
|---|---|
| 34 g/L | calcium chloride |
| 10 g/L | yeast extract |
| 12.5 g/L | Styrene-acrylate dispersion |
| 4 × 10⁸ cells/mL | L. sphaericus |

Mixture 7 (M7):

| 5 g/L | yeast extract |
|---|---|
| 21 g/L | calcium acetate |
| 34.9 g/L | calcium chloride |
| 46.2 g/L | calcium lactate |
| 25 g/L | calcium lignosulfonate |
| 4 × 10⁸ cells/mL | B. halodurans |

Mixture 8 (M8):

| 36 g/L | urea |
|---|---|
| 35 g/L | calcium chloride |
| 10 g/L | yeast extract |
| 4 × 10⁸ cells/mL | L. sphaericus |

Mixture 9 (M9):

| 27 g/L | urea |
|---|---|
| 17 g/L | calcium chloride |
| 31 g/L | albumin |
| 4 × 10⁸ cells/mL | L. sphaericus |

Mixture 10 (M10):

| 48 g/L | urea |
|---|---|
| 44 g/L | calcium chloride |
| 3.9 g/L | polyvinyl alcohol |
| 4 × 10⁸ cells/mL | S. pasteurii |

Mixture 11 (M11):

| 48 g/L | urea |
|---|---|
| 44 g/L | calcium chloride |
| 3.9 g/L | polyvinyl acetate dispersion |
| 4 × 10⁸ cells/mL | S. pasteurii |

Mixture 12 (M12):

| | |
|---|---|
| 48 g/L | urea |
| 44 g/L | calcium chloride |
| 9.4 g/L | starch ether |
| 4 × 10^8 cells/mL | *S. pasteurii* |

Mixture 13 (M13):

| | |
|---|---|
| 1 g/L | yeast extract |
| 34.9 g/L | calcium chloride |
| 25 g/L | calcium lignosulfonate |
| 21 g/L | calcium acetate |
| 46.2 g/L | calcium lactate |
| 4 × 10^8 cells/mL | *B. cohnii* |

Mixture 14 (M14):

| | |
|---|---|
| 1 g/L | yeast extract |
| 21 g/L | calcium acetate |
| 25 g/L | calcium lignosulfonate |
| 15 g/L | L-alanine |
| 34.9 g/L | calcium chloride |
| 46.2 g/L | calcium lactate |
| 0.40 g/L | sodium hydroxide |
| 1.07 g/L | ammonium chloride |
| 4 × 10^8 cells/mL | *A. crystallopoietes* |

Mixture 15 (M15):

| | |
|---|---|
| 1 g/L | yeast extract |
| 34.9 g/L | calcium chloride |
| 21 g/L | calcium acetate |
| 46.2 g/L | calcium lactate |
| 4 × 10^8 cells/mL | *B. cohnii* |

Mixture 16 (M16):

| | |
|---|---|
| 1.07 g/L | ammonium chloride |
| 21 g/L | calcium acetate |
| 15 g/L | L-alanine |
| 34.9 g/L | calcium chloride |
| 0.40 g/L | sodium hydroxide |
| 1 g/L | yeast extract |
| 46.2 g/L | calcium lactate |
| 4 × 10^8 cells/mL | *A. crystallopoietes* |

Mixture 17 (M17):

| | |
|---|---|
| 36 g/L | urea |
| 36 g/L | magnesium sulfate |
| 10 g/L | yeast extract |
| 4 × 10^8 cells/mL | *L. sphaericus* |

Mixture 18 (M18):

| | |
|---|---|
| 27 g/L | urea |
| 35 g/L | calcium chloride |
| 45 g/L | lysine |
| 4 × 10^8 cells/mL | *S. pasteurii* |

Mixture 19 (M19):

| | |
|---|---|
| 48 g/L | urea |
| 44 g/L | calcium chloride |
| 25 g/L | polyvinyl alcohol |
| 4 × 10^8 cells/mL | *S. pasteurii* |

Mixture 20 (M20):

| | |
|---|---|
| 27 g/L | urea |
| 47 g/L | calcium lignosulfonate |
| 4 × 10^8 cells/mL | *S. pasteurii* |

Mixture 21 (M21):

| | |
|---|---|
| 5 g/L | yeast extract |
| 21 g/L | calcium acetate |
| 25 g/L | calcium lignosulfonate |
| 34.9 g/L | calcium chloride |
| 46.2 g/L | calcium lactate |
| 4 × 10^8 cells/mL | *B. pseudofirmus* |

Mixture 22 (M22):

| | |
|---|---|
| 27 g/L | urea |
| 47 g/L | calcium lignosulfonate |
| 12 g/L | calcium chloride |
| 4 × 10^8 cells/mL | *S. pasteurii* |

Mixture 23 (M23):

| | |
|---|---|
| 27 g/L | urea |
| 35 g/L | calcium chloride |
| 45 g/L | lysine |
| 4 × 10^8 cells/mL | *L. sphaericus* |

The mixture further included trace elements and traces of, for example, salts and sugars (<1 wt %). Urea in the mixtures M6, M8, M9, M10, M11, M12, M17, M18, M19, M20, M21, M22, M23 served primarily as a carbonate source. In the mixtures M5, M7, M13, M14, M15, M16, M21, an organic calcium salt in each case served primarily as a carbonate source. In the mixture M15, moreover, yeast extract served additionally as a carbonate source. In the mixture M16, moreover, L-alanine served as a further carbonate source.

L-alanine, calcium lignosulfonate, calcium lactate (M5, M7), calcium acetate (M1, M14), styrene-acrylate dispersion, yeast extract, albumin, polyvinyl alcohol, polyvinyl acetate dispersion, starch ether, magnesium sulfate, lysine are the cohesion-modifying compounds in the present examples, if they did not serve as a carbonate source.

All of the components of the present mixture that are capable of biocementation, except for the bacteria, were in solid form. The bacteria of the strain *B. pseudofirmus* were present as a liquid culture in a culturing medium known from the prior art, as described for example in Jonkers H. M. et al., Tailor Made Concrete Structures—Walraven & Stoelhorst (eds), 2008, Taylor & Francis Group, London, ISBN 978-0-415-47535-8, Section 2.1, with 5 g/L yeast extract being used in the context of the present invention. *B. cohnii* and *B. halodurans* were present in the same culturing medium as *B. pseudofirmus*, and *A. crystallopoietes* was present in a known culturing medium, as described for example in Hamilton, R. W. et al., Journal of Bacteriology 1977, 129(2), 874-879 (see "Materials and Methods" section, pp. 874-875). *L. sphaericus* and *S. pasteurii* were present in the culturing media described in Example 1. The solid constituents and the bacteria in liquid culture were mixed directly prior to the use, with the solid constituents dissolving.

The mixtures were applied each in three replications to the experimental areas. The amount applied per square metre was consistently 4 litres per replication. Application took place using a pipette. Following application, the surface was spread smooth with a spatula. The measurement values reported are mean values of the three replications, which were typically in the region of 10% of the value ascertained.

Application of the reference mixtures and of the biocementation mixtures was followed by incubation over the entire observation period (28 days) at an atmospheric humidity of 20% to 60% and with multiple air change per day. In this period the minimum temperature prevailing was 14.2° C. and the maximum temperature prevailing was 25.2° C.

After 24 hours the penetration depth of immersion cones of different weights (150 g, 300 g and 600 g) and also, subsequently, the dust-suppressing effect in a wind tunnel, were determined as described in Example 1. The dust-suppressing effect in the wind tunnel without prior mechanical stressing was carried out with a separate sample: the cured sample was exposed for one minute to a wind speed of 12 m/s. The flow direction of the air struck the surface at an angle of 12.5°. The emission-related weight loss in weight percent was ascertained as described in Example 1.

After 48 hours, the breaking strength of the layers was determined. The breaking strength (maximum value of the force measurement) can be determined by means of the following method: the method is based on the standardized test method for strength determination in cement, DIN EN 196-1:2005-05. The breaking strength is measured using a digital (breaking) strength measuring instrument in accordance with the manufacturers instructions. A test specimen is pressed into the sample (to the point of breakage) using a crank-operation test bed, and the force applied is measured continuously. From a number of measurements (>3) the mean breaking strength is computed. The mean breaking strength is preferably between 0.5 and 1000 N, more preferably between 1 and 300 N.

Following the determination of the breaking strength, the mechanically stressed sample was placed in the wind tunnel and exposed for one minute to a wind speed of 12 m/s. The flow direction of the air struck the surface at an angle of 12.5°. The emission-related weight loss is determined using the formula stated in Example 1. This test serves as a reference for the long-term stability of the samples and also their dust suppression.

On selected samples, after a reaction time of 10 days and 28 days, respectively, determinations were made of the breaking strength and also the loss of mass on wind exposure, as described above.

Results

In the previous Example 1, the reduction in the emission-related weight loss by means of accelerated biocementation formulations was described. This example sets out how this finding can be extended to a broad group of soil-consolidating substances which accelerate the biocementation.

All of the inventive formulations described above exhibited a quicker stiffening profile than the reference systems R3 and R6. After 24 h, a cone with a weight of 150 g penetrated 14 mm into the reference systems R3 and R6, whereas the cone weighing 150 g penetrated 4 to 9.5 mm into inventive formulations (FIG. 3, top left). The same tendency was also apparent from the cones with a higher weight (FIG. 3, top left).

If the weight loss in the wind tunnel is determined after the mechanical verification, then the inventive mixtures exhibit an increased cohesiveness and hence an increased dust suppression. The weight loss after 24 hours reaction time, determination of the penetration depth and one minute of wind exposure in the wind tunnel (12 m/s) is shown at the top right in FIG. 3. In the case of the reference system R3, the percentage emission-related weight loss is 0.71%. The inventive formulations have a loss of mass of 0.07% to 0.56% (FIG. 3, top right). As a result of the more rapid stiffening profile, wind exposure causes fewer particles to be carried off from the sample.

After 48 hours reaction time, the inventive mixtures showed a higher breaking strength than the associated reference systems. In this case the breaking strength of the inventive mixtures was a multiple of that of the reference system R3 (FIG. 3, bottom left).

With the increasing age of the samples, the difference in the dust-suppressing effect after previous mechanical verification was even more sharply apparent: after 48 hours, the loss of weight after one minute of wind exposure in the wind tunnel (12 m/s) with prior mechanical stressing (determination of the breaking strength) was 1.30% for R2 and 0.85% for R3.

The inventive mixtures M15 to M23 showed a loss of mass after mechanical verification and wind exposure of 0.04% to 0.45% (cf. FIG. 3, bottom right).

If the study of the fracture-mechanical properties and of the emission-related weight loss in the wind tunnel was carried out after a long reaction time, the difference between the reference systems and the biocementing mixtures became even more clearly apparent:

Furthermore, the reference mixture R7 and also biocementation mixture M24 were produced, and were compared with one another as described above.

Reference 7 (R7):

| | |
|---|---|
| 50 g/L | calcium lignosulfonate |

Mixture 24 (M24):

| | |
|---|---|
| 48 g/L | urea |
| 44 g/L | calcium chloride |
| 50 g/L | calcium lignosulfonate |
| 4 × 10^8 cells/mL | *S. pasteurii* |

In the mixture M24 there were additionally trace elements and traces of, for example, salts and sugars (<1 wt %). Calcium lignosulfonate is the cohesion-modifying compound in mixture M24. The bacteria of the strain *S. pasteurii* were present in the culturing medium described in Example 1. The mixtures were prepared and stored as described previously.

These mixtures were found to consolidate within 48 hours (breaking strength not shown; in this regard, see also Example 5). With R7 a thin layer was formed, whereas for M24, a thicker, more cohesive layer was formed. These differences in the nature of the layer were reflected in a difference in emission-related weight loss. The mixtures R7 and M24 were tested after determination of the breaking strength, in a wind tunnel for one minute at 12 m/s of wind (as described above). The emission-related weight loss here was 11.3% for R7, and the emission-related weight loss of M24 was 0.21%. Selected mixtures and reference systems were allowed to react over a period of 48 hours. The results suggest to the skilled person that an increased cohesiveness produces advantages for long-lasting dust suppression.

After 10 and 28 days, the breaking strengths of the various agents were determined in comparison to the reference systems. The results achieved in this case were comparable to those described above (data not shown). The loss of mass after mechanical verification after 10 days is represented in Table 1. Here it is found that the more cohesive biocement layers had a significantly better dust suppression after mechanical testing.

TABLE 1

Loss of mass after 10 days reaction time, mechanical testing
and one minute of wind exposure at 12 m/s wind speed for
various reference mixtures and also biocementation mixtures

| Mixture or reference system | Loss of mass after mechanical testing and one minute of wind exposure at 12 m/s wind speed, [weight percent] |
|---|---|
| R3 | >50 |
| R7 | 50.1 |
| M5 | 0.67 |
| M6 | 1.56 |
| M7 | 0.26 |
| M8 | 0.14 |
| M9 | 0.16 |
| M10 | 0.96 |
| M11 | 4.82 |
| M12 | 0.15 |
| M13 | 0.67 |
| M14 | 1.82 |
| M16 | 0.77 |
| M17 | 6.31 |
| M18 | 2.52 |
| M19 | 0.04 |
| M20 | 8.1 |
| M21 | 0.63 |
| M22 | 0.26 |
| M23 | 0.11 |
| M24 | 0.06 |

Comparable effects on emission reduction were also achieved with slightly modified formulations of the biocementation mixtures M5 to M24, containing calcium acetate, calcium propionate, calcium formate, calcium lactate and/or calcium chloride at a concentration of in each case 0.05 to 0.4 M and not exceeding a total calcium concentration of 1 M (data not shown). A greater variation in the calcium lignosulfonate concentration (e.g. 1 to 500 g/L), L-alanine concentration (e.g. 1 to 250 g/L), styrene-acrylate dispersion concentration (e.g. 1 to 350 g/L), polyvinyl alcohol concentration (e.g. 1 to 250 g/L), polyvinyl acetate dispersion concentration (e.g. 1 to 350 g/L), albumin concentration (1 to 200 g/L), starch ether concentration (e.g. 1 to 90 g/L), magnesium sulfate concentration (e.g. 1 to 300 g/L), lysine concentration (e.g. 1 to 250 g/L), urea concentration (e.g. 0.1 to 1.0 M) or in the amount of yeast extract (e.g. 0.1 to 150 g/L) likewise produced good emission reduction. The dust suppression was dependent in each case on the used concentrations of the constituents of the respective biocementation mixture (data not shown). Corresponding observations were also made for correspondingly modified inventive formulations of Examples 3, 4 and 5.

Comparable effects on emission reduction were also achieved with the biocementation mixtures M5 to M24, in which the bacteria were present as spray-dried and/or freeze-dried powder. For this purpose, the respective bacteria cells were concentrated in the culturing medium, then expertly dried and dissolved in the corresponding medium prior to application. It was found that when using dried bacteria cells, it was in fact possible to achieve a further slight reduction in the emission-related weight loss (data not shown).

Similarly, comparable effects of all the abovementioned mixtures were achieved in mixtures where calcium lignosulfonate was replaced by lignosulfonic acid, sodium lignosulfonate, potassium lignosulfonate and ammonium lignosulfonate, respectively. Furthermore, on removal of the cation source (here: calcium source) in the mixtures M5, M6, M7, M8, M9, M10, M11, M12, M13, M14, M18, M19, M21, M22 and M23, a comparable dust suppression effect was achieved. Where at the same time calcium lignosulfonate was replaced by lignosulfonic acid, sodium lignosulfonate, potassium lignosulfonate and ammonium lignosulfonate, respectively, and the cation source (here: calcium source) was removed, a comparable effect was again achieved.

EXAMPLE 3: ANALYSIS OF SELECTED MIXTURES AND ALSO REFERENCE SYSTEMS IN A WIND TUNNEL AT AN EXTERNAL TESTING LABORATORY

Material and Methods

In an external testing laboratory, the emission-reducing effect of the reference systems R1 (dry) and R2 (water application) and also of a dust-suppressing agent R8 available commercially on the market was tested in comparison to the mixture M20.

The soil substrate used was a fine calcium carbonate with the designation ESKAL 60. This fine-particle dust is used as a test dust for various analyses in wind tunnel analysis among others. ESKAL 60 possesses a precisely defined particle distribution. The mean grain size is 60 μm. The skilled person is aware that the test dust used must be appropriate to the wind tunnel used. Plastic dishes (diameter 87 mm, height 16 mm) were filled to the brim with the soil substrate, and the precise weight of the respective vessels was ascertained.

All of the samples were then provided with the respective surface treatment agent. The treated samples were labelled in the manner of a blind test in such a way that assignment to the respective surface treatment agents was not possible. Reference Mixture 8 (R8): 50 g/L Polymer Dispersion (Various)

The product available commercially on the market is a crust-forming agent. It was used according to manufacturer specifications and applied at 1.5 L/m$^2$. Furthermore, the emission-reducing effect of biocementation mixture M20 was studied. Mixture 20 was applied at comparable application rates, measured in mass of solid per unit surface area, to R8.

All of the samples, apart from R2, were equilibrated under defined ambient conditions (31% relative humidity, 23° C.) in a conditioning cabinet for 24 hours and then weighed again. The samples of the reference R2 were not applied until immediately before exposure in the wind tunnel. The wetting application (R2) was treated with deionized water from a spray bottle positioned consistently, immediately before the beginning of experimentation. The mass input of water was recorded.

At the start of experimentation, the samples were positioned, in randomized order, individually and with covering, in the middle of the wind tunnel (D=0.15 m, L=5.4 m). With the beginning of experimentation, the particle counter was activated, the covering on the sample material was removed, and the wind tunnel was sealed. All of the samples were exposed each individually for 15 minutes to a flow over the sample with a mean aerosol speed of 6 m/s, measured at the height of the sample, with a determination of particle size distribution every 30 seconds. All of the experiments were repeated three times. The emission-related loss of mass was determined using the formula specified in Example 1. The measurement values reported are mean values of the three replications, and were typically in the region of 10% of the value ascertained.

Results

The experiments show that the surface treatment agent M20 has reliably prevented dust being carried off. Emissions occurred only with the agent R8 available commercially on the market and also with the untreated samples (R1) and with the water-treated samples (R2).

In the case of the agent R8 available commercially on the market, this behaviour is manifested by the emergence of up to 180 captured particles in the first 90 seconds and by a mean loss of mass of 1.86%.

The untreated calcium carbonate samples (R1) serving for comparison had the greatest level of particles being carried off among all of the samples under review. Beginning at 2500 to 3800 particles/30 seconds, the emissions rose to 4100 to 5500 particles/30 seconds, before dropping steadily to a level of around 100 particles/30 seconds. The emission-related mean loss of mass was 74.55%.

In the case of the water-treated samples, particle release was delayed; here, particle release began only after around 200 seconds. The emission-related mean loss of mass is 66.94%. The delayed release is probably due to the evaporation of the water in the wind tunnel.

In the case of biocementation mixture M20, there was no detectable particle release, and the emission-related loss of mass was 0.003% (cf. FIG. 4).

EXAMPLE 4: OPEN-AIR DEMONSTRATION OF THE EMISSION-REDUCING EFFECT IN A LIMESTONE MINE

Material and Methods

In order to control the suppression of dust under open-air conditions, a biocementation mixture M20 was applied in comparison to the reference mixture R3 (as control) at three sites in a limestone quarry, illustratively. The three sites within the mine were located on a road (site 1 in FIG. 5, top left), on a fresh dump (site 2 in FIG. 5, top left) and also in an active pit (site 3 in FIG. 5, top left). Application took place in each case to 150 m² of area, with an application volume of three litres per square metre. Implemented as a further reference was the emission-reducing measure currently used in the daily operation of the mine: the application of three litres of water per square metre (FIG. 5, top right). This took place in the same way as for reference R2. The reference areas were located directly adjacent to the test areas of the biocementation mixtures and saw the same operation levels. The delivery area of mixture M20 on the road is depicted at the bottom left in FIG. 5; the delivery area of mixture M20 on the dump is depicted at the bottom right in FIG. 5.

Following application, all 9 areas where application had taken place, as illustrated at the bottom of FIG. 5, were pegged off and allowed to respond over 48 hours. After 24 hours, layer formation was assessed visually, and after 48 hours the breaking strength of the layers was measured (data not shown).

The open-air experiment was rated for 4 weeks. The temperature during this period varied between 5.3° C. at night and 26.3° C. in the day. The relative humidity varied between 64% at night and 31% in the day. Within the experimentation period, the total amount of precipitation was 11 L/m².

The dust suppression effect was measured at different times, after 48 h, 7 days and 28 days. After 48 hours, the dust suppression effect was verified at a number of points using a Bosch leaf blower (GBL 18V-120). The wind speeds used here were 40 m/s from a distance of one metre from the surface, and an incident angle of around 15° was used. The inspection, carried out by three mine employees, took place in the form of the classifications of "severe dusting", "moderate dusting" and "no dusting". All of the employees are skilled in the field of area dust suppression in mining, each having more than 10 years of relevant professional experience. "No dusting" was used when no visible particles were removed. "Severe dusting" was used when the test area formed dust in the same way as an untreated area. "Moderate dusting" was used when the dust formation was reduced in comparison to the untreated area. The expertly obtained data was additionally verified by particle analyses (data not shown).

After the first testing (48 h), the areas under study was again released for operation and the barriers were removed. At this point, care was taken to ensure that all of the areas were equally exposed. The visual inspection of the areas and also the measurement of the dust suppression effect were carried out for all of the areas after 7 days and 28 days as well as after 48 hours.

Results

After one day, the layer of the accelerated biocementation formulation M20 was perceptible, whereas that of the reference mixture 3 had not consolidated. After a reaction time of 48 hours, it was possible to reproduce the relative breaking strengths of the layers as described in Example 2 (data not shown).

The testing of the dust suppression effect using the Bosch (GBL 18V-120) led to the following rating by the experts after 48 hours:

Mixture 20 (M20)—"no dusting"

Reference 3 (R3)—"moderate dusting"

Reference 2 (R2)—"moderate dusting".

In this case there was no difference between the dust suppression effect at each site of application.

Seven days after application, the three application sites of road, dump and pit were inspected according to the scheme described above. On the dump and in the pit, it was apparent that in the case of the mixture 20 (M20) there was still a firm layer apparent, whereas there was no layer formed in the case of the reference mixtures R2 and R3. The dust suppression tendency was rated as follows:

Mixture 20 (M20)—"no dusting"

Reference 3 (R3)—"moderate dusting"

Reference 2 (R2)—"severe dusting".

On the road, the effect was even more clearly apparent. This is due to the effect of the invention whereby the inventive biocementation mixture M20 has a high mechanical strength. On the road, the following rating was undertaken:

Mixture 20 (M20)—"no dusting"

Reference 3 (R3)—"severe dusting"

Reference 2 (R2)—"severe dusting".

Results comparable to those after 7 days were achieved after 28 days. After this time, the experiment was discontinued.

Similarly, comparable effects on emission reduction for all of the above-stated mixtures were obtained in mixtures wherein the bacteria were present as powders. For this purpose, the respective bacterial cells were concentrated in the culturing medium, then expertly dried and dissolved before use in the corresponding medium.

This example impressively shows that the inventive formulations, on account of their more rapid consolidation and higher strength, exhibit an improved dust suppression effect under mechanical loading. Moreover, crusts generated with inventive formulations can be maintained over a longer period by comparison with existing systems.

EXAMPLE 5: SYNERGISTIC EFFECT OF BIOCEMENTATION FORMULATIONS WITH COHESION-MODIFYING COMPOUNDS

Material and Methods

The experiment was carried out in the laboratory in plastic vessels with a volume of 450 cm³. The application area was in each case 78.5 cm².

The soil substrate in the experiment consisted of a silica sand having a grading of 0-2 mm. The sand had been both washed and dried by the manufacturer, and was used directly. 800 g of silica sand per plastic vessel were used as soil substrate. The plastic vessel was full to the brim.

For a control, reference mixtures were utilized, consisting of the following constituents in the following concentrations:

Reference 3 (R3):

| | |
|---|---|
| 48 g/L | urea |
| 44 g/L | calcium chloride |
| 4 × 10^8 cells/mL | *S. pasteurii* |

Reference 7 (R7):

| | |
|---|---|
| 50 g/L | calcium lignosulfonate |

Reference 9 (R9)

| | |
|---|---|
| 25 g/L | polyvinyl alcohol |

Reference 10 (R10)

| | |
|---|---|
| 15.6 g/L | polyvinyl alcohol |

Reference 11 (R11):

| | |
|---|---|
| 9.4 g/L | starch ether |

Reference 12 (R12):

| | |
|---|---|
| 50 g/L | humic acid |

Reference 13 (R13):

| | |
|---|---|
| 50 g/L | sodium silicate |

Reference 14 (R14):

| | |
|---|---|
| 25 g/L | styrene-butadiene dispersion |

The mixture R3 further included trace elements and traces of, for example, salts and sugars (<1 wt %). Urea in this medium served primarily as a carbonate source.

All components of the present mixtures which are capable of biocementation, except for the styrene-butadiene dispersion, humic acid, and also the bacteria of the strain *S. pasteurii*, were in solid form. The bacteria were present as a liquid culture in a culturing medium known from the prior art, as described for example in Cuthbert, M. O. et al., Ecological Engineering 2012, 41, 32-40 (see section 2.2, page 33), with 5 g/L yeast extract being used in the context of the present invention. The solid constituents and the bacteria in liquid culture were mixed directly prior to use, with the solid constituents dissolving.

The reference mixtures were applied each in three replications to the experimental areas. The amount applied per square metre was consistently 4 litres per replication. Application of the fully dissolved samples was carried out using a pipette. Following application, the surface was spread smooth with a spatula. The measurement values reported are mean values of the three replications, which were typically in the region of 10% of the value ascertained.

Liquid biocementation mixtures were utilized, consisting of the following constituents in the following concentrations:

Mixture 12 (M12):

| | |
|---|---|
| 48 g/L | urea |
| 44 g/L | calcium chloride |
| 9.4 g/L | starch ether |
| 4 × 10^8 cells/mL | *S. pasteurii* |

Mixture 19 (M19):

| | |
|---|---|
| 48 g/L | urea |
| 44 g/L | calcium chloride |
| 25 g/L | polyvinyl alcohol |
| 4 × 10^8 cells/mL | *S. pasteurii* |

63

Mixture 24 (M24):

| | |
|---|---|
| 48 g/L | urea |
| 44 g/L | calcium chloride |
| 50 g/L | calcium lignosulfonate |
| 4 × 10^8 cells/mL | S. pasteurii |

Mixture 25 (M25):

| | |
|---|---|
| 48 g/L | urea |
| 44 g/L | calcium chloride |
| 15.6 g/L | polyvinyl alcohol |
| 4 × 10^8 cells/mL | S. pasteurii |

Mixture 26 (M26):

| | |
|---|---|
| 48 g/L | urea |
| 44 g/L | calcium chloride |
| 50 g/L | humic acid |
| 4 × 10^8 cells/mL | S. pasteurii |

Mixture 27 (M27):

| | |
|---|---|
| 48 g/L | urea |
| 44 g/L | calcium chloride |
| 50 g/L | sodium silicate |
| 4 × 10^8 cells/mL | S. pasteurii |

Mixture 28 (M28):

| | |
|---|---|
| 48 g/L | urea |
| 44 g/L | calcium chloride |
| 25 g/L | styrene-butadiene dispersion |
| 4 × 10^8 cells/mL | S. pasteurii |

The mixture M12, M19, M24, M25, M26, M27 and M28 further included trace elements and traces of, for example, salts and sugars (<1 wt %). Urea in this medium served primarily as a carbonate source.

Starch ether, polyvinyl alcohol, calcium lignosulfonate, humic acid (in each case as polymer), sodium silicate and styrene-butadiene dispersion are the cohesion-modifying compound in the mixtures M12, M19, M24, M25, M26, M27 and M28. Urea served in the mixtures M12, M19, M24, M25, M26, M27 and M28 as a carbonate source.

All components of the present mixtures which are capable of biocementation, except for the styrene-butadiene dispersion, humic acid, and also the bacteria of the strain S. pasteurii, were in solid form. The bacteria were present as a liquid culture in a culturing medium known from the prior art, as described for example in Cuthbert, M. O. et al., Ecological Engineering 2012, 41, 32-40 (see section 2.2, page 33), with 5 g/L yeast extract being used in the context of the present invention. The solid constituents and the bacteria in liquid culture were mixed directly prior to use, with the solid constituents dissolving.

The mixtures were applied each in three replications to the experimental areas. The amount applied per square metre was consistently 4 litres per replication. Application of the fully dissolved samples was carried out using a pipette. Following application, the surface was spread smooth with a spatula. The measurement values reported are mean values of the three replications, which were typically in the region of 10% of the value ascertained.

Following the application of the reference mixtures and also of the biocementation mixtures, incubation took place over the total observation period for 28 days at an atmospheric humidity of 20% to 60% and with multiple changes of air per day. Within this period, the minimum temperature prevailing was 14.2° C. and the maximum temperature prevailing was 25.2° C.

After one, two, three, four, ten and 28 days, the breaking strength and the emission-related weight loss were conducted as described in Examples 1 and 2. Moreover, the layer thickness was measured:

After one, two, three, four, ten and 28 days, the breaking strength of the layers was determined. The breaking strength (maximum value of the force measurement) can be determined by means of the following method: the method is based on the standardized test method for strength determination in cement, DIN EN 196-1:2005-05. The breaking strength is measured using a digital (breaking) strength measuring instrument in accordance with the manufacturers instructions. A test specimen is pressed into the sample (to the point of breakage) using a crank-operation test bed, and the force applied is measured continuously. From a number of measurements (>3) the mean breaking strength is computed. The mean breaking strength is preferably between 0.5 and 1000 N, more preferably between 1 and 300 N.

Following the determination of the breaking strength, the layer thickness of the layer formed was determined. For this purpose, a manual measurement was carried out after mechanical breakage of the layer, by means of a calliper. The layer thickness was determined at six points on the broken layer; the deviation of the individual measurements was 1 mm. The layer thickness was documented as the arithmetic mean of the individual measurements.

Following the determination of the layer thickness, the mechanically stressed sample was placed in the wind tunnel and exposed for one minute to a wind speed of 12 m/s. The flow direction of the air struck the surface at an angle of 12.5°. The emission-related weight loss is determined using the formula stated in Example 1. This test serves as a reference for the long-term stability of the samples and also their dust suppression.

Results

In the previous Examples 1 to 4, formulations were described which exhibited a more rapid stiffening profile and a reduced emission-related weight loss. In the course of the analysis it emerged unexpectedly that for inventive mixtures there is not necessarily a correlation between breaking strength and emission reduction. A correlation would really have been expected, and has also been observed for agents described in the prior art, with reference to the reference mixtures R9 and R10 (FIG. 6). After a reaction time of four days, the reference systems gave a breaking strength of R9=53.8 N and R10=29.8 N. The emission-related weight loss after mechanical verification was 3.79% for R9 and 7.72% for R10. It was found that firmer reference systems exhibited a lower emission-related weight loss. Consequently, there was a negative correlation between breaking strength and emission-related weight loss. A comparable decrease in the emission-related weight loss when the fracture strength was increased was observed for the calcium lignosulfonate reference system: where calcium lignosulfonate is delivered in an amount of 25 to 400 g/m$^2$ calcium lignosulfonate per square metre of sand, there is a linear increase in the breaking strength and a decrease in the emission-related weight loss (data not shown).

In the case of inventive mixtures, after two days there was no observable direct correlation between high breaking strength and low emission-related weight loss (cf. Example 2). M24, for example, had a breaking strength of 14 N after four days, whereas the associated reference system R7 had a breaking strength of 26.5 N. R7, however, showed a significantly higher emission-related weight loss of 53%. There was almost no consolidation of the reference system 3 in this time (breaking strength R3=1.5 N), and it exhibited an emission-related weight loss, after determination of the breaking strength and wind exposure, of 51%. The combination of the two systems (mixture 24) produces an emission-reducing system in which the emission-related weight loss was only 0.87%. The breaking strength of this system was M24=14 N. In the context of the prior art, there was no expectation that this less break-strong mixture would have a significantly higher dust suppression. This is attributed to the synergistic effect between biocementation and the cohesion-modifying substances: M24, M19, M25 and M12 exhibited a significantly lower emission-related weight loss than their individual components R3 and R7, R3 and R9, R3 and R10, and R3 and R11 (FIG. 6). The breaking strength of these mixtures is shown at the top in FIG. 6, and the emission-related weight loss after mechanical verification at the bottom in FIG. 6. A high breaking strength, however, also has no adverse effect on the dust suppression, and under certain circumstances can be seen as an additional advantage of the biocementation mixtures (cf. Example 2). The effect of the cohesion-modifying substances lies here in the fracture mode of the biocement layer. After the breaking of the layer, R7 divides into numerous small fragments, whereas in the case of M24 there are only small holes left. The small fragments can easily be picked up by the wind and distributed.

Layer thickness determination of the layer formed produced the following values: the layer thickness of R7 was 8 mm, whereas M24 had a layer thickness of 14 mm.

Similar observations were also made when using the cohesion-modifying compounds starch ether (R11, M12), humic acid (R12, M26), sodium silicate (R13, M27) and styrene-butadiene dispersion (R14, M28). In said mixtures the breaking strength of the respective biocementation mixture is less than that of the respective reference, but the emission reduction is greater (cf. FIG. 6).

Comparable effects on emission reduction of the mixtures M12, M19, M24, M25, M26, M27 and M28 were also in the case of slightly modified formulations of the biocementation mixtures, that contained calcium acetate, calcium propionate, calcium formate, calcium pyruvate, calcium salicylate, calcium citrate and/or calcium chloride in a concentration of in each case 0.05 to 0.4 M and that did not exceed a total calcium concentration of 1 M (data not shown). A greater variation in the calcium lignosulfonate concentration (e.g. 1 to 500 g/L), polyvinyl alcohol concentration (e.g. 1 to 250 g/L), starch ether concentration (e.g. 1 to 90 g/L), humic acid concentration (e.g. 1 to 350 g/L), potassium and sodium silicate concentration (e.g. 1 to 450 g/L), polyvinyl alcohol, urea concentration (e.g. 0.1 to 1.0 M) or in the amount of yeast extract (e.g. 0.1 to 30 g/L) likewise produced effective emission reduction. The dust suppression was dependent in each case on the used concentrations of the constituents of the respective biocementation mixture (data not shown). Comparable effects were also achieved when the bacterial strain was replaced by *L. sphaericus, B. cohnii, B. halodurans, B. pseudofirmus* and *A. crystallopoietes* in the same cell count per millilitre (data not shown). When *B. cohnii, B. halodurans, B. pseudofirmus* and *A. crystallopoi-*

*etes* were used analogously in the same cell count per millilitre in the formulations, the basic constituents were further adapted to the requirements of the particular bacterial strain. The skilled person is aware here that with these non-ureolytically biocementing bacterial strains, the base medium must be adapted in analogy to the constituents listed in Example 2, especially in terms of a suitable metabolic starting material. The effect on emissions reduction of the mixtures was comparable to the results set out for *S. pasteurii* (data not shown).

Similarly, comparable effects were achieved on emission reduction for all of the above-stated mixtures in mixtures in which the bacteria were present as powders. For this purpose, the respective bacterial cells were concentrated in the culturing medium, then expertly dried and dissolved in the corresponding medium prior to use.

Similarly, comparable effects on emission reduction as for the mixture M24 were achieved in mixtures in which calcium lignosulfonate was replaced by lignosulfonic acid, sodium lignosulfonate, potassium lignosulfonate and ammonium lignosulfonate, respectively. The removal of the cation source (here: calcium source such as calcium chloride, for example) in the mixtures M12, M19, M24, M25, M26, M27 and M28 also achieved comparable results in dust suppression. Where there was both replacement of the lignin derivate (as described above, by lignosulfonic acid, for example) and removal of the cation source (here: calcium source), this also led to comparable results in dust suppression.

On the basis of the present results, it is a plausible assumption that the cation source, especially a calcium source, is optional when using cohesion-modifying compounds as disclosed here.

EXAMPLE 6: DETERMINATION OF THE MINIMUM REQUIREMENTS FOR COHESION-MODIFYING COMPOUNDS FOR SUITABILITY FOR REDUCING EMISSION-RELATED BIOCEMENT WEIGHT LOSS AND EXTENDING BIOCEMENT INTEGRITY

Material and Methods

The experiment was carried out in the laboratory in plastic vessels with a volume of 450 cm$^3$. The application area was in each case 78.5 cm$^2$.

The soil substrate in the experiment consisted of a silica sand having a grading of 0-2 mm. The sand had been both washed and dried by the manufacturer, and was used directly. 800 g of silica sand per plastic vessel were used as soil substrate. The plastic vessel was full to the brim.

For a control, reference mixtures were utilized, consisting of the following constituents in the following concentrations:

Reference 3 (R3):

| | |
|---|---|
| 48 g/L | urea |
| 44 g/L | calcium chloride |
| 4 × 10^8 cells/mL | *S. pasteurii* |

Reference 15 (R15):

| | |
|---|---|
| 50 g/L | polyvinyl acetate 20 (solid, granules) |

Reference 16 (R16):

| 50 g/L | polycarbonate (solid, granules) |
|---|---|

Reference 17 (R17):

| 50 g/L | vegetable oil (rapeseed oil) |
|---|---|

Reference 18 (R18):

| 12.5 g/L | long-chain fatty acid (stearic acid) |
|---|---|

Reference 19 (R19):

| 50 g/L | starch, untreated (solid, powder) |
|---|---|

The reference mixtures contained, instead of the constituent (iii), compounds which are not water-soluble or water-dispensable or water-emulsifiable.

The mixture R3 further included trace elements and traces of, for example, salts and sugars (<1 wt %). Urea in this medium served primarily as a carbonate source.

All components of the present mixtures which are capable of biocementation, except for the bacteria of the strain *S. pasteurii*, were in solid form. The bacteria were present as a liquid culture in a culturing medium known from the prior art, as described for example in Cuthbert, M. O. et al., Ecological Engineering 2012, 41, 32-40 (see section 2.2, page 33), with 5 g/L yeast extract being used in the context of the present invention. The solid constituents and the bacteria in liquid culture were mixed directly prior to use, with the water-soluble solid constituents dissolving. The non-water-soluble, non-water-dispersible and non-water-emulsifiable substances, respectively, were applied uniformly to the top layer of sand in advance, in order to achieve homogeneous application and to rule out any adverse effects on the dust suppression test arising from a possible non-homogeneous application.

The reference mixtures were applied each in three replications to the experimental areas. The amount applied per square metre was consistently 4 litres per replication. Application of the fully dissolved samples was carried out using a pipette. Following application, the surface was spread smooth with a spatula. The measurement values reported are mean values of the three replications, which were typically in the region of 10% of the value ascertained.

Liquid biocementation mixtures were utilized, consisting of the following constituents in the following concentrations:

Reference 20 (R20):

| 48 g/L | urea |
|---|---|
| 44 g/L | calcium chloride |
| 50 g/L | polyvinyl acetate 20 (solid, granules) |
| 4 × 10^8 cells/mL | *S. pasteurii* |

Reference 21 (R21):

| 48 g/L | urea |
|---|---|
| 44 g/L | calcium chloride |
| 50 g/L | polycarbonate (solid, granules) |
| 4 × 10^8 cells/mL | *S. pasteurii* |

Reference 22 (R22):

| 48 g/L | urea |
|---|---|
| 44 g/L | calcium chloride |
| 50 g/L | vegetable oil |
| 4 × 10^8 cell/mL | *S. pasteurii* |

Reference 23 (R23):

| 48 g/L | urea |
|---|---|
| 44 g/L | calcium chloride |
| 12.5 g/L | long-chain fatty acid |
| 4 × 10^8 cells/mL | *S. pasteurii* |

Reference 24 (R24):

| 48 g/L | urea |
|---|---|
| 44 g/L | calcium chloride |
| 50 g/L | starch, untreated (solid, powder) |
| 4 × 10^8 cells/mL | *S. pasteurii* |

Polyvinyl acetate 20 (solid, granules), polycarbonate (solids, granules), rapeseed oil, long-chain fatty acid and starch prove to be non-water-soluble and non-water-dispersible and non-water-emulsifiable, and therefore could not be counted among the cohesion-modifying compounds. Urea in the mixtures R20, R21, R22, R23 and R24 served as a carbonate source.

All components of the present mixtures which are capable of biocementation, except for rapeseed oil and the bacteria of the strain *S. pasteurii*, were in solid form. The bacteria were present as a liquid culture in a culturing medium known from the prior art, as described for example in Cuthbert, M. O. et al., Ecological Engineering 2012, 41, 32-40 (see section 2.2, page 33), with 5 g/L yeast extract being used in the context of the present invention. The solid constituents and the bacteria in liquid culture were mixed directly prior to use, with the water-soluble solid constituents dissolving. The non-water-soluble, non-water-dispersible or non-water-emulsifiable substances were applied evenly to the top layer of sand in advance.

The mixtures were applied each in three replications to the experimental areas. The amount applied per square metre was consistently 4 litres per replication. Application of the fully dissolved samples was carried out using a pipette. Following application, the surface was spread smooth with a spatula. The measurement values reported are mean values of the three replications, which were typically in the region of 10% of the value ascertained.

Following the application of the reference mixtures and also of the biocementation mixtures, incubation took place over the total observation period for 28 days at an atmospheric humidity of 20% to 60% and with multiple changes of air per day. Within this period, the minimum temperature prevailing was 14.2° C. and the maximum temperature prevailing was 25.2° C.

After one, two, three, four, ten and 28 days, the breaking strength of the layers was determined. The breaking strength (maximum value of the force measurement) can be determined by means of the following method: the method is based on the standardized test method for strength determination in cement, DIN EN 196-1:2005-05. The breaking strength is measured using a digital (breaking) strength measuring instrument in accordance with the manufacturers instructions. A test specimen is pressed into the sample (to the point of breakage) using a crank-operation test bed, and the force applied is measured continuously. From a number of measurements (>3) the mean breaking strength is computed. The mean breaking strength is preferably between 0.5 and 1000 N, more preferably between 1 and 300 N.

Following the determination of the breaking strength, the mechanically stressed sample was placed in the wind tunnel and exposed for one minute to a wind speed of 12 m/s. The flow direction of the air struck the surface at an angle of 12.5°. The emission-related weight loss is determined using the formula stated in Example 1. This test serves as a reference for the long-term stability of the samples and also their dust suppression.

In order to determine the water solubility, water dispersibility and water emulsifiability of the substances, the procedure adopted was as follows: to determine the water solubility of solid, pasty and gelatinous substances (for example polyvinyl acetate 20, polycarbonate, long-chain fatty acid and starch), 5 g of the substance were placed in 100 mL of distilled water and stirred at 20° C. for 24 hours. This was followed by filtration (Homyl 80-120 μm quantitative filter paper). The filter paper was expertly dried and weighed. The mass ascertained, minus the filter mass, is the mass of the residue in grams (defined herein). The difference between 5 g and the mass of the residue in grams divided by 0.1 L gives the solubility of the respective substance in g per litre.

To determine the water dispersibility of solid, pasty and gelatinous substances, 50 g of the respective substance were admixed with 1000 mL of distilled water and homogenized at 20° C. in the DISPERMAT® LC75 dissolver at 15 000 revolutions per minute for 5 minutes. The mixture was subsequently transferred to a centrifuge vessel and centrifuged at 100 g for 2 min. The supernatant was decanted off and the precipitate was expertly dried and weighed. The mass ascertained is the mass of the precipitate after centrifugation (defined herein). The difference between 50 g and the mass of the precipitate after centrifuging divided by 1 L is the water dispersibility of the substance (defined herein).

For determining the water solubility or water emulsifiability of a liquid substance (for example rapeseed oil), the following procedure was adopted. 5 g of the substance were combined with 100 g of distilled water and stirred for 24 hours. The mixture was then transferred to a separating funnel. The mixture was stored in the separating funnel for 5 minutes. If no phase separation occurred after this time, the mixture was left to stand for a further 2 hours, preferably a further 10 hours. If no phase separation occurred, the substance was deemed to be water soluble. The water solubility of the substance in this case is at least 50 grams per litre. If phase separation occurred, the phases were separated in the separating funnel and the organic phase was dried over sodium sulfate. The weight of the dried organic phase was determined (mass of the organic phase in grams, defined herein). The difference between 5 g and the mass of the organic phase in grams divided by 0.1 L gave the water emulsifiability of the liquid substance. Water solubility, water dispersibility and water emulsifiability are used synonymously in the context of the invention. The limit value for water solubility, water dispersibility and water emulsifiability, respectively, for a compound of constituent (iii) is defined as being 1 g per litre.

A further-preferred separation technique for dispersed and undispersed fractions is centrifugation. After appropriate drying, it is possible to determine the mass of the residue in grams and also, from this, the water solubility or water dispersibility.

Results

In the previous Examples 1 to 5, biocementation formulations were described which together with cohesion-modifying compounds exhibited a synergistic effect and showed a reduced emission-related weight loss.

With the use of the reference mixtures R20 to R24 it emerged that the use of polycarbonate, polyvinyl acetate 20, rapeseed oil, long-chain fatty acid and insoluble starch does not lead to any synergistic effect in relation to consolidation and emission reduction (FIG. 7). The application of the polymers (R15, R16) does not lead to a reduction in the emission-related loss weight: the emission-related weight loss for R20 and R21 after four days of reaction and mechanical verification and also one minute of wind exposure at 12 m/s is more than 50 wt %. This is therefore no different from the emission-related weight loss for the respective reference formulations R3 and R15 and also R3 and R16. The lack of a synergistic effect is probably due to the non-water-solubility of these polymers. The water solubility or water dispersibility of polycarbonate and polyvinyl acetate 20, respectively, in the assay described was less than 1 g per litre (data not shown).

Only the application of starch to the surface resulted in a slightly increased breaking strength of the layers (11 N), but there is no synergistic effect with the biocementation (cf. R19 and R24 in FIG. 7). The emission-related weight loss was 34 wt %.

Comparable values were also obtained after 10 and 28 days (data not shown).

Comparable effects were also achieved when the bacterial strain was replaced by *L. sphaericus, B. cohnii, B. halodurans, B. pseudofirmus* and *A. crystallopoietes* in the same cell count per millilitre (data not shown). When *B. cohnii, B. halodurans, B. pseudofirmus* and *A. crystallopoietes* were used analogously in the same cell count per millilitre in the formulations, the basic constituents were further adapted to the requirements of the particular bacterial strain. The skilled person is aware here that with these non-ureolytically biocementing bacterial strains, the base medium must be adapted in analogy to the constituents listed in Example 2, especially in terms of a suitable metabolic starting material. The effect on emissions reduction of the mixtures was comparable to the results set out for *S. pasteurii* (data not shown).

The skilled person therefore realizes that cohesion-modifying compounds in the sense of the invention must have a certain water solubility and/or water emulsifiability and/or water dispersibility in order to be able to produce the synergistic effect with the biocementation.

The removal of the cation source (here: calcium source) in the mixtures stated above showed comparable results in relation to dust suppression.

EXAMPLE 7: FURTHER FIELDS OF APPLICATION OF THE INVENTIVE MIXTURES

Material and Methods

Pelletizing

The experiment was carried out in the laboratory, in a laboratory pelletizer. For this purpose, 100 g of iron ore (haematite powder) were introduced, and liquid biocementation mixtures were utilized for dust suppression/pelletization, these mixtures consisting of the following constituents in the following concentrations:

Reference 3 (R3):

| | | |
|---|---|---|
| 48 g/L | | urea |
| 44 g/L | | calcium chloride |
| 4 × 10^8 cells/mL | | *S. pasteurii* |

Mixture 7 (M7):

| | | |
|---|---|---|
| 5 | g/L | yeast extract |
| 21 | g/L | calcium acetate |
| 34.9 | g/L | calcium chloride |
| 46.2 | g/L | calcium lactate |
| 25 | g/L | calcium lignosulfonate |
| 4 × 10^8 | cells/mL | *B. halodurans* |

Mixture 8 (M8):

| | | |
|---|---|---|
| 36 | g/L | urea |
| 35 | g/L | calcium chloride |
| 10 | g/L | yeast extract |
| 4 × 10^8 | cells | *L. sphaericus* |

Mixture 9 (M9):

| | | |
|---|---|---|
| 27 | g/L | urea |
| 17 | g/L | calcium chloride |
| 31 | g/L | albumin |
| 4 × 10^8 | cells | *L. sphaericus* |

Mixture 22 (M22):

| | | |
|---|---|---|
| 27 | g/L | urea |
| 47 | g/L | calcium lignosulfonate |
| 12 | g/L | calcium chloride |
| 4 × 10^8 | cells | *S. pasteurii* |

Additionally, the mixture contains trace elements and traces of, for example, salts and sugars (<1 wt %). Urea in the mixtures M8, M9 and M22 served primarily as a carbonate source. In the mixture M7, calcium lactate served as carbonate source.

Calcium lignosulfonate, yeast extract and albumin in the mixtures M7, M8, M9 and M22 are the (water-soluble and/or water-dispersible and/or water-emulsifiable) cohesion-modifying compounds.

All components of the present mixture that are capable of biocementation, except for the bacteria, were in solid form. The bacteria were present as described in Examples 1 to 6. The solid constituents and the bacteria in liquid culture were mixed immediately prior to use, with the solid constituents dissolving.

This experiment was carried out also with woodchips, in order to study the capacity of the biocementation mixtures to bind woodchips.

20 mL of the respective biocement mixture were sprayed onto 100 g of iron ore (haematite powder) and left to react for 5 minutes at a rate of 30 revolutions per minute.

After five minutes, a determination was made of the breaking strength of the resultant pellets: for this purpose, first pellets of similar diameter were selected: the diameter determined with the aid of a calliper. The pellet diameter was measured at three points on the pellet; the deviation of the individual measurements was 1 mm. Pellets were selected whose diameter corresponded to 11±1 mm. The breaking strength (maximum value of the force measurement) of the pellets can be determined by means of the following method: the method is based on the standardized test method for strength determination in cement, DIN EN 196-1:2005-05. The breaking strength is measured using a digital (breaking) strength measuring instrument in accordance with the manufacturers instructions. A cylindrical test plate is mounted on the pellet with the aid of a crank-operation test bed, and then pressed into the pellet (to the point of breakage). The force applied is measured continuously. From a number of pellets (>3) the mean breaking strength is computed. The mean breaking strength of the pellets is preferably between 0.5 and 500 N, more preferably between 1 and 150 N.

Evaporation Control

The experiment was conducted in the laboratory in plastic vessels with a volume of 1000 cm$^3$. The application area in each case was 29.2 cm$^2$.

The soil substrate in the experiment consisted of a silica sand having a grading of 0-2 mm. The sand had been both washed and dried by the manufacturer and was used directly. 2200 g of silica sand per plastic vessel were used as soil substrate. The plastic vessel was full to the brim.

For control, reference mixtures were utilized, consisting of the following constituents in the following concentrations:

Reference 2 (R2): Application of water.

Liquid biocementation mixtures were utilized, consisting of the following constituents in the following concentrations:

Reference 3 (R3):

| | | |
|---|---|---|
| 48 | g/L | urea |
| 44 | g/L | calcium chloride |
| 4 × 10^8 | cells | *S. pasteurii* |

Mixture 11 (M11):

| | | |
|---|---|---|
| 48 | g/L | urea |
| 44 | g/L | calcium chloride |
| 3.9 | g/L | polyvinyl acetate dispersion |
| 4 × 10^8 | cells | *S. pasteurii* |

Mixture 16 (M16):

| | | |
|---|---|---|
| 1.07 | g/L | ammonium chloride |
| 21 | g/L | calcium acetate |
| 15 | g/L | L-alanine |
| 34.9 | g/L | calcium chloride |
| 0.40 | g/L | sodium hydroxide |
| 1 | g/L | yeast extract |

-continued

| | | |
|---|---|---|
| 46.2 | g/L | calcium lactate |
| 4 × 10^8 | cells | *A. crystallopoietes* |

Mixture 22 (M22):

| | | |
|---|---|---|
| 27 | g/L | urea |
| 47 | g/L | calcium lignosulfonate |
| 12 | g/L | calcium chloride |
| 4 × 10^8 | cells | *S. pasteurii* |

The mixture additionally included trace elements and traces of, for example, salts and sugars (<1 wt %). Urea in the mixtures R3, M11 and M22 served primarily as a carbonate source. In the mixture M16, calcium lactate served as carbonate source.

Yeast extract, L-alanine, polyvinyl acetate dispersion and calcium lignosulfonate are the cohesion-modifying compounds in the mixtures M11, M16 and M22.

All of the components of the present mixtures that are capable of biocementation, except for the bacteria of the strains *A. crystallopoietes, L. sphaericus* and *S. pasteurii*, were in solid form. The bacteria were present as a liquid culture in the culturing media described in Examples 1 to 6. The solid constituents and the bacteria in liquid culture were mixed immediately prior to use, with the solid constituents dissolving.

Before the application of the respective mixtures, the sand was wetted with water, so that the sand is fully impregnated with water when the mixtures are subsequently applied. The respective mixtures were then applied each in three replications to the experimental areas. The application rate per square metre was consistently 10 litres per replication. The fully dissolved samples were applied using a pipette. Following application, the surface was spread smooth with a spatula. The measurement values reported are mean values of the three replications, lying typically in the region of 10% of the value ascertained.

The applied mass of the water was determined gravimetrically. For this purpose, the mass of the sand-filled sample vessel was determined before and after application of the water and of the respective biocementation mixture (mass before application, mass after application, both defined herein). The difference in the mass after application and the mass before application, minus the solid contained in the respective biocementation mixtures (cf. M11, M16, M22), is the applied amount of water (defined herein). The solid present in the respective biocementation mixture is given from the respective solid concentration multiplied by the respective application volume. The sum total of the mass before application and the solid contained in the respective biocementation mixture is the total solids mass of the beaker (defined herein).

The application of the reference mixtures and also of the biocementation mixtures was followed by incubation over the entire observation period for 168 days at an atmospheric humidity of 20% to 60% and with multiple changes of air per day. Within this period the minimum temperature prevailing was 14.2° C. and the maximum temperature prevailing was 25.2° C.; all of the mixtures were exposed to exactly the same external conditions. The mass of the sample vessel at various points in time was measured and documented (sample mass$_{day\ xy}$).

The relative soil humidity on the respective day of measurement, in percent (day xy), was determined with the following formula:

$$\text{Relative soil humidity}_{day\ xy} = [(\text{sample mass}_{day\ xy} - \text{total solids mass of the beaker})/\text{applied amount of water}]*100$$

This experiment was carried out likewise with woodchips, mine tailings and rural earth. For this purpose, the uppermost five centimetres of the sand layer were replaced by woodchips, mine tailings or rural earth, respectively, and this as the soil substrate was treated as described above with the mixtures R3, M11, M16 and M22. The total solids mass was adapted as a result of the weight of the woodchips, mine tailings and rural earth, respectively.

Decontamination

Liquid biocementation mixtures were utilized, consisting of the following constituents in the following concentrations:

Reference 9 (R9)

| | | |
|---|---|---|
| 25 | g/L | polyvinyl alcohol |

Reference 25 (R25):

| | | |
|---|---|---|
| 48 | g/L | urea |
| 4 × 10^8 | cell/mL | *S. pasteurii* |

Mature 20 (M20):

| | | |
|---|---|---|
| 27 | g/L | urea |
| 47 | g/L | calcium lignosulfonate |
| 4 × 10^8 | cells/mL | *S. pasteurii* |

Mature 29 (M29):

| | | |
|---|---|---|
| 1 | g/L | yeast extract |
| 25 | g/L | calcium lignosulfonate |
| 21 | g/L | sodium acetate |
| 46.2 | g/L | sodium lactate |
| 4 × 10^8 | cells/mL | *B. cohnii* |

Mature 30 (M30):

| | | |
|---|---|---|
| 48 | g/L | urea |
| 50 | g/L | humic acid |
| 4 × 10^8 | cells/mL | *S. pasteurii* |

Mature 31 (M31):

| | | |
|---|---|---|
| 27 | g/L | urea |
| 47 | g/L | sodium lignosulfonate |
| 4 × 10^8 | cells/mL | *S. pasteurii* |

Mature 32 (M32):

| | | |
|---|---|---|
| 48 | g/L | urea |
| 25 | g/L | polyvinyl alcohol |
| 4 × 10^8 | cells/mL | *L. sphaericus* |

In addition, the mixtures R25, M20, M29, M30, M31 and M32 include trace elements and traces of, for example, salts and sugars (<1 wt %). Urea in the mixtures M20, M30, M31 and M32 served primarily as a carbonate source; sodium acetate and sodium lactate in the mixture M29 served primarily as a carbonate source. These mixtures optionally contained one of the following metal salts (0.1 M): nickel(II) chloride, iron(III) chloride, copper(II) chloride. If iron(III) chloride was used, hydrochloric acid (0.1 M) was likewise present. Each metal salt was combined with each mixture. The designation used was as follows: metal salt+respective mixture. For the metal salts, the following designation is used: iron(III) chloride=FeCl3, nickel(II)chloride=NiCl2, copper(II) chloride=CuCl2. The mixture in which, for example, as well as agent 20 there was also copper(II) chloride present is listed as CuCl2+M20 (cf. FIG. 8). Each metal salt solution was also subjected to the respective treatment without the addition of the respective mixture.

All of the components, including the respective bacteria, were in solid form. In the cases of the pulverulent bacteria, the powder was a powder expertly dried. All of the components apart from the respective bacterial powder were mixed directly before use, with the solid constituents dissolving. As soon as the components were fully dissolved, the respective bacterial powder was added and dissolved.

After the mixtures had been combined with the bacterial powder, the mixture was stirred for 5 minutes and then left to react for 24 hours. The resultant precipitate was subsequently separated by centrifugation (3000 g, 10 min) and decanted off. The mass of the moist, heavy metal-containing precipitate was ascertained—moist mass of the heavy metal-containing precipitate (defined herein). The moist, heavy metal-containing precipitate was subsequently dried in a stream of nitrogen and the mass of the heavy metal-containing precipitate (defined herein) was determined. The presence of the respective heavy metal ion was confirmed quantitatively by atomic spectroscopy. As a control, the respective mixtures were produced without the presence of the respective metal salt (M20, M29, M30, M31 and M32) and treated according to exactly the same procedure (5 min stirring, 24 reaction, centrifugation, decanting, drying). The mass of this precipitate after decanting is the moist mass of the control precipitate (defined herein). After drying, the mass of the control precipitate was determined (defined herein). The respective supernatant was also studied by absorption spectroscopy and/or atomic spectroscopy for the presence of heavy metal ions. In this case a suitable wavelength with appropriate sensitivity was used. The concentration of the respective heavy metal ion as obtained from this analysis is the residual heavy metal ion concentration (defined herein). The residual heavy metal ion concentration divided by 0.1 mol per L multiplied by 100 is the residual heavy metal ion content of the supernatant in percent (defined herein). The respective metal salt solution was likewise stirred for 5 minutes, incubated for 24 h and centrifuged for 3000 g for 10 min, followed by determination of the residual heavy metal ion concentration.

Results

In the testing of the inventive biocementation mixtures on various substrates, further unexpected observations were made, which are developed further below. This gives rise to further, potential fields of application, which are set out further in the present example:
Pelletizing In the application of the inventive formulations to a moving ion ore sample, with the intention of preventing dust formation, it was found that small agglomerates or pellets were formed after application. This observation was taken up in order to form pellets with the biocementation mixtures M7, M8, M9 and M22 in a laboratory pelletizing plate.

As well as reduced emissions during production, these pellets also exhibited a greater strength than was possible with the reference formulations (R3). A pellet in each case produced using different agents M7, M8 and M9 (from left to right) is shown at the top in FIG. 8.

The breaking strength of the pellets was as follows for the various agents: M7=28 N, M8=29 N, M9=30 N, M22=27 N—and was therefore above that of R3. Pellets produced using R3 had a breaking strength of 3 N 5 minutes after production. Processing the pellets produced with reference 3 proved to be difficult, since the pellets produced with R3 shattered very easily. This is presumably because of the absence of the cohesion-modifying compound. Cohesion-modifying substances therefore also permit the production of a biocement which can be used for pelletizing.

The mixtures according to the invention are also capable of binding and aggregating woodchips.

It was also found that when using the mixtures in which all of the components, including the bacteria, were present as powders, similar results were achieved in respect of emissions reduction. For this purpose, all of the pulverulent components were mixed and the above-described amount of water was added in the laboratory pelletizer (data not shown). Comparable effects were also achieved when the bacterial strain was replaced by *L. sphaericus, B. cohnii, B. halodurans, B. pseudofirmus* and *A. crystallopoietes* in the same cell count per millilitre (data not shown). Where *B. cohnii, B. halodurans, B. pseudofirmus* and *A. crystallopoietes* were used analogously in the same cell count per millilitre in the formulations, the basic constituents were further adapted to the requirements of the particular bacterial strain. The skilled person is aware here that in the case of these non-eurolytically biocementing bacterial strains, the base medium has to be adapted in analogy to the constituents listed in Example 2, particularly in relation to a suitable metabolic starting material. In this case it was found that effective pelletization was achieved with all of the bacterial strains (data not shown).

Unexpectedly, it emerged that after formation of the biocement, some substrates dried more slowly in the laboratory pelletizer, and consequently the effect of the biocementation mixtures on evaporation was studied at a deeper level.
Evaporation Control The drying rate of the sand was reduced by effective layer formation. This is apparent from the higher relative soil humidity of the samples in which the mixtures M11, M16 and M22 in comparison to water application (R2) (FIG. 8, middle). In comparison to the application of the reference formulation R3 which is capable of biocementation, the relative soil humidity of the mixtures M11, M16 and M22 is significantly higher. This is because the resultant biocement layer exhibits a cohesive barrier for downward-flowing water. It may be supposed that because of the presence of the cohesion-modifying substances, the porosity of the layer is altered in a way such that water is able to evaporate less quickly.

The altered porosity might also be relevant for other applications where porosity plays a part. This is especially so for use in insulating materials, catalyst beds and/or battery materials. As a result of the reduced porosity, the material is also suitable as sealing material.

It was also found that when using the mixtures in which all of the components, including the bacteria, were present as powders, similar results were achieved in respect of emissions reduction. For this purpose, all of the pulverulent components were mixed and incorporated into the upper-most layer of and. The corresponding liquid volume was applied subsequently (data not shown). Comparable effects were also achieved when the bacterial strain was replaced by *L. sphaericus*, *B. cohnii*, *B. halodurans*, *B. pseudofirmus* and *A. crystallopoietes* in the same cell count per millilitre (data not shown). Where *B. cohnii*, *B. halodurans*, *B. pseudofirmus* and *A. crystallopoietes* were used analogously in the same cell count per millilitre in the formulations, the basic constituents were further adapted to the requirements of the particular bacterial strain. The skilled person is aware here that in the case of these non-eurolytically biocementing bacterial strains, the base medium has to be adapted in analogy to the constituents listed in Example 2, particularly in relation to a suitable metabolic starting material. In this case it was found that effective evaporation reduction was achieved with all of the bacterial strains (data not shown).

When various mine tailings were used, it was found that soils with a high loading of copper(II), iron(II), iron(III) and nickel(II) ions showed substantially quicker layer formation. In the case of the use of tailing/sand layering, similar results were achieved as for the pure sand sample (data not shown). Here as well, the mixtures with cohesion-modifying substances exhibited slower drying.

Decontamination

The skilled person is aware that carbonate ions which are produced by bacteria from urea, for example, can be utilized for precipitating metal ions (Phillips et al, *Engineered applications of ureolytic biomineralization: a review*, Biofouling, 2013, Vol. 29, No. 6, 715-733). This is probably the reason for the observation in the previous example (Example 7, Evaporation control) that layer formation began more rapidly when heavy metal-loaded soils were used. Testing was therefore carried out as to whether the cohesion-modifying substances are also suitable for improving heavy metal ion precipitation.

In each of the mixtures used, the mass of the control precipitate is less than the mass of the heavy metal-containing precipitate. This shows that the mixtures according to the invention are capable of binding and precipitating heavy metal ions. The presence of the respective metal salt was confirmed by atomic spectroscopy.

The moist mass of the heavy metal-containing precipitate when using R9, R25 and R32 for the precipitation of iron(III) chloride was FeCl3+R9=0.00 g, for FeCl3+R20=0.75 g and for FeCl3+M32=12.4 g (before drying). In the case of FeCl3+M32, a bulky gel is formed as a result of the bacterial activity. This gel is very difficult to dry in the stream of nitrogen. The mass of the heavy metal ion-containing precipitate for FeCl3+R9=0.00 g, for FeCl3+R25=0.05 g and for FeCl3+M32=6.53 g (here the assumption is that drying was incomplete owing to the gelatinous character). The residual heavy metal ion content was 50% lower for FeCl3+M32 than for FeCl3+R25.

Where M20 was used to precipitate FeCl3, NiCl2 and CuCl2, it was found that the addition of cohesion-modifying compounds resulted in an increased precipitation of the metal salts: the moist mass of the precipitate of M20 is 0.02 g. The moist mass of the heavy metal-containing precipitate is for FeCl3+M20=0.40 g, for NiCl2+M20=1.44 g and for CuCl2+M20=0.24 g. The residual heavy metal ion content in the supernatant is shown at the bottom in FIG. 8.

Unexpectedly it emerged that the presence of cohesion-modifying substances also increases the precipitation from solution. The use of the mixtures not explicitly stated in the results section showed comparable results in relation to precipitation efficiency (data not shown). The use of the bacteria which were present in the liquid media of Examples 1 to 6 likewise showed very good precipitation efficiency (data not shown).

A feature of cohesion-modifying compounds is that synergistically with biocementation they produce a particularly cohesive, low-emission biocement. Unexpectedly it was found that this also occurs in solution and therefore produces a particularly efficient precipitation of heavy metal ions. This was unexpected especially because polymers in particular have a tendency to bind polyvalent ions, including especially divalent metal cations such as Ca(II), Cu(II), Mg(II) and also Ni(II), to disperse them in solution and so to increase their solubility. On the basis of this affinity for divalent metal cations, the expectation was that, especially if the water-soluble and/or water-dispersible cohesion-modifying compound was a polymer, it would stabilize polyvalent metal cations, and also aggregates and agglomerates thereof, in solution and so there would be less efficient metal ion precipitation (cf. Tadros T F 2016, Nanodispersions, ISBN-978-3-11-029033-2, especially Section p. 25ff *steric stabilization*).

The removal of the cation source (here: calcium source) in the mixtures stated above showed comparable results in relation to the effects studied.

The invention claimed is:

1. A biocementation method comprising:
   (A) forming a mixture comprising:
      (i) at least one organism which is capable of forming carbonate, or of inducing and/or catalysing carbonate formation, and/or at least one enzyme which is capable of forming carbonate or of inducing and/or catalysing carbonate formation,
      (ii) at least one substance for forming carbonate,
      (iii) at least one water-soluble, water-dispersible and/or water-emulsifiable, cohesion-modifying compound comprising at least one calcium-binding functional group or at least one carbonate-binding functional group
         wherein the cohesion-modifying compound having the at least one calcium-binding functional group or carbonate-binding functional group is calcium lignosulfonate, sodium lignosulfonate, potassium lignosulfonate, magnesium lignosulfonate, ammonium lignosulfonate, and combinations thereof, and
   (B) applying the mixture to/into a substrate to be treated, thereby enabling biocementation.

2. The method of claim 1, wherein (iii) is present in an amount of at least 0.5 wt %, based on a total mass of (i), (ii) and (iii), and/or (iii) is present in an amount of at most 85 wt %, based on a total mass of (i), (ii) and (iii).

3. The method of claim 1, wherein (ii) is selected from: urea and its salts; organic acids and salts thereof and esters thereof; acetic acid and salts thereof and esters thereof; propanoic acid and salts thereof and esters thereof; butanoic acid and salts thereof and esters thereof; pentanoic acid and salts thereof and esters thereof, formic acid and salts thereof and esters thereof; maleic acid and salts thereof, and esters thereof, succinic acid and salts thereof, and esters thereof, pyruvic acid and salts thereof, and esters thereof, acetoacetic acid and salts thereof, and esters thereof, levulinic acid and salts thereof, and esters thereof, oxalacetic acid and salts thereof, and esters thereof, fruit acids, malic acid and salts thereof and esters thereof, citric acid and salts thereof and esters thereof, fumaric acid and salts thereof and esters thereof, gluconic acid and salts thereof and esters thereof, glycolic acid and salts thereof and esters thereof, mandelic acid and salts thereof and esters thereof, oxalic acid and salts thereof and esters thereof, salicylic acid and salts thereof and esters thereof, α-hydroxycaprylic acid and salts thereof and esters thereof, and tartaric acid and salts thereof and esters thereof, peptides; amino acids, and salts thereof and esters thereof; vegetable and animal complex substrates; industrial residual substance streams; and anaerobic substrates.

4. The method of claim 1, wherein the mixture is a liquid, a gel, a paste, or a powder.

5. The method of claim 1, wherein (i) is selected from microorganisms, aerobic bacteria, anaerobic bacteria, facultatively anaerobic bacteria, and intermediate stages thereof.

6. The method of claim 1, wherein (i) is selected from urease, asparaginase, carbonic anhydrase, and metabolic enzymes.

7. The method of claim 1, wherein the mixture further comprises at least one adjuvant selected from:

natural and chemical herbicides; fungicides, molluscicides; insecticides; hydrophobizers and wax emulsions; stabilizers, dispersants; emulsifying aids, surfactants; amines; thixotropic agents; propellants; free-flow agents, crystallization seeds and crystallization modifiers; complexing agents, fatty acids; minerals; salts; rocks, sand, gravel and slate flour, thermoplastic elastomers; aggregates; spores, plants and parts thereof;

fertilizers; bacteria capable of forming polymers; and substances which modify biocementation.

8. The method of claim 1, wherein the substrate is selected from organic and inorganic material and in each case derivatives and mixtures thereof, and also combinations thereof.

9. The method of claim 1, wherein the mixture is applied once or repeatedly and an amount of (iii) applied overall is at least 20 g, based on one square metre of application area, and/or an amount of the (iii) applied overall is at most 2000 g, based on one square metre of application area.

10. The method of claim 1, wherein the cohesion-modifying compound having the at least one calcium-binding functional group or carbonate-binding functional group is calcium lignosulfonate.

11. The method of claim 1, wherein the cohesion-modifying compound having the at least one calcium-binding functional group or carbonate-binding functional group is sodium lignosulfonate.

12. The method of claim 1, wherein the cohesion-modifying compound having the at least one calcium-binding functional group or carbonate-binding functional group is potassium lignosulfonate.

13. The method of claim 1, wherein the cohesion-modifying compound having the at least one calcium-binding functional group or carbonate-binding functional group is magnesium lignosulfonate.

14. The method of claim 1, wherein the cohesion-modifying compound having the at least one calcium-binding functional group or carbonate-binding functional group is ammonium lignosulfonate.

* * * * *